US012791463B2

(12) United States Patent
Yang et al.

(10) Patent No.: US 12,791,463 B2
(45) Date of Patent: Nov. 10, 2026

(54) METHOD AND APPARATUS TO DETERMINE THE AMOUNT OF CARBONATE IN A BIOMINERALIZED $CaCO_3$ PARTICLE

(71) Applicant: OXFORD UNIVERSITY INNOVATION LIMITED, Oxford (GB)

(72) Inventors: Minjun Yang, Oxford (GB); Chris Batchelor-McAuley, Oxford (GB); Richard G. Compton, Oxford (GB)

(73) Assignee: Oxford University Innovation Limited, Oxford (GB)

(*) Notice: Subject to any disclaimer, the term of this patent is extended or adjusted under 35 U.S.C. 154(b) by 494 days.

(21) Appl. No.: 18/572,991

(22) PCT Filed: Jun. 22, 2022

(86) PCT No.: PCT/GB2022/051591
§ 371 (c)(1),
(2) Date: Dec. 21, 2023

(87) PCT Pub. No.: WO2022/269254
PCT Pub. Date: Dec. 29, 2022

(65) Prior Publication Data
US 2025/0271349 A1 Aug. 28, 2025

(30) Foreign Application Priority Data
Jun. 23, 2021 (GB) ..................................... 2109024

(51) Int. Cl.
*G01N 15/14* (2024.01)
*G01N 15/12* (2024.01)

(52) U.S. Cl.
CPC ......... *G01N 15/1459* (2013.01); *G01N 15/12* (2013.01)

(58) Field of Classification Search
CPC ............... G01N 15/1459; G01N 15/12; G01N 15/0266; G01N 15/1433; G01N 15/0227
See application file for complete search history.

(56) References Cited

U.S. PATENT DOCUMENTS

2016/0025610 A1* 1/2016 Katsumoto ........ G01N 15/0266 435/287.1
2016/0146756 A1* 5/2016 Fritsch ................ B01F 33/3032 204/645

OTHER PUBLICATIONS

Yang, M. et al., "Reaction layer imaging using fluorescence electrochemical microscopy," Analytical Chemistry, 2017, vol. 89, No. 12, pp. 6870-6877.

(Continued)

*Primary Examiner* — John McGuirk
(74) *Attorney, Agent, or Firm* — Bookoff McAndrews, PLLC

(57) ABSTRACT

A method to determine the amount of carbonate in a biomineralized $CaCO_3$ particle is described, the method involving electrochemically generating a controlled amount of acid at an electrode in a carrier liquid which also contains the biomineralized $CaCO_3$ particle such that the acid diffuses from the electrode and then reacts with the biomineralized $CaCO_3$ particle, such that it starts to dissolve, and, monitoring the dissolution of the biomineralized $CaCO_3$ particle until it has completely dissolved to determine the amount of carbonate in the biomineralized $CaCO_3$ particle. An apparatus that is configured to carry out the method is also described.

26 Claims, 22 Drawing Sheets

(56) References Cited

OTHER PUBLICATIONS

Yang, M. et al., "Single-entity coccolithophore electrochemistry shows size is no guide to the degree of calcification," Environmental Science: Advances, 2022, vol. 1, No. 2, pp. 156-163.
Young, J. et al., "A guide to extant coccolithophore taxonomy," Journal of Nannoplankton Research, 2003, Special Issue, vol. 1, pp. 1-132.
Young, J. et al., "Crystal assembly and phylogenetic evolution in heterococcoliths," Nature, 1992, vol. 356, pp. 516-518.
Young, J.R. et al., "Calculation of coccolith volume and it use in calibration of carbonate flux estimates," Deep Sea Research Part II: Topical Studies in Oceanography, 2000, vol. 47, Nos. 9-11, pp. 1679-1700.
Young, J.R. et al., "Coccolith Ultrastructure and Biomineralisation," Journal of Structural Biology, 1999, vol. 126, No. 3, pp. 195-215.
Young, J.R. et al., "Guidelines for Coccolith and Calcareous Nannofossil Terminology," Palaeontology, vol. 40, Part 4, 1997, pp. 875-912.
Young, J.R., "Report—Terminology Working Group Meeting, London Apr. 1992," INA Newsletter, 14/1, pp. 6-8, 1992.
Young, J.R., "The Description and Analysis of Coccolith Structure," Knihovnika ZPN, 1992, 14a, vol. 1, pp. 35-71.
Subhas, A.V. et al., "A novel determination of calcite dissolution kinetics in seawater", Geochimica et Cosmochimica Acta, Pergamon Press, vol. 170, pp. 51-68 (Aug. 2015).
Beaufort, L. et al., "Effects of acidification and primary production on coccolith weight: Implications for carbonate transfer from the surface to the deep ocean", G3: Geochemistry, Geophysics, Geosystems, vol. 8, No. 8, 8 pages (Aug. 2007), available at https://agupubs.onlinelibrary.wiley.com/doi/full/10.1029/2006GC001493.
Langer, G. et al., "Dissolution of Calcidiscus leptoporus coccoliths in copepod guts? A morphological study", Marine Ecology Progress Series, vol. 331, pp. 139-146 (Feb. 2007), available at https://agupubs.onlinelibrary.wiley.com/doi/full/10.1029/2006GC001493.
International Search Report for PCT/GB2022/051591, dated Sep. 16, 2022 (3 pages).
Andersson, M.P. et al., "Infrared Spectroscopy and Density Functional Theory Investigation of Calcite, Chalk, and Coccoliths—Do We Observe the Mineral Surface?," The Journal of Physical Chemistry A, 2014, vol. 118, No. 45, pp. 10720-10729.
Anthony, J.W. et al., "Calcite" in Handbook of Mineralogy: Borates, carbonates, sulfates, Mineral Data Pub., Mineralogical Society of America, vol. V, 2005, available at https://www.handbookofmineralogy.org/pdfs/calcite.pdf (1 page).
Armstrong, R.A. et al., "A new, mechanistic model for organic carbon fluxes in the ocean based on the quantitative association of POC with ballast minerals," Deep Sea Research Part II: Topical Studies in Oceanography, 2001, vol. 49, Nos. 1-3, pp. 219-236.
Balch, W.M. et al., "Calcium carbonate measurements in the surface global ocean based on Moderate-Resolution Imaging Spectroradiometer data," Journal of Geophysical Research: Oceans, 2005, vol. 110, C07001 (22 pages).
Balch, W.M. et al., "Monsoonal forcing of calcification in the Arabian Sea," Deep Sea Research Part II: Topical Studies in Oceanography, 2000, vol. 47, Nos. 7-8, pp. 1301-1337.
Batchelor-McAuley, C. et al., "Diffusion to a cube: A 3D implicit finite difference method," Journal of Electroanalytical Chemistry, 2020, vol. 877, p. 114607.
Batchelor-McAuley, C. et al., "In situ nanoparticle sizing with zeptomole sensitivity," Analyst, 2015, vol. 140, No. 15, pp. 5048-5054.
Beaufort, L. et al., "Optical measurements to determine the thickness of calcite crystals and the mass of thin carbonate particles such as coccoliths," Nature Protocols, 2014, vol. 9, pp. 633-642.
Beaufort, L., "Weight Estimates of Coccoliths Using the Optical Properties (Birefringence) of Calcite," Micropaleontology, 2005, vol. 51, No. 4, pp. 289-297.
Beuvier, T. et al., "X-ray nanotomography of coccolithophores reveals that coccolith mass and segment number correlate with grid size," Nature Communications, 2019, vol. 10, No. 751, pp. 1-8.
Bobbert, P.A. et al., "Diffusion to a slowly growing truncated sphere on a substrate," Physica A: Statistical Mechanics and its Applications, 1987, vol. 141, No. 1, pp. 58-72.
Bollmann, J., "Weight approximation of coccoliths using a circular polarizer and interference colour derived retardation estimates—(The CPR Method)," Biogeosciences, 2014, vol. 11, pp. 1899-1910.
Bramlette, M.N., "Significance of coccolithophorids in calcium-carbonate deposition," GSA Bulletin, 1958; vol. 69, No. 1, pp. 121-126.
Broerse, A.T.C. et al., "Coccolithophore (-CaCO3) flux in the Sea of Okhotsk: seasonality, settling and alteration processes," Marine Micropaleontology, 2000, vol. 39, Nos. 1-4, pp. 179-200.
Brown, C. W. et al., "Coccolithophorid blooms in the global ocean," Journal of Geophysical Research: Oceans, 1994, vol. 99, No. C4, pp. 7467-7482.
Compton, R.G. et al., "The direct measurement of dissolution kinetics at the calcite/water interface," Journal of the Chemical Society, Chemical Communications, 1989, No. 4, pp. 249-251.
Compton, R.G. et al., "The dissolution of calcite in acid waters: mass transport versus surface control," Freshwater Biology, 1989, vol. 22, pp. 285-288.
Compton, R.G. et al., "The dissolution of calcite in aqueous solution at pH < 4: kinetics and mechanism," Philosophical Transactions of the Royal Society of London Series A, Mathematical and Physical Sciences, Feb. 6, 1990, vol. 330, No. 1609, pp. 1-45.
Holze, R., "R.G. Compton and C.E. Banks, Understanding cyclic voltammetry," Journal of Solid State Electrochemistry, 2009, vol. 13, pp. 1629-1632.
Holze, R., "R. Compton RG, Laborda E, Ward KR: Understanding voltammetry: Simulation of electrode processes," Journal of Solid State Electrochemistry, 2016, vol. 20, pp. 305-306.
Compton, R.G., et al., "The Inhibition of Calcite Dissolution/Precipitation: Mg2+ Cations," Journal of Colloid and Interface Science, 1994, vol. 165, No. 2, pp. 445-449.
Falgout, R.D. et al., "hypre: A Library of High Performance Preconditioners," In: Sloot, P.M.A. et al., (Eds), International Conference on Computer Science, 2002, Lecture Notes in Computer Science, vol. 2331, pp. 632-641.
Faucher, G. et al., "Impact of trace metal concentrations on coccolithophore growth and morphology: laboratory simulations of Cretaceous stress," Biogeosciences, 2007, vol. 14, pp. 3603-3613.
Fuertes, M.Á. et al., "The use of circularly polarized light for biometry, identification and estimation of mass of coccoliths," Marine Micropaleontology, 2014, vol. 113, pp. 44-55.
Geisen, M. et al., "Species level variation in coccolithophores," Thierstein, H.R., et al. (eds) Coccolithophores. Springer, 2004, pp. 327-366.
Gibbs, S. et al., "Species-specific growth response of coccolithophores to Palaeocene-Eocene environmental change," Nature Geoscience, 2013, vol. 6, pp. 218-222.
Hopkins, J. et al., "Regional Characteristics of the Temporal Variability in the Global Particulate Inorganic Carbon Inventory," Global Biogeochemical Cycles, 2019, vol. 33, pp. 1328-1338.
Johnsen, S.A.L. et al., "Relationship between coccolith length and thickness in the coccolithophore species Emiliania huxleyi and Gephyrocapsa oceanica," PLoS One, 2019, vol. 14, No. 8, e0220725 (23 pages).
Katelhon, E. et al. "Testing and validating electroanalytical simulations," Analyst, 2015, vol. 140, No. 8, pp. 2592-2598.
Keller, M.D. et al., "Media for the culture of oceanic ultraphytoplankton 1, 2," Journal of Phycology, 1987, vol. 23, pp. 633-638.
Klaas, C. et al., "Association of sinking organic matter with various types of mineral ballast in the deep sea: Implications for the rain ratio," Global Biogeochemical Cycles, 2002, vol. 16, No. 4, pp. 63-1-63-14.
Ma, J. et al., "Visualising electrochemical reaction layers: mediated vs. direct oxidation," Physical Chemistry Chemical Physics, 2020, vol. 22, pp. 12422-12433.
Milliman, J. D., "Production and accumulation of calcium carbonate in the ocean: Budget of a nonsteady state," Global Biogeochemical Cycles, 1993, vol. 7, No. 4, 927-957.

(56) References Cited

OTHER PUBLICATIONS

Monteiro, F.M. et al., "Why marine phytoplankton calcify," Science Advances, 2016, vol. 2, No. 7, e1501822 (14 pages).

Morel, F.M. et al., "Aquil: A Chemically Defined Phytoplankton Culture Medium for Trace Metal Studies," Journal of Phycology, 1979, vol. 15, pp. 135-141.

Mucci, A., "The Solubility of Calcite and Aragonite in Seawater at Various Salinities, Temperatures, and One Atmosphere Total Pressure," American Journal of Science, 1983, vol. 283, No. 7, pp. 780-799.

Muller, M.N. et al., "Influence of cell cycle phase on calcification in the coccolithophore Emiliania huxleyi," Limnology and Oceanography, 2008, vol. 53, pp. 506-512.

O'Brien, C.J. et al., "Global marine plankton functional type biomass distributions: coccolithophores," Earth System Science Data, 2013, vol. 5, No. 2, pp. 259-276.

Quan, M. et al., "Voltammetry of Quinones in Unbuffered Aqueous Solution: Reassessing the Roles of Proton Transfer and Hydrogen Bonding in the Aqueous Electrochemistry of Quinones," Journal of the American Chemical Society, 2007, vol. 129, No. 42, pp. 12847-12856.

Riebesell, U. et al., "Reduced calcification of marine plankton in response to increased atmospheric CO2," Nature, 2000, vol. 407, pp. 364-367.

Riebesell, U. et al., "Enhanced biological carbon consumption in a high CO2 ocean," Nature, 2007, vol. 450, pp. 545-548.

Rost, B. et al., "Coccolithophores and the biological pump: responses to environmental changes," Thierstein, H.R et al. (eds) Coccolithophores, Springer, 2004, pp. 99-125.

Schindelin, J. et al., "Fiji: an open-source platform for biological-image analysis," Nature Methods, 2012, vol. 9, pp. 676-682.

Smyth, T.J. et al., "Time series of coccolithophore activity in the Barents Sea, from twenty years of satellite imagery," Geophysical Research Letters, 2004, vol. 31, L11302 (4 pages).

Taylor, A.R. et al., "Dynamics of formation and secretion of heterococcoliths by *Coccolithus pelagicus* ssp. *braarudii*," European Journal of Phycology, 2007, vol. 42, No. 2, pp. 125-136.

Van De Locht, R. et al., "Ultrastructure and Crystallography of Nanoscale Calcite Building Blocks in Rhabdosphaera clavigera Coccolith Spines," Crystal Growth & Design, 2014, vol. 14, No. 4, pp. 1710-1718.

Van Eldik, R. et al., "Effects of pressure on the kinetics of the dehydration of carbonic acid and the hydrolysis of CO2 in aqueous solution," Journal of Solution Chemistry, 1982, vol. 11, pp. 339-346.

Walker, C.E. et al., "The requirement for calcification differs between ecologically important coccolithophore species," New Phytologist, 2018, vol. 220, No. 1, pp. 147-162.

Yang, M. et al., "Fluoro-electrochemical microscopy reveals group specific differential susceptibility of phytoplankton towards oxidative damage," Chemical Science, 2019, vol. 10, No. 34, pp. 7988-7993.

Yang, M. et al., "Opto-Electrochemical Dissolution Reveals Coccolith Calcium Carbonate Content," Angewandte Chemie, 2021, vol. 133, pp. 21167-21174.

* cited by examiner

METHOD AND APPARATUS TO DETERMINE THE AMOUNT OF CARBONATE IN A BIOMINERALIZED $CaCO_3$ PARTICLE

CROSS-REFERENCE TO RELATED APPLICATIONS

This application is the national stage entry of International Application No. PCT/GB2022/051591, filed on Jun. 22, 2022, which claims priority to GB Application No. 2109024.6, filed on Jun. 23, 2021.

BACKGROUND

Coccolithophores play a fundamental role in the carbon cycle. Coccolithophores are characterised by the production of individual plates of calcite (coccoliths) that adorn the surface of the cell to form an exoskeleton (coccosphere). Coccolithophores produce over 2 billion tonnes ($10^{15}$ g) of calcite and an estimated $6\times10^{25}$ individual coccoliths each year. Coccospheres and coccoliths therefore dominate the calcareous oceanic sediments and are responsible for approximately half of open ocean calcite precipitation. The calcite mass of each individual lith or coccosphere can represent the intensity and/or rate of calcite production by coccolithophore cells, and is therefore an important biogeochemical parameter in terms of the impact of coccolithophore production on the alkalinity budget of the surface ocean, which reflects the air-sea flux of $CO_2$. In addition to being a fundamental component of the geological cycle of carbon, the mass of secreted coccoliths is also a biologically important characteristic of the cell, potentially yielding information about cellular adaptation to growth conditions such as nutrient availability and carbonate chemistry.

The secretion of coccoliths onto the surface of a coccolithophore to form an inter-locking mineralized layer (i.e. the coccosphere) is reported to be at a rate of up to 1-2 per hour. These elaborate bioengineered biomineralized $CaCO_3$ particles generally, but not exclusively, consist of alternating nano-units of calcite arranged with the optical axis radial (R units) and vertical (V units) to the plane of the coccolith. In the lifecycle of a coccolithophore, such as the most abundant species *Emiliania huxleyi*, many coccoliths become detached, resulting in a ratio of detached-coccolith vs intact-coccospheres as high as ~100:1 in surface waters. Due to the scale of phytoplankton blooms and the light-scattering properties of calcite, a whitening of surface waters can be observed from space. Satellite studies have revealed that the global coverage is at the millions of square kilometres level. On a global scale, although satellite studies have attempted to convert the remotely-sensed optical images to maps of calcite mass, this required relating the light-scattered images remotely acquired from space to local conditions in the surface waters, such as the number and density of coccolithophores and coccolith mass. More generally, to estimate the mass of coccospheres or coccoliths in the open ocean or sediment samples, many methods also use values statistically averaged over large sample sizes, e.g. shape factor, which do not account for the natural variability in particulate inorganic carbon per coccolith that inevitably results from changes in coccolithophore diversity and environmental stressors in the marine environment.

Bio-accumulated calcium carbonates excreted by phytoplankton vary markedly between species exhibiting significant intra-species diversity. Due to the small coccolith size of some species (e.g. *E. huxleyi*), the mass of each individual is too small for accurate weight measurement (pico- to nano-grams) using traditional methods. While a number of other methods have been developed for this purpose, these methods have several limitations. One approach is high-resolution x-ray nanotomography that allows coccoliths to be 3D reconstructed. (Beuvier, T. et al, *Nature communications* 10, 1-8 (2019)). However, this method is disadvantageous due to lack of portability and high cost. Alternatively, circular polarised light techniques, which have become popular over the past decade, are restricted to species which have a maximum calcite thickness of 1.56 μm for imaging with a black-and-white camera or <4.5 μm in colour. (Fuertes, M. Á. et al, *Marine Micropaleontology* 113, 44-55; Beaufort, L. et al, *Nature Protocols* 9, 633-642 (2014); Beaufort, L et al, *Micropaleontology* 51, 289-297 (2005); and Bollman, J et al, *Biogeosciences* 11, 1899-1910, (2014)). These techniques also utilize the birefringence property of calcite crystalline such that retardation of the polarised light emerging from the crystal provides information on crystal thickness. Prior to measurement, a calibration for pixel-intensity to calcite thickness is therefore necessary which requires a special cylindrical-shaped coccolith called rhabdolith. Moreover, for birefringence to occur, the optical axis of the calcite crystalline has to be perpendicular to the incident polarised ray. This is problematic for biomineralized $CaCO_3$ particles composed of entirely V units (or a mixture of R and V units), as the particle can appear entirely (or partially) optically isotropic to the incident ray. The present inventors therefore sought to develop a method for determining the amount of carbonate which avoided at least some of the problems with known methods in the art, which could be used to accurately determine the amount of carbonate in any biomineralised $CaCO_3$ particle, including coccospheres and coccoliths.

SUMMARY OF INVENTION

According to a first aspect of the present invention, there is provided a method to determine the amount of carbonate in a biomineralized $CaCO_3$ particle, the method comprising electrochemically generating a controlled amount of acid at an electrode in a carrier liquid, wherein the biomineralized $CaCO_3$ particle is also present in the carrier liquid, wherein the acid diffuses from the electrode and then reacts with the biomineralized $CaCO_3$ particle, such that it starts to dissolve, and, monitoring the dissolution of the biomineralized $CaCO_3$ particle until it has completely dissolved to determine the amount of carbonate in the biomineralized $CaCO_3$ particle. In an embodiment, the biomineralized $CaCO_3$ particle is a coccolith and/or coccosphere.

Also disclosed herein is a method to determine the amount of carbonate in a biomineralized $CaCO_3$ particle, the method comprising electrochemically generating a controlled amount of acid at an electrode in a carrier liquid, wherein the acid diffuses from the electrode and reacts with the biomineralized $CaCO_3$ particle, such that it starts to dissolve, and, monitoring the dissolution of the biomineralized $CaCO_3$ particle until it has completely dissolved to determine the amount of carbonate in the biomineralized $CaCO_3$ particle. In an embodiment, the biomineralized $CaCO_3$ particle is a coccolith and/or coccosphere.

Also disclosed herein is a method to determine the amount of carbonate in a coccolithophore, said coccolithophore comprising an outer $CaCO_3$ shell and an inner biological cell, the method comprising electrochemically generating a controlled amount of acid at an electrode in a carrier liquid, wherein the acid diffuses from the electrode and reacts with the outer $CaCO_3$ shell of the coccolithophore, such that it starts to dissolve, and, monitoring the dissolution of the outer $CaCO_3$ shell until it has completely dissolved to determine the amount of carbonate in the coccolithophore. In some embodiments, the amount of calcium carbonate can be determined by measuring the effective radius of the coccolithophore before and after dissolution (e.g., as defined herein) to determine the volume of the outer $CaCO_3$ shell.

Also disclosed herein is a method to determine the PIC (particulate inorganic carbon) and/or POC (particulate organic carbon) in a coccolithophore, said coccolithophore comprising an outer $CaCO_3$ shell and an inner biological cell, the method comprising electrochemically generating a controlled amount of acid at an electrode in a carrier liquid, wherein the acid diffuses from the electrode and reacts with the outer $CaCO_3$ shell of the coccolithophore, such that it starts to dissolve, and, monitoring the dissolution of the outer $CaCO_3$ shell until it has completely dissolved to determine the PIC and/or POC in the coccolithophore. In some embodiments, the PIC can be determined by measuring the effective radius of the coccolithophore before and after dissolution (e.g., as defined herein). In some embodiments, the POC can be determined by measuring the effective radius of the coccolithophore after dissolution. In some embodiments, the method comprises determining both the PIC and POC and further determining the PIC:POC ratio.

According to a second aspect of the present invention, there is provided an apparatus to determine the amount of carbonate in a biomineralized $CaCO_3$ particle, the apparatus comprising a cell containing electrodes wherein the cell is configured to hold a carrier liquid containing biomineralized $CaCO_3$ and optionally an acid precursor;

and the apparatus is configured to:

electrochemically generate a controlled amount of acid at an electrode in a carrier liquid, wherein the biomineralized $CaCO_3$ particle is also present in the carrier liquid, wherein the acid diffuses from the electrode and then reacts with the biomineralized $CaCO_3$ particle, such that it starts to dissolve, and, monitor the dissolution of the biomineralized $CaCO_3$ particle until it has completely dissolved to determine the amount of carbonate in the biomineralized $CaCO_3$ particle.

Also disclosed herein is an apparatus to determine the amount of carbonate in a biomineralized $CaCO_3$ particle, the apparatus comprising a cell containing electrodes, a biomineralized $CaCO_3$ particle and optionally an acid precursor;

wherein the apparatus is configured to:

electrochemically generate a controlled amount of acid at the electrode, wherein the acid reacts with the biomineralized $CaCO_3$ particle, such that it starts to dissolve, and, monitor the dissolution of the biomineralized $CaCO_3$ particle until it has completely dissolved to determine the amount of carbonate in the biomineralized $CaCO_3$ particle.

The present invention provides a bespoke method which uses electrochemical generation of acid, and calcite dissolution kinetics to estimate individual biomineralized $CaCO_3$ particle mass (e.g. derived from a calcifying plankton species, such as a coccolith or coccosphere). Analytical 'titration' of the calcium carbonate content of individual liths is achieved within tens of seconds by the controlled dissolution of a single biomineralized $CaCO_3$ particle with acid electrochemically generated within an electrochemical cell. This allows for the measurement of single biomineralized $CaCO_3$ particles located in the diffusion field of an acid generating electrode. Measuring the mass of individual biomineralized $CaCO_3$ particles are useful for probing the physiological condition of the coccolithophore community and their response to the changes in the local marine environment.

The above aspects and/or embodiments of the present invention may provide for the following advantages over the prior art:

- Calcite dissolution kinetics are applicable to biomineralized $CaCO_3$ particles of any mass or thickness.
- Calcite dissolution kinetics are independent on knowledge of the crystalline orientation of calcites of biomineralized $CaCO_3$ particle.
- The method can be used for biomineralized $CaCO_3$ particles of any morphology or shape.
- The analysis is performed on an individual entity basis (coccosphere, coccolith etc), and therefore does not rely on using a quantity statistically averaged over, for example, large sediment samples (e.g. shape factor, $k_s$). The coccolith mass estimated herein could in principle account for sample abnormalities such as those that include a large proportion of deformed, partially dissolved, or broken coccoliths. Determining the mass of individual biomineralized $CaCO_3$ particles (e.g. coccoliths or coccospheres), rather than methods that use statistically averaging over large sample sizes provides more information and is therefore biogeochemically and biologically important.
- The method is applicable to be used remotely at sea and/or onboard research cruises, inside or outside of a laboratory environment, and the method can discriminate coccoliths from suspended sediments, which cannot be done in an operational manner using conventional remote sensing approaches.
- Calcite dissolution kinetics can be monitored by a range of different methods, including an opto-electrochemical method exemplified herein.
- Methods described herein may be free of a calibration step, unlike prior methods in the art.
- Methods described herein allow for single entity measurement and can be applied in the study of live samples.

DETAILED DESCRIPTION

Figure 1:
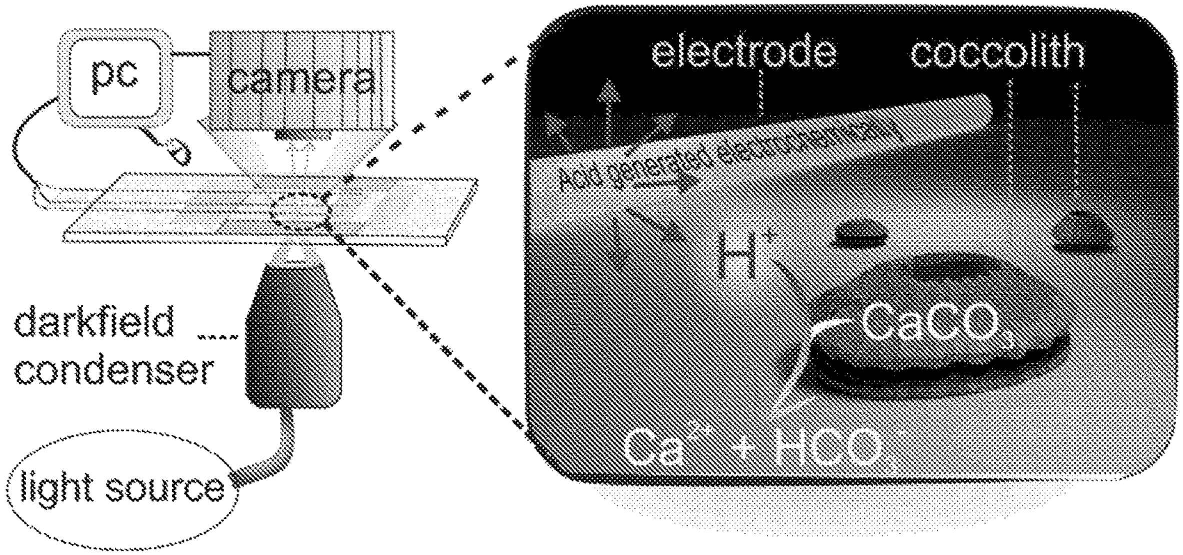
FIG. 1 provides a schematic illustration of how the calcite dissolution kinetics can be used to determine the amount of carbonate in a biomineralized $CaCO_3$ particle. At the start of the experiment, acid is generated electrochemically local to the electrode diffuses outward where it encounters the coccoliths. In this Example schematic, the dissolution of coccoliths under acid attack is monitored and the amount of carbonate is determined using darkfield optical microscopy.

The present invention provides the aspects mentioned above. Optional and preferred features of the various aspects are described below. Unless otherwise stated, any optional or preferred feature may be combined with any other optional or preferred feature, and with any of the aspects of the invention mentioned herein.

In a first aspect, there is provided a method to determine the amount of carbonate in a biomineralized $CaCO_3$ particle, the method comprising

- electrochemically generating a controlled amount of acid at an electrode in a carrier liquid, wherein the biomineralized $CaCO_3$ particle is also present in the carrier liquid, wherein the acid diffuses from the electrode and then reacts with the biomineralized $CaCO_3$ particle, such that it starts to dissolve, and,
- monitoring the dissolution of the biomineralized $CaCO_3$ particle until it has completely dissolved to determine the amount of carbonate in the biomineralized $CaCO_3$ particle.

Amount of Carbonate

The "carbonate" in the context of "amount of carbonate" may be used a shorthand for metal carbonate herein. As defined herein, the amount of carbonate may refer to the volume of metal carbonate (i.e., in the biomineralized $CaCO_3$ particle). The metal carbonate comprises or is calcium carbonate. In an embodiment, the metal carbonate comprises or is predominantly $CaCO_3$, i.e., wherein the carbonate is at least 90 wt. % $CaCO_3$, or at least 91 wt. %, or at least 92 wt. % $CaCO_3$, or at least 93 wt. % $CaCO_3$, or at least 94 wt. % $CaCO_3$, or at least 95 wt. % $CaCO_3$, or at least 96 wt. %, or at least 97 wt. %, or at least 98 wt. %, or at least 99 wt. % $CaCO_3$. In some embodiments, the metal carbonate may further comprise magnesium carbonate, bicarbonate or a combination thereof. The mass of metal carbonate can be converted into the moles of metal carbonate using the relative molecular weight of each species. For example, the mass of $CaCO_3$ can be converted into the moles of $CaCO_3$ and vice versa using the relative molecular weight of $CaCO_3$ (i.e., 100.0869 g/mol). In some embodiments, the mass of $CaCO_3$ is determined by determining the volume of the biomineralized $CaCO_3$ particle and multiplying the volume of the biomineralized $CaCO_3$ particle by the density of $CaCO_3$. The density of $CaCO_3$ may be a known density (e.g., 2.71 $g/cm^3$) or an estimated density. In embodiments described herein, the amount of carbonate may be determined without a calibration step.

Biomineralized $CaCO_3$ Particle

A biomineralized $CaCO_3$ particle described herein refers to any $CaCO_3$ particle deriving from a microorganism. The biomineralized $CaCO_3$ particle comprises $CaCO_3$. In preferred embodiments, the biomineralized $CaCO_3$ particle is or at least predominantly comprises $CaCO_3$, i.e., wherein the biomineralized $CaCO_3$ particle comprises at least 90 wt. % $CaCO_3$, or at least 91 wt. %, or at least 92 wt. % $CaCO_3$, or at least 93 wt. % $CaCO_3$, or at least 94 wt. % $CaCO_3$, or at least 95 wt. % $CaCO_3$, or at least 96 wt. %, or at least 97 wt. %, or at least 98 wt. %, or at least 99 wt. % $CaCO_3$ In some embodiments, the biomineralized $CaCO_3$ may further comprise other carbonate or metal carbonate species, e.g., magnesium carbonate, bicarbonate or combinations thereof.

In some embodiments, the biomineralized $CaCO_3$ particle derives from a calcifying plankton species, such as a coccolithophore (i.e. a unicellular eukaryotic phytoplankton). In some embodiments, the biomineralized $CaCO_3$ particle is a coccolith or a coccosphere, or a part of a coccolith or coccosphere. In some embodiments, the biomineralized $CaCO_3$ particle derived from a non-coccosphere plankton species, such as *T. heimii* or any other biomineralized calcite particle structure.

In some embodiments, the biomineralized $CaCO_3$ particle is derived from a genus selected from *Algirosphaera, Acanthoica, Alisphaera, Alveosphaera, Anacanthoica, Anthosphaera, Braarudosphaera, Calcioconus, Calciopappus, Calciosolenia, Calicasphaera, Calyptrolithina, Calcidiscus Calyptrosphaera, Caneosphaera, Ceratolithus, Coccolithus Corisphaera, Coronosphaera, Cribosphaera, Crystallolithus, Cyrtosphaera, Discosphaera, Emiliania, Florisphaera, Gephyrocapsa Gladiolithus, Halopappus, Heimiella, Helicosphaera, Helladosphaera, Hesperides, Holococcolithophora, Homozygosphaera, Lohmannosphaera, Michaelsarsia, Oolithotus, Ophiaster, Palusphaera, Pappomanus, Papposphaera, Picarola, Pleurochrysis, Polycrater, Pontosphaera, Poricalyptra, Poritectolithus, Recticulofenestra, Rhabdosphaera, Scyphosphaera, Solisphaera, Sphaerocalyptra, Syracolithus, Syracosphaera, Termitomyces Thoracosphaera, Turrilithus, Umbellosphaera, Umbilicosphaera, Zygosphaera*. In some embodiments, the biomineralized $CaCO_3$ particle is derived from a genus selected from *Emiliania, Calcidiscus, Gephyrocapsa* or *Coccolithus*. In some embodiments, the biomineralized $CaCO_3$ particle is derived from a plankton species selected from *Emiliania huxleyi, Calcidiscus* sp, *Calcidscus leptoporus, Calcidiscus quadriperforatus, Gephyrocapsa* sp, *Gephyrocapsa erisonii, Gephyrocapsa muellerae, Gephyrocapsa oceanica, Gephyrocapsa ornate, Coccolithus* sp, *Coccolithus pelagicus*, or *Coccolithus pelagicus holo.*

In some embodiments, the biomineralized $CaCO_3$ particle is derived from a plankton species selected from *E. huxleyi, C. leptoporus, G. oceanica* and *C. pelagicus, C. pelagicus* may be of the braaudii strain.

In some embodiments, the biomineralized $CaCO_3$ particle derives from calcifying eukaryotes such as calcifying Dinoflagellates.

In some embodiments, the biomineralized $CaCO_3$ particle is derived from a calcifying plankton species. In some embodiments, the biomineralized $CaCO_3$ particle is derived from a calcifying plankton species is a coccolith or a coccosphere, or a part thereof. Coccolith described herein refers to an individual plate of calcium carbonate formed by a coccolithophore. Coccolith may otherwise be referred to as "lith" herein. The lith as described herein may refer to a detached lith, i.e. an individual plate of calcium carbonate that is not attached to or part of a coccolithophore). In some embodiments, the coccolith may be a heterococcolith or a holococcolith.

Coccosphere refers to the exoskeleton (i.e. outer exterior) of a coccolithophore which is formed of a plurality of coccoliths. In some embodiments, the coccolithophore is formed from up to 1000 coccoliths, in some examples, 40-50 individual coccoliths (e.g., *E. huxleyi* coccospheres).

The methods described herein can be used to determine the mass of biomineralized $CaCO_3$ particles over several orders of magnitude. In some embodiments the biomineralized $CaCO_3$ particle may have a mass from 1 pg to 100 ng. In some embodiments, the biomineralized $CaCO_3$ particle may have a mass greater than 1 pg, or greater than 2.5 pg, or greater than 5 pg, or greater than 7.5 pg, or greater than 10 pg, or greater than 20 pg, or greater than 25 pg, or greater than 30 pg, or greater than 40 pg, or greater than 50 pg, or greater than 75 pg, or greater than 100 pg, or greater than 125 pg, or greater than 150 pg, or greater than 175 pg, or greater than 200 pg, or greater than 225 pg, or greater than 250 pg, or greater than 275 pg, or greater than 300 pg, or greater than 325 pg, or greater than 350 pg, or greater than 375 pg, or greater than 400 pg, or greater than 425 pg, or a mass greater than 450 pg, or mass greater than 500 pg, or mass greater than 750 pg, or mass greater than 1000 pg, or mass greater than 2500 pg, or mass greater than 5000 pg, or mass greater than 7500 pg, or a mass of up to 10000 pg, or a mass of up to 100 ng. In some embodiments, the biomineralized $CaCO_3$ particle may have a mass smaller than 100 ng, or a mass smaller than 10000 pg, or a mass smaller than 7500 pg, or a mass smaller than 5000 pg, or a mass smaller than 2500 pg, or a mass smaller than 1000 pg, or a mass smaller than 750 pg, or a mass smaller than 500 pg, or a mass smaller than 450 pg, or smaller than 425 pg, or smaller than 400 pg, or smaller than 375 pg, or smaller than 350 pg, or smaller than 325 pg, or smaller than 300 pg, or smaller than 275 pg, or smaller than 250 pg, or smaller than 225 pg, or smaller than 200 pg, or smaller than 175 pg, or smaller than 150 pg, or smaller than 125 pg, or smaller than 100 pg, or smaller than 75 pg, or smaller than 50 pg, or smaller than 40 pg, or smaller than 30 pg, or smaller than 25 pg, or smaller than 20 pg, or smaller than 10 pg, or smaller than 7.5 pg, or smaller than 5 pg, or smaller than 2.5 pg.

In some embodiments, the biomineralized $CaCO_3$ particle is a coccolith and has a mass from 1 pg to 1000 pg, or from 4 pg to 300 pg. In some embodiments, the biomineralized $CaCO_3$ particle is a coccosphere and has a mass up to 100 ng The methods described herein are applicable to biomineralized $CaCO_3$ particles of any size, shape or morphology. In some embodiments, the biomineralized $CaCO_3$ particle may have a length of 0.1 micron to 100 micron (i.e. wherein length is defined as the longest dimension across the particle). In some embodiments, biomineralized $CaCO_3$ particle has a particle size greater than 0.1 micron, or greater than 0.25 micron, or greater than 0.5 micron, or greater than 0.75 micron, or greater than 1 micron, or greater than 2 micron, or greater than 3 micron, or greater than 4 micron, or greater than 5 micron, or greater than 6 micron, or greater than 7 micron, or greater than 8 micron, or greater than 9 micron, or greater than 10 micron, or greater than 12.5 micron, or greater than 15 micron, or greater than 17.5 micron, or greater than 20 micron, or greater than 22.5 micron, or greater than 25 micron, or greater than 30 micron, or greater than 40 micron, or greater than 50 micron, or greater than 60 micron, or greater than 70 micron, or greater than 80 micron, or greater than 90 micron, or greater than 95 micron. In some embodiments, biomineralized $CaCO_3$ particle has a particle length that is less than 95 micron, or less than 90 micron, or less than 80 micron, or less than 70 micron, or less than 60 micron, or less than 50 micron, or less than 40 micron, or less than 30 micron, or less than 25 micron, or less than 20 micron, or less than 17.5 micron, or less than 15 micron, or less than 12.5 micron, or less than 10 micron, or less than 9 micron, or less than 8 micron, or less than 7 micron, or less than 6 micron, or less than 5 micron, or less than 4 micron, or less than 3 micron, or less than 2 micron. The length of the biomineralized $CaCO_3$ particles may be that as determined by standard electron microscopy. In some embodiments, the biomineralized $CaCO_3$ particle may be minuscule (a length <1 μm), very small (a length between 1-3 μm); small (a length between 3-5 μm); medium (a length between 5-8 μm); large (a length between 8-12 μm) or very large (a length >12 μm). The length of the biomineralized $CaCO_3$ particles may be that as determined by standard electron microscopy.

In some examples, biomineralized $CaCO_3$ particle is a coccolith and has a length of from 0.1 micron to 25 micron. In some examples, the coccolith has a length of from 1 microns to 5 microns (e.g. for coccoliths derived from *E. huxleyi*). In some embodiments, the coccolith has a length of 4 microns to 11 microns (e.g. for coccoliths derived from *C. leptoporus*). In some embodiments, the coccolith has a length of from 4 microns to 9 microns (e.g. for coccoliths derived from *G. oceanica*). In some embodiments, the coccolith has a length of from 6 microns to 13 microns (e.g. for coccoliths derived from *C. braaudi*). In some examples, the biomineralized $CaCO_3$ particle is a coccosphere and has a length of 5 micron to 100 micron. The length of the coccolith or coccosphere may be that as determined by standard electron microscopy.

In some examples, biomineralized $CaCO_3$ particle may have a maximum thickness of from 0.1 micron to 5 micron, or from 0.2 micron to 4 micron, or from 0.25 micron to 3 micron. In some embodiments, biomineralized $CaCO_3$ particle has a maximum thickness of greater than 0.1 micron, or greater than 0.2 micron, or greater than 0.3 micron, or greater than 0.4 micron, or greater than 0.5 micron, or greater than 0.6 micron, or greater than 0.7 micron, or greater than 0.8 micron, or greater than 0.9 micron, or greater than 1 micron, or greater than 1.25 micron, or greater than 1.5 micron, or greater than 1.75 micron, or greater than 2 micron, or greater than 2.25 micron, or greater than 2.5 micron, or greater than 2.75 micron, or greater than 3 micron, or greater than 3.5 micron. In some embodiments, biomineralized $CaCO_3$ particle may have a maximum thickness of less than 4 micron, or less than 3.75 micron, or less than 3.5 micron, or less than 3.25 micron, or less than 3 micron, or less than 2.75 micron, or less than 2.5 micron, or less than 2.25 micron, or less than 2 micron, or less than 1.75 micron, or less than 1.5 micron, or less than 1.25 micron, or less than 1 micron, or less than 0.9 micron, or less than 0.8 micron, or less than 0.7 micron, or less than 0.6 micron, or less than 0.5 micron, or less than 0.4 micron, or less than 0.3 micron. The maximum thickness of the biomineralized $CaCO_3$ particle may be that as determined by standard electron microscopy. Maximum thickness as defined herein may refer to the shortest distance across the biomineralized $CaCO_3$ particle or coccolith.

The biomineralized $CaCO_3$ particle may comprise calcite crystals of any suitable crystal orientation (e.g. wherein crystal orientation may refer to the calcite c-axis orientation as is known in the art and Young et al (1992) and Young et al., 1997). In some embodiments, the biomineralized $CaCO_3$ particle may comprise V units (i.e. crystal unit with sub-vertical orientation of c-axis), R units (crystal unit with sub-radial orientation of c-axis), T units (crystal-unit with sub-tangential orientation of x-axis), or a mixture thereof, wherein actual orientations can depart up to 30 degrees from true vertical, radial or tangential. In some embodiments, the biomineralized $CaCO_3$ particle comprises a mixture of V and R units. The identification of V, R and T units may be determined by any method that is well-known in the art, for example, electron microscopy.

The biomineralized $CaCO_3$ particle may have any suitable shape. In some embodiments, the biomineralized $CaCO_3$ particle has a shape that is asymmetrical, elliptical, irregularly elliptical, oblong, lenticular, polygonal, reniform, ring-shaped or wing.

The biomineralized $CaCO_3$ particle may have any suitable morphology. In some embodiments, biomineralized $CaCO_3$ particle has a morphology selected from calyptrolith, caneolith, ceratolith, cribilith, cyrtolith, discolith, helicolith, lopadolith, pentalith, placolith, prismatolith, rhabdolith, or a scapholith. Coccoliths deriving from *E. huxleyi, C. braaudii, C. leptoporus* and *G. oceanica* are typically, for example, placoliths.

In some embodiments, the biomineralized $CaCO_3$ particle is a broken or deformed coccolith.

In some embodiments, the method allows determination of the amount of carbonate in a single biomineralized $CaCO_3$ particle. In other embodiments, the method allows determination of the amount of carbonate in multiple biomineralized $CaCO_3$ particles simultaneously.

Carrier Fluid

The carrier fluid may be any suitable fluid, more preferably an aqueous carrier fluid, which may comprise a supporting electrolyte. In preferred embodiments, the carrier fluid is saline water, more preferably sea water. This is advantageous since a sample containing a biomineralized particle can be used as the carrier fluid, and used directly in the method, i.e. without treatment of the sample after its collection from the environment in which it is found. In some embodiments, the sample containing a biomineralized particle is diluted with another media to form the carrier fluid. The media may comprise any suitable electrolyte. In some embodiments, the supporting electrolyte may comprise KCl and/or NaCl. In some embodiments, the supporting electrolyte may comprise $KNO_3$, for example, from 0.5 M to 1 M $KNO_3$, or about 0.7 M. In some embodiments, the supporting electrolyte may comprise $Mg^{2+}$, for example from about 20 mM to 110 mM $Mg^{2+}$, or from about 30 to 70 mM $Mg^{2+}$, or about 50 to 60 mM $Mg^{2+}$. In some embodiments, the supporting electrolyte may comprise $HCO_3^-$, for example, from about 1 to 5 mM $HCO_3^-$, or from about 2 to 3 mM $HCO_3^-$. In some embodiments, the carrier fluid and/or supporting electrolyte may be free of $HCO_3^-$. In some embodiments, the carrier fluid and/or supporting electrolyte may comprise $Ca^{2+}$, for example at least 10 mM $Ca^{2+}$.

The biomineralized $CaCO_3$ particle is present in the carrier fluid. As defined herein, present in the carrier fluid may refer to wherein the biomineralized $CaCO_3$ particle is in contact with the carrier fluid.

The carrier fluid and/or sample may be of any suitable volume, i.e. such that the carrier fluid completely surrounds the biomineralized $CaCO_3$ particle and be in contact with the electrode. In some embodiments the carrier fluid and/or sample has a volume of less than 1000 μL, or less than 500 μL, or less than 250 μL, or less than 100 μL, or less than 50 μL, or less than 25 μL, or less than 10 μL, or less than 5 μL, or less than 1 μL, or less than 0.1 μL. In some embodiments, the carrier fluid and/or sample has a volume of at least 0.1 μL, or at least 1 μL, or at least 2 μL or at least 5 μL, or at least 10 μL. In some examples, the carrier fluid and/or sample has a volume from 0.1 μL to 1000 μL, optionally from 1 uL to 100 uL optionally from 1 uL to 50 μL, optionally from 1 uL to 20 μL, optionally from 5 to 15 μL.

Electrochemical Generation of Acid

In the method and apparatus of the present invention, a controlled amount of acid is generated electrochemically. In some embodiments, the pH of the carrier liquid local to the electrode after electrochemically generating a controlled amount of acid is less than 7, or less than 6, or less than 5, or less than 4, or less than or equal to 3. Local to the electrode as defined herein may refer to the distance over which the electrode electrolytically perturbs the solution. In some embodiments, the pH of the carrier liquid may be that local to and within the diffusion field of the electrode. In some embodiments, local to the electrode refers to a distance that is less than 300 microns from the electrode, or less than 200 microns, or less than 100 microns from the electrode. The distance may be measured perpendicular to its length if it is an elongated electrode, e.g. in the form of a wire or fibre, such as a carbon fibre) and at least 1 s from the initial generation of the acid from the acid precursor, which is less than 7, or less than 6, or less than 5, or less than 4, or less than or equal to 3.

In some embodiments, the concentration of protons ($[H^+]$) in the carried liquid (i.e. the acidic H+ generated electrochemically), at a distance of less than 300 microns from the (i.e., working electrode (measured perpendicular to its length if it is an elongated electrode, e.g. in the form of a wire or fibre, such as a carbon fibre) and at least 1 s from the initial generation of the acid, e.g. from the acid precursor, is at least 0.1 mM, optionally at least 0.2 mM, optionally at least 0.3 mM, optionally at least 0.4 mM, optionally at least 0.5 mM. In some embodiments, the concentration of acid precursor in the carrier liquid, at a distance of at least 10 microns from the working electrode (measured perpendicular to its length if it is an elongated electrode, e.g. in the form of a wire or fibre, such as a carbon fibre) and at least 1 s from the initial generation of the acid from the acid precursor, is from 0.1 mM to 10 mM, optionally from 0.2 mM to 10 mM, optionally from 0.2 mM to 8 mM, optionally from 0.2 mM to 8 mM, optionally from 0.1 to 5 mM, optionally from 0.2 to 5 mM, optionally from 0.1 to 3 mM, optionally from 0.1 to 3 mM. In some embodiments, the concentration of acid precursor in the carrier liquid, at a distance of 10 microns from the working electrode (measured perpendicular to its length if it is an elongated electrode, e.g. in the form of a wire or fibre, such as a carbon fibre) and 1 s from the initial generation of the acid, does not exceed 10 mM, optionally 8 mM, optionally 5 mM.

In some embodiments, the acid is electrochemically generated from an acid precursor, and wherein the acid precursor is any compound that is able to undergo an electrochemically driven proton coupled electron transfer reaction. In some embodiments, a known amount of acid precursor is added to the carrier medium immediately prior to the electrochemical generation of acid step. The applied potential at the electrode is of a sufficient magnitude to convert, e.g. oxidise, the acid precursor to generate a controlled amount of acid. In some embodiments, the potential at the electrode of a sufficient magnitude to oxidise the acid precursor is applied continuously at the electrode (i.e. from the onset and up until the biomineralized $CaCO_3$ particle has completely dissolved). In some embodiments, the potential at the electrode is stepped up until a potential at the electrode of sufficient magnitude to oxidise the acid precursor. The potential may be applied at a fixed value (for example, chronoamperometry), swept continuously as part of a scan (for example, linear or cyclic voltammetry) or may be applied through a series of pulses (for example, square wave or differential pulse voltammetry).

In some embodiments, the controlled amount of acid is electrochemically generated by applying a voltage at the electrode to oxidise the acid precursor or applying a controlled current where the current is modulated by altering the applied potential.

In some embodiments, the oxidative potential of the acid precursor may be from −3 to +3 V versus standard hydrogen electrode. The applied potential may be inside or outside of the electrochemical window of the electrolyte.

In some embodiments, e.g., wherein the acid precursor is dihydroxybenzene or a derivative, the oxidative potential of the acid precursor may be at least 0.1 V to 2 V vs. Ag wire and/or may be from 0.1V to 1.5 V vs Ag. wire or is at least 0.1 V vs Ag. Wire, in some examples, about 0.7 V vs. Ag wire (e.g. the oxidative potential of 1,4-dihydroxybenzene). The oxidative potential may be the oxidative peak seen in a sweep of potential in a voltammetry experiment, which may be as described in the Examples.

The acid precursor may be any species that has two redox states, wherein the acid precursor is provided in a reduced state, and the applied potential at the electrode converts the compound from its reduced state to its oxidized state such that the acid precursor is at least partially protonated in the carrier liquid. In some embodiments, the conversion of the species from its reduced state to its oxidized state is a 2-electron oxidation.

In some embodiments, the acid precursor is a compound that is able to undergo an electrochemically driven proton-coupled electron transfer reaction. In some embodiments, the acid precursor is selected from a hydroxy, an aldehyde, a ketone and an amine. In some embodiments, the acid precursor is selected from hydrogen, ammonia, hydrogen peroxide and water.

In some embodiments, the acid precursor has a $pK_a$ of greater than 7, or greater than 7.5, or greater than 8, i.e., such that the acid precursor is fully protonated at neutral pH.

In some embodiments, the acid precursor is an organic molecule. In some embodiments, the acid precursor comprises a group selected from an aldehyde, a ketone, amine and a hydroxy group. The hydroxy group may be the hydroxy group of an arylhydroxy group, which may be a dihydroxyaryl group, e.g., a dihydroxybenzene. In some embodiments, the acid precursor comprises at least two hydroxyl groups that are substituents on an aryl or allyl group. In some embodiments, the acid precursor comprises at least two hydroxyl groups that are substituents on the same ring in an aryl group; the ring may be a six-membered aryl ring and the hydroxy groups may be positioned ortho, meta or para to one another. In some embodiments, the acid precursor comprises an alpha dihydroxyaryl compound. In some embodiments, the acid precursor is a dihydroxybenzene, an anthraquinone or a catechol.

In some embodiments, the acid precursor is selected from 1,4-dihydroxybenzene (sometimes termed hydroxyquinone), 1,3-dihydroxybenzene (sometimes termed resorcinol), 1,2-dihydroxybenzene (sometimes termed catechol) and substituted derivatives thereof. After oxidation, these acid precursors are converted into 1,4-benzoquinone, 1,3-benzoquinone or 1,2-benzoquinone and their substituted derivatives respectively. The 1,4-dihydroxybenzene, 1,3-dihydroxybenzene, 1,2-dihydroxybenzene may be substituted with any suitable substituent. The substituent can be selected so that it does not affect the oxidation reaction (e.g. is not itself oxidized between a potential of 0V and the potential at which the hydroxy groups of the 1,4-dihydroxybenzene, 1,3-dihydroxybenzene, 1,2-dihydroxybenzene are oxidized). The substituents may be selected from unsubstituted or substituted hydrocarbon substituents, which may be selected from substituted or unsubstituted alkyl, alkylene, alkene, alkyne, aryl and heteroaryl. The substituents may be ring substituents, e.g. forming a ring attached at two points to the C6 ring of the 1,4-dihydroxybenzene, 1,3-dihydroxybenzene and 1,2-dihydroxybenzene. For example, the acid precursor may be selected from 1,4-dihydroxynaphthalene and 9,10-phenanthrene hydroquinone.

In some embodiments, the acid precursor is an inorganic molecule. In some examples, the inorganic molecule may be selected from hydrogen, ammonia, hydrogen peroxide and water.

In some embodiments, the acid precursor is not the carrier liquid (e.g., the acid precursor is not water) and the acid precursor is present in the carrier liquid at a concentration of from 1 μm to 20 mM, or from 10 μm to 20 mM, or from 100 μm to 20 mM, or from 0.5 mM to 20 mM, or from 1 to 20 mM, or from 2.5 to 17.5 mM, or from 5 to 15 mM, or from 7.5 mM to about 12.5 mM, or about 10 mM. In some embodiments, the acid precursor is present in the carrier liquid at a concentration of greater than 1 μm, or greater than 10 μm, or greater than 100 μm, or greater than 0.5 mM, or greater than 1 mM, or greater than 2 mM, or greater than 3 mM, or greater than 4 mM, or greater than 5 mM, or greater than 6 mM, or greater than 7 mM, or greater than 8 mM, or greater than 9 mM. In some embodiments, the acid precursor is present in the carrier liquid at a concentration of less than 50 mM, or less than 40 mM, or less than 30 mM, or less than 25 mM, or less than 20 mM, or less than 19 mM, or less than 18 mM, or less than 17 mM, or less than 16 mM, or less than 15 mM, or less than 14 mM, or less than 13 mM, or less than 12 mM, or less than 11 mM. Use of a known amount of acid precursor may enable the amount of carbonate to be determined using the stoichiometry of the dissolution reaction.

In some embodiments, the acid precursor is 1,4-dihydroxybenzene or a derivative thereof. 1,4-dihydroxybenzene and its derivatives are advantageous because they are highly water soluble allowing the concentration to be tuned as required to alter the timescale of the experiment. "1,4-dihydroxybenzene" as used herein encompasses both the compound 1,4-dihydroxybenzene and derivatives thereof, e.g. a substituted 1,4-dihydroxybenzene as described above. A controlled amount of acid may be electrochemically generated by applying a potential at the electrode of at least 0.7 V, or at least 0.8 V, or at least 0.9 V, or at least 1.0 V (vs. Ag wire), or at least 1.1 V (vs. Ag wire), or at least 1.2 V (vs. Ag wire) at the electrode to oxidise 1,4-dihydroxybenzene. The potential applied may be at or above that of the oxidative potential of the precursor species. The potential applied may be at least 0.1 V (vs. Ag wire) more than the oxidative potential of the precursor species, optionally at least 0.2 V (vs. Ag wire) more than the oxidative potential of the precursor species, optionally at least 0.3 V (vs. Ag wire) more than the oxidative potential of the precursor species, optionally at least 0.4 V (vs. Ag wire) more than the oxidative potential of the precursor species, optionally at least 0.5 V (vs. Ag wire) more than the oxidative potential of the precursor species. For example, for 1,4-dihydroxybenzene, which has an oxidative potential of about +0.7V (vs. Ag wire) under some conditions, applying a potential of at least 0.8V, or at least 0.9V, or at least 1.0 V, or at least 1.2 V ensures that any 1,4-dihydroxybenzene within the immediate vicinity of the electrode is fully oxidised in the carrier medium. In some examples, a potential of at least 1.0V is applied.

In some embodiments, the acid is generated from the carrier liquid. In some embodiments, the carrier liquid is sea-water or estuary water and the acid is electrochemically generated from sea-water or estuary water (i.e. wherein water is oxidised to oxygen). In some embodiments, the acid is electrochemically generated by applying a voltage at the electrode to oxidise water (e.g. sea-water or estuary water) or applying a controlled current where the current is modulated by altering the applied potential. In some embodiments, the potential at the electrode of a sufficient magnitude to oxidise water (i.e. from the onset and up until the biomineralized $CaCO_3$ particle has completely dissolved). In some embodiments, the potential at the electrode is stepped up until a potential at the electrode of sufficient magnitude to oxidise water. In some embodiments, the acid is electrochemically generated from water, which may be seawater or estuary water, which acts as an acid precursor. In some embodiments, the acid is electrochemically generated from water by the reaction $2H_2O-4e^- \rightarrow 4H^+ + O_2$. In some embodiments, the acid is electrochemically generated from water by any process involving the transfer of electrons from water resulting in the formation of partially oxidised intermediates, such as hydrogen peroxide or hydroxyl radicals.

In preferred embodiments, the biomineralized $CaCO_3$ particle is within the diffusion field of the electrode. The extent of the diffusion field of the electrode may be controlled by 1) the diffusion coefficient of the diffusing species, 2) the size of the electrode and/or 3) the time taken for complete dissolution of the biomineralized $CaCO_3$ particle. In some embodiments, the biomineralized $CaCO_3$ particle is 300 microns or less away from the electrode, optionally 200 microns or less away from the electrode, preferably 100 microns or less away from the electrode, or 90 microns or less away from the electrode, or 80 microns or less away from the electrode, or 70 microns or less away from the electrode, or 60 microns or less, or more preferably 50 microns or less away from the electrode. In some embodiments, the biomineralized $CaCO_3$ particle is 40 microns or less away from the electrode, or 30 microns or less, or 20 microns or less, or 10 microns or less, or at the electrode. Such distances may be within the diffusion field of the electrode. In some embodiments, the acid concentration profile can be considered essentially constant over the experimental time of interest. This may make the analysis more facile. In some embodiments, distances closer to the electrode are preferred because the time required to approach a near steady-state mass-transport regime increases progressively with the distance away from the electrode resulting in a delay in the dissolution onset. In some embodiments, the biomineralized $CaCO_3$ particle is at least 5 microns, or at least 6, or at least 7, or at least 8, or at least 9 microns, or at least 10 microns away from the electrode. A minimum distance of the biomineralized $CaCO_3$ particle away from the electrode may ensure a reasonably homogenous distribution of acid around the biomineralized $CaCO_3$ particle. In some examples, the biomineralized $CaCO_3$ particle is between 9 and 70 microns from the electrode. In other embodiments, the biomineralized $CaCO_3$ is placed at or on the electrode (e.g., the biomineralized $CaCO_3$ may have been dropcast onto the electrode). Distance from the electrode referred to herein is defined as the distance from the electrode edge to the biomineralized $CaCO_3$ particle centre. In some embodiments, distance from the electrode is determined by optical microscopy, and this may involve use of suitable software, e.g. Fiji ImageJ freeware. In some embodiments, the distance from the electrode remains constant, or substantially constant as the biomineralized $CaCO_3$ particle dissolves (i.e. the biomineralized $CaCO_3$ particle is stationary or substantially stationary). Substantially constant (and substantially stationary) refers to a distance change of ±1 micron, or ±0.5 micron, or ±0.1 micron and/or not rotating (e.g. for a disc-like particle, e.g. coccolith, not rotating in a plane parallel to the plane of the disc—this may be achieved, for example by the disc-like particle, e.g. coccolith, resting on a flat surface, which is horizontal to the direction of gravity). In some embodiments, the biomineralized $CaCO_3$ particle is not stationery.

In some embodiments, the biomineralized $CaCO_3$ particle may take 10 minutes or less to completely dissolve, or 5 minutes or less, or 120 seconds or less to completely dissolve (i.e. from onset time, i.e., defined the time that voltage is applied to the electrode), optionally 60 seconds or less to completely dissolve, optionally 40 seconds to completely dissolve, optionally 20 seconds or less to completely dissolve, 10 seconds or less to completely dissolve. In some embodiments, the biomineralized $CaCO_3$ particle may take from 0.5 seconds to 10 minutes to completely dissolve (i.e. from onset time, i.e., defined the time that voltage is applied to the electrode), optionally between about 0.5 seconds to 120 seconds to completely dissolve, optionally between 1 second to 20 seconds to completely dissolve, optionally between 1 second to 10 seconds to completely dissolve. In some embodiments, the biomineralized $CaCO_3$ particle may take less than 2 minutes, or less than 1 minute, or less than 30 seconds, or less than 20 seconds to dissolve. The timescales allow reasonably fast, yet accurate, assessment of the amount of carbonate in a particle. The time taken to dissolve may be controlled by the concentration of the precursor in the liquid and the distance of the particle from the electrode.

The method may be performed at any suitable temperature. The temperature may be between −5° C. and 45° C., optionally between 0° C. and 35° C., optionally between 0° C. and 30° C., optionally between 0° C. and 25° C., optionally between 10° C. and 25° C.

In some embodiments, the biomineralized $CaCO_3$ particle is a coccosphere. As described elsewhere herein, a coccosphere corresponds to the outer calcium carbonate shell of a coccolithophore. In such embodiments, the electrochemical generation of acid is used to dissolve the coccosphere. This leaves behind the inner cell/inner biological cell (e.g., the phytoplankton cell) of the coccolithophore.

Electrodes and Housing

The electrode (i.e. the working electrode that is used to generate electrochemically generate acid) may comprise any suitably conducting material, for example, a metal, an alloy of metals, and/or carbon. The electrode may comprise a transition metal for example, a transition metal selected from any of groups 9 to 11 of the Periodic Table. The electrode may comprise a metal selected from, but not limited to, rhenium, iridium, palladium, platinum, copper, indium, rubidium, silver and gold. If the electrode comprises carbon, the carbon may be selected from edge plane pyrolytic graphite, carbon fibre, basal plane pyrolytic graphite, a glassy carbon, boron doped diamond, highly ordered pyrolytic graphite, carbon powder and carbon-nanotubes. In some embodiments, the electrode is a carbon electrode, which may comprise a carbon fibre. The counter electrode and if present the reference electrode may be made from the same materials. "Reference electrode" includes within its meaning herein pseudo-reference electrodes and standard reference electrodes, including, but not limited to, a calomel electrode or a silver/silver chloride electrode.

The working electrode and counter electrode may have any appropriate size. The electrode may be a macro electrode (maximum distance of 1 mm or more across the electrode) or a microelectrode (maximum distance of less than 1 mm across the electrode). For example, the electrode may have a maximum distance across its face of from 1 nm to 10 cm, optionally from 10 nm to 5 cm, optionally, from 100 nm to 1 cm, optionally, from 500 nm to 5 mm, optionally, 1 micron to 1000 microns, optionally from 1 micron to 500 microns, optionally from 1 micron to 50 microns, optionally from about 2 to 10 microns, in an example, about 7 microns. In some embodiments, the working electrode may have a diameter of 3 mm. In some embodiments, the working electrode and counter electrode are of equal size. The working electrode and/or counter electrode may be an elongated electrode, e.g., in the form of a wire or fibre, and the shortest dimension of the elongated electrode (which may be the diameter of the electrode) may be from 1 μm to 100 μm, optionally from 1 μm to 80 μm, optionally from 1 μm to 50 μm, optionally from 1 μm to 30 μm, optionally from 1 μm to 20 μm, optionally from 1 μm to 10 μm. If using a reference electrode, and the working and counter electrodes are elongated, the shortest dimension of the reference electrode may be larger than that of the working and/or counter electrode. If using a reference electrode, and the working and counter electrodes are elongated, the shortest dimension of the reference electrode may be at least 1.5 times larger than that of the working and/or counter electrode, optionally at least 2 times larger than that of the working and/or counter electrode, at least 4 times larger than that of the working and/or counter electrode.

In some embodiments, the electrode (i.e. working electrode) forms part of an electrochemical cell also comprising a reference electrode and optionally a counter electrode. In one embodiment, the cell comprises a carbon-fibre working electrode, a carbon-fibre counter electrode and a metal (e.g. Ag) wire as a reference electrode.

In some embodiments, the electrochemical cell has any suitable geometry. The shape and configuration of the electrode(s) may not be restricted. The electrodes may be in the form of points, lines, rings or flat planer surfaces. In an embodiment, the working electrode and the counter electrode are disposed within a housing. In an embodiment, the working electrode and reference electrode are disposed on the same face of a housing.

In some embodiments, the electrode (i.e. working electrode) is linear and/or elongated, e.g. in the form of a wire or a fibre, e.g. a carbon fibre, i.e., such that the electrode generates a gradient of acid concentration perpendicular to the length of the electrode, and wherein the acid concentration gradient is substantially constant along the length of the electrode at a given distance from the electrode. In some embodiments, a working and counter electrode are disposed within a cell, and both the working electrode and counter electrode are elongated, e.g. in the form of a wire or a fibre, e.g. a carbon fibre, and they are parallel or substantially parallel to one another; in some examples an elongated reference electrode is also provided and is also parallel to the working and counter electrodes.

In some embodiments, the cell comprises a transparent material on at least one side of a housing, e.g. a transparent plate, (e.g. a slide, e.g. glass slide) disposed on one side of the cell. This may allow the particle to be monitored as it dissolves, e.g. by an optical technique, such as optical microscopy and/or fluorescence. This may allow the dimensions of the particle to be observed and recorded as the particle dissolves, as well as the distance of the particle from the working electrode to be determined.

In some embodiments, the housing comprises a flat side, having a flat surface facing the particle and the carrier liquid, and the flat side may be in a substantially horizontal plane during the method (i.e. such that a direction perpendicular to the flat side is parallel to the direction of gravity), such that the particle rests on the flat side and is substantially prevented by gravity from rotating and/or optionally from moving laterally in the plane of the slide; the flat side or a side of the housing on the opposite side of the cell, which may also be flat, may be transparent to allow monitoring of the particle as it dissolves, e.g. by an optical technique. In some embodiments, the working electrode is disposed between the counter electrode and reference electrode in the cell, and optionally all the electrodes are elongated and parallel to one another. By having a flat surface of the housing on which the particle can rest, the electrodes within a housing and at least one transparent side of the housing of the cell, this allows for generation of acid, and then enables the biomineralized $CaCO_3$ particle to be viewed and monitored as it dissolves, while keeping the biomineralized $CaCO_3$ particle stationary or substantially stationary, both in the lateral plane, so it remains a substantially constant distance from the electrodes, and rotationally, so its dimensions can be monitored.

In some embodiments, the electrochemical cell has any suitable size or depth. In some embodiments, the electrochemical cell has a depth (e.g. from one side of the housing to another side of the housing, at least one of which may be a transparent side of the housing) of from 10 micron to 1000 micron, in one example, about 100 micron. The dimensions of the cell perpendicular to the depth (which may be termed length and width) may each independently be from 0.1 cm to 5 cm, optionally from 0.1 cm to 2 cm, optionally from 0.5 cm to 2 cm. In some embodiments, the biomineralized $CaCO_3$ particle is in contact with the electrode, e.g., wherein the biomineralized $CaCO_3$ particle has been dropcast onto the electrode.

Monitoring Dissolution

The dissolution may be monitored using any suitable method. In some embodiments, the dissolution may be monitored using a technique selected from optical microscopy, fluorescence, light scattering, pH, potentiometry and conductivity.

In some embodiments, the dissolution may be monitored optically. In some embodiments, the dissolution may be monitored optically using a technique selected from optical microscopy, fluorescence, or light scattering.

In some embodiments, the optical microscopy may be selected from dark field optical microscopy, phase contrast microscopy, polarised light microscopy and differential interference contrast microscopy.

In some embodiments, the dissolution is monitored by optical microscopy to visualize the biomineralized $CaCO_3$ particle as it dissolves in order to determine its volume, and wherein the amount of biomineralized $CaCO_3$, in terms of its mass, is calculated by multiplying the volume of biomineralized $CaCO_3$ by the density of biomineralized $CaCO_3$. The density may be a known density or an estimated density.

In some embodiments, the volume of the biomineralized $CaCO_3$ particle may be determined by optical microscopy. This may be determined by (i) measuring the 2D area of the biomineralized $CaCO_3$ particle, (ii), determining an effective radius of the $CaCO_3$ particle (e.g., using the equation measured 2D area$=\pi r_{eff}^2$) and (iii) calculating the volume (V) of the $CaCO_3$ particle (e.g., for spherical or approximately spherical $CaCO_3$ particles by using the equation $V=4/3\ \pi r_{eff}^3$). In some embodiments, a surface roughness correction factor ($R_f$) may optionally be applied (i.e., such that the $V=4/3\ \pi r_{eff}^{3}\times R_f$). $R_f$ is described elsewhere herein.

In some embodiments, the $CaCO_3$ particle is a coccosphere (i.e., the outer shell of a coccolithophore). In some embodiments, the volume of the coccosphere may be determined by optical microscopy. This may be determined by (i) measuring the 2D area of the coccolithophore prior to and after dissolution by optical imaging, wherein the coccolithophore comprises an outer calcium carbonate shell (i.e., the coccosphere) and an inner biological cell (ii) determining an effective radius of the coccolithophore prior to and after dissolution (e.g. using the equation measured 2D area$=\pi r_{eff}^2$) and (iii) subtracting the volume (V) of the coccolithophore after dissolution from the volume of the coccolithophore prior to dissolution (e.g., using the equation $V=4/3\ \pi r_{eff}^3$). In some embodiments, a surface roughness factor ($R_f$) may be applied when calculating the volume of the coccolithophore prior to dissolution (i.e., such that the $V=4/3\ \pi r_{eff}^{3}\times R_f$). $R_f$ is described elsewhere herein.

In some embodiments, the amount of $CaCO_3$ in the coccosphere or the PIC content of the coccolithophore is determined by optically determining the time at which the size of the coccolithophore is invariant to the presence of acid (i.e., wherein the coccosphere, or outer shell of the coccolithophore, has completely dissolved). This can give a measure of how long the reaction took, thereby allowing the amount of calcite to be inferred based on the known mass-transport ($J_{MT}$) and interfacial ($J_{surf}$) fluxes. This is described elsewhere herein In an embodiment, the volume of the biomineralized $CaCO_3$ particle is determined by (i) determining the rate of dissolution of the particle in a z direction, in terms of a length or an effective length (e.g. $dr_{eff}$) of the particle dissolved in the direction per unit time, (ii) measuring the 2D area of the biomineralized $CaCO_3$ particle (e.g. in the x-y plane as viewed from a z-direction) by taking a plurality of measurements (which may be from images) at regular time intervals of the particle as it dissolves, and (iii) for each measurement of the 2D area, multiplying the 2D area of the biomineralized $CaCO_3$ by the rate of dissolution and the time interval between each measurement, and (iv) summing the values from (iii) from the initial measurement of the 2D area (as the particle starts to dissolve) to the point that the particle has completely dissolved. As described herein, a length may refer to the longest dimension of the particle or the radius of the particle. The directions x, y and z are perpendicular to one another. This calculates the volume of the biomineralized $CaCO_3$ particle by effectively calculating the volume of each 'slice' of the particle that is dissolved at each time interval, and then summing the volume of the slices together. The determining of the rate of dissolution of the particle in a z direction may be by measuring the rate of reduction of the particle of (in terms of reduction of length per unit time) in a z direction or measuring the rate of reduction (in terms of reduction of length per unit time) of the particle in the x or y direction and assuming this will be the same rate of reduction as in the z direction. The determining the rate of dissolution of the particle in a z direction may be by measuring the area of the particle in the x-y plane at each time interval and converting the area to an effective radius, by a relationship between the area and the effective radius (this may be by assuming the particle is roughly circularly in the x-y plane, and using the formula that area (in x-y plane)=$\pi r_{eff}^2$) and determining the rate of reduction of $r_{eff}$ (in terms of rate of reduction of $r_{eff}$ per unit time, i.e. $dr_{eff}/dt$), optionally at the point of initiation of the dissolution, and assuming this will be the same rate of reduction as in the z direction (and the same until the particle dissolves, so it is used at each time interval). Such methods may be used when the biomineralized $CaCO_3$ particle is a coccolith or coccosphere or wherein the biomineralized $CaCO_3$ particle comprises one dimension that is smaller in length than others.

In some embodiments, the dissolution may be monitored by determining the rate of dissolution (i.e. the initial rate of dissolution from t=0 s) by measuring the difference in a length (e.g. a radius) of the $CaCO_3$ particle in a z direction over time, or by measuring the difference in effective radius of the biomineralized particle in the z direction over time: $dr_{eff}/dt$. If the particle rests on a flat plane, the z direction may be the direction perpendicular the plane. x and y directions may be defined as directions within a plane and perpendicular to z and one another.

In some embodiments, the distance in length of $CaCO_3$ particle in the z direction over time or $dr_{eff}/dt$ can be measured by optical microscopy, for example, dark field optical microscopy or any other suitable optical method as described herein. In some embodiments, $dr_{eff}/dt$ is determined by measuring the 2D area of the biomineralised $CaCO_3$ particle as a function of time (e.g. in the x-y plane as viewed from a z-direction), and wherein the 2D area=$\pi r_{eff}^2$ In some embodiments, the 2D area may be determined by optical microscopy, for example, dark field optical microscopy or any other imaging technique (e.g. as otherwise defined herein). The reaction rate $dr_{eff}/dt$ is found to be essentially constant over the course of the dissolution reaction for a given solution composition.

The 2D area and/or $dr_{eff}/dt$ may be determined by taking a plurality of images over time. In some embodiments, images of the biomineralized $CaCO_3$ particle are taken at a rate of 1 frame per second (fps) to 100 fps, or from 3 ps to 50 fps, or from 5 fps to 25 fps, or from 4 fps to 15 fps, or from 7 fps to 12 fps, or about 10 fps. In some embodiments, the images of the biomineralized $CaCO_3$ particle are taken at a rate greater than 1 fps, or greater than 3 fps, or greater than 5 fps, or greater than 7 fps, or greater than or equal to 10 fps. In some embodiments, the images of the biomineralized $CaCO_3$ particle are taken at a rate less than 100 fps, or less than 50 fps, or less than 25 fps, or less than or equal to 10 fps. The 2D area may be determined by counting the total number of pixels in the image multiplied by the pixel resolution.

In some embodiments, the amount of calcium carbonate is determined by visualizing the biomineralized $CaCO_3$ particle as it dissolves to determine its volume, and wherein the amount of carbonate is calculated by multiplying the volume of biomineralized $CaCO_3$ particle by the density of metal carbonate, e.g. calcium carbonate. In some embodiments, the amount of biomineralized $CaCO_3$ is determined by visualizing the biomineralized $CaCO_3$ particle as it dissolves to determine its volume, and wherein the amount of biomineralized $CaCO_3$ is calculated by multiplying the volume of biomineralized $CaCO_3$ by the density of calcium carbonate The density of metal carbonate or calcium carbonate may be a known density or an estimated density. In some embodiments, the volume of the biomineralized $CaCO_3$ particle is determined by (i) determining the rate of dissolution $d(r_{eff})$/time (e.g. by measuring the length of the biomineralized $CaCO_3$ particle in the z direction over time) (ii) measuring the 2D area of the biomineralized $CaCO_3$ particle (e.g. in the x-y plane as viewed from a z-direction) at different timepoints over time, and (iii) multiplying the 2D area of the biomineralized $CaCO_3$ particle by the rate of dissolution and the time between each timepoint. In some embodiments, the 2D area is measured at different timepoints over time by taking a plurality of images over time, and wherein the volume of the biomineralized $CaCO_3$ particle is determined by multiplying the 2D area of the biomineralized $CaCO_3$ particle with the time between each image. The 2D area may be determined as outlined above.

In some embodiments, the dissolution is monitored chemically by amperometry, potentiometry or conductivity to determine the end of the dissolution process. In such embodiments, the amount of carbonate is determined by the time required for the dissolution to go to completion. For a given cell geometry the time required for the dissolution to go to completion may depend upon the mass/volume of calcite in the particle, the position of the calcite particle in the cell and the rate at which acid is produced at the electrode.

In some embodiments, the end of the dissolution is determined through image analysis. In another embodiment the end of the dissolution is determined by a change in local chemical environment, which may be determined by amperometric, potentiometric or conductivity measurement. In some embodiments, the use of calcite particle of a known size to calibrate the equipment may be employed.

In other embodiments, the dissolution is monitored by an electrical sensing zone device, for example, by monitoring the change of resistance in the device and the change in volume of the biomineralized $CaCO_3$ particle as it dissolves. In some examples, the electrical sensing zone device is a Coulter counter. In some embodiments, the measurement involves a particle traversing through a microchannel or pore of known dimensions and resistivity. An ionic current may be induced across the microchannel and as the biomineralized $CaCO_3$ particle traverses through the channel there is an associated increase in the resistivity across the channel. This increase in resistivity is proportional to the volume of electrolyte excluded by the particle. In one embodiment, the biomineralized $CaCO_3$ particle is induced to dissolve as it traverses through the pore enabling the volume of the biomineralized $CaCO_3$ particle to be directly monitored as it undergoes acid dissolution. The change in resistance may be monitored in the channel as the biomineralized $CaCO_3$ particle traverses. This can be used to determine the change in volume of the biomineralized $CaCO_3$ particle as it dissolves, so as to provide a measure of the initial volume of biomineralized $CaCO_3$ particle. The amount of carbonate, in terms of its mass, can be calculated by multiplying the volume of the biomineralized $CaCO_3$ by the density of metal carbonate, e.g., calcium carbonate. The density may be a known density or an estimated density.

In some examples, electrical sensing zone technology can be used to yield a measure of the volume of the particle. In some examples, the monitoring of the dissolution of the biomineralized $CaCO_3$ particle may involve a technique selected from resistive pulse sensing or the coulter counter method, which may involve a particle traversing through a channel or pore, which may be a microchannel or pore, of known dimensions and resistivity; an ionic current may be induced across the channel or pore, which may be a microchannel or pore, and, as a particle traverses through the channel or pore, there is an associated increase in the resistivity across the channel. This increase in resistivity is proportional to the volume of electrolyte excluded by the particle. A calcite particle can be induced to dissolve as it traverses through the channel or pore enabling the volume of the calcite particle to be directly monitored as it undergoes acid dissolution.

In other examples, a measurement of the amount of carbonate (e.g. the volume) is determined from knowledge of the time taken for the particle to dissolve. For a given cell geometry the time taken for the particle to dissolve will depend upon the mass/volume of calcite in the particle, the position of the calcite particle in the cell and the rate at which acid is produced at the electrode. As a result, from knowledge of the time it takes for the calcite particle to dissolve, amount of carbonate (e.g. the volume of carbonate) can be directly inferred.

Sample Collection

In some embodiments, prior to the electrochemical generation of acid step, the method comprises a step of collecting a sample containing a biomineralized $CaCO_3$ particle. In some embodiments, the sample is collected from seawater or estuary water. In some embodiments, the sample is combined with further the carrier medium prior to the electrochemical generation of acid step. In some embodiments, the sample medium is the carrier medium, and the electrode is placed in contact with the sample prior to the electrochemical generation of acid step (e.g., by dropcasting).

Classification

In some embodiments, the method comprises a step of classifying the biomineralized $CaCO_3$ particle as arising from a particular species of coccolithophore. In some embodiments, the classification may be determined by amount of carbonate in the biomineralized $CaCO_3$ particle and/or the morphology of the biomineralized $CaCO_3$ particle. In some embodiments, the classification may be determined by the amount of the biomineralized $CaCO_3$ particle, length of the biomineralized $CaCO_3$ particle, volume of the biomineralized $CaCO_3$ particle, morphology of the biomineralized $CaCO_3$ particle or a combination thereof.

Measurement of the $CaCO_3$ (PIC), POC and the PIC:POC Ratio in Coccolithophores In some embodiments, the biomineralized $CaCO_3$ particle is a coccosphere (i.e., the calcium carbonate outer shell of a coccolithophore). In some embodiments, the electrochemical generation of acid is used to completely dissolve the coccosphere (i.e., the outer $CaCO_3$ shell, leaving behind the inner biological cell intact or undissolved). In some embodiments, optical microscopy can be used to determine the volume of the coccosphere (i.e., the outer $CaCO_3$ shell of the coccolithophore) by subtracting the volume of a coccolithophore calculated before acid dissolution (i.e., corresponding to the total volume of the coccolithophore, which comprises both the coccosphere outer shell and inner biological cell) and after acid dissolution (i.e., corresponding to the volume of the inner biological cell only). The volume of coccolithophore (i.e., both before and after acid dissolution) can be determined by (i) measuring the area of the coccolithophore by optical measurement and determining an effective radius of the coccolithophore (e.g., using the equation 2D area=$\pi r_{eff}^2$), and (ii) determining the volume of the coccolithophore (e.g., using the equation V=4/3 $\pi r_{eff}^3$). In some embodiments, a surface roughness factor ($R_f$) correction factor is applied when calculating the volume of the coccosphere and/or coccolithophore (i.e., to take account that the coccosphere or coccolithophore is not a perfect sphere) before dissolution. In other words, the volume of the coccolithophore before acid dissolution may be determined by the equation volume=4/3$\pi$ $r_{eff}^3 R_f$ (where $r_{eff}$ is the effective radius measured before dissolution), and the volume of the coccolithophore after dissolution may be determined by 4/3$\pi$ $r_{eff}^3$ (where $r_{eff}$ is the effective radius measured after dissolution). In some embodiments, $R_f$ is between 1 and 6, or any integer between 1 and 6 such as 1, 2, 3, 4, 5 or 6. In some examples, $R_f$ is between 2 and 6, preferably, 4.

The amount of $CaCO_3$ (e.g., the mass of $CaCO_3$) in the coccosphere can be determined from the calculated volume of the coccosphere. This may be as described above (i.e., by multiplying the calculated volume with the density of $CaCO_3$). The amount of $CaCO_3$ in the coccosphere may otherwise be described as the PIC (particulate inorganic carbon) of the coccolithophore. Therefore, the methods described above can also be used to determine the PIC content of a coccolithophore.

In some embodiments, the amount of $CaCO_3$ in the coccosphere or the PIC content of the coccolithophore is determined by $$PIC = \frac{RMM_{CaCO3}}{2} \int_0^{t_{dissolved}} j_{tot}(t).dt$$

wherein $t_{dissolved}$ is the time at which the size of the coccolithophore is invariant to the presence of acid (i.e., wherein the coccosphere, or outer shell of the coccolithophore, has completely dissolved), and wherein $$j_{tot} = \left(\frac{1}{j_{MT}} + \frac{1}{j_{surf}}\right)^{-1}$$

$$\text{and wherein } j_{MT} = 8\pi \ln(2) \left(D_{H_2BQ} D_{H^+}\right)^{0.5} c_{,bulk} \left(r_{sphere}(t)\right)$$

$$\text{and wherein } j_{surf} = 8\pi R_f \left(r_{sphere}(t)\right)^2 k_0 c_{,bulk} \left(D_{H_2BQ}/D_{H^+}\right)^{0.5}$$

wherein D is the diffusion coefficient (mol $m^{-2}$), $c_{H_2BQ,bulk}$ is the bulk concentration of the acid precursor (e.g., but not limited to, hydroquinone ($H_2BQ$)), $r_{sphere}$ is the radius of the particle and is a function of time (t), $k_0$ is the heterogeneous rate constant for acid dissolution of calcite (e.g., 0.043 cm $s^{-1}$ at pH<3) and $R_f$ is the surface roughness of the particle. The $R_f$ may be any suitable value, e.g., as defined elsewhere herein.

In some embodiments, methods described herein comprise determining or further determining the particulate organic carbon (POC) of a coccolithophore, said coccolithophore comprising a coccosphere (i.e., an outer calcium carbonate shell) and an inner biological cell. The POC may be determined by calculating the volume of the coccolithophore after acid dissolution of the coccosphere. The volume of the coccolithophore after dissolution can be determined by optical microscopy, by measuring the area of the coccolithophore after dissolution, determining the effective radius ($r_{eff}$) of the coccolithophore after dissolution (e.g., using the equation $A=\pi r_{eff}^2$) and calculating the volume of the inner biological cell (e.g., using the equation $V=4/3\pi r_{eff}^3$). In some embodiments, a surface roughness factor may be applied as is described elsewhere herein. The POC may be determined by the equation $$POC = 0.109\ V^{0.991}$$

wherein V is the volume of the inner biological cell (e.g., phytoplankton cell of the coccolithophore) in $\mu m^3$.

In some embodiments of the methods described herein, the method further comprises determining or calculating a PIC:POC ratio. The PIC and POC may be as determined as defined above.

The mass of carbon sequestered by coccolithophores, either the particulate inorganic carbon and/or particulate organic carbon, termed PIC and POC respectively, and optionally the ratio of PIC:POC (i.e., the 'rain-ratio), can provide crucial information to feed into global models of the carbon cycle for accurate assessment of the impacts of anthropogenic change. The present method importantly enables quantification of the PIC content bioaccumulated by living coccolithophores in the present marine environment. This approach is improved over other reported methods for measuring the PIC content such as x-ray nanotomography or focused ion beam combined with SEM, since other reported methods are more complex, time-consuming and expensive.

In some embodiments of the methods described herein, the method can be used to monitor the growth or determine the growth phase of a living coccolithophore.

Apparatus

According to a second aspect of the present invention, there is provided an apparatus to determine the amount of carbonate in a biomineralized $CaCO_3$ particle, the apparatus comprising a cell containing electrodes wherein the cell is configured to hold a carrier liquid containing biomineralized $CaCO_3$ and optionally an acid precursor;

and the apparatus is configured to:

electrochemically generate a controlled amount of acid at an electrode in a carrier liquid, wherein the biomineralized $CaCO_3$ particle is also present in the carrier liquid, wherein the acid diffuses from the electrode and then reacts with the biomineralized $CaCO_3$ particle, such that it starts to dissolve, and, monitor the dissolution of the biomineralized $CaCO_3$ particle until it has completely dissolved to determine the amount of carbonate in the biomineralized $CaCO_3$ particle.

The biomineralized $CaCO_3$, carrier liquid, electrode, cell and acid precursor may be as described for the first aspect. The apparatus may be configured to carry out the method described in the first aspect. The apparatus may contain a device to monitor the dissolution of the biomineralized $CaCO_3$ particle by optical microscopy, fluorescence, light scattering, pH, potentiometry and conductivity.

In some embodiments, (i.e., in use) the apparatus comprises the carrier liquid, biomineralized $CaCO_3$, and optionally the acid precursor.

In some embodiments, the apparatus is hand-held. In other embodiments, the apparatus is a benchtop device.

In some embodiments, the apparatus comprises an optical microscope. The optical microscope is configured to monitor the dissolution of the biomineralized $CaCO_3$ particle by taking a plurality of images of the biomineralized $CaCO_3$ particle as it is dissolving. In some embodiments, the apparatus comprises a transparent plate, e.g., a glass slide, which may form a wall of a housing of an electrochemical cell. The sample may be placed in the cell, such that it can be viewed through the transparent plate to allow the acid dissolution of biomineralized $CaCO_3$ particles to be imaged during the experiment, and the transparent plate may, in use, be disposed above or below the biomineralized $CaCO_3$ particle and the carrier liquid. In some embodiments, the apparatus further comprises a darkfield condenser (i.e. for darkfield microscopy), e.g. an oil-immersion darkfield condenser. In some embodiments, the apparatus further comprises a light source. In some embodiments, the apparatus further comprises a laser (e.g. for use in fluorescence or light scattering).

In some embodiments, the apparatus comprises an electrical sensing zone technology to yield a measure of the volume of the particle. The electrical sensing zone technology may be capable of resistive pulse sensing or carrying out the coulter counter method. The electrical sensing zone may comprise a channel or pore of known dimensions and resistivity, which may be a microchannel or pore, such that is allows a particle to traverse through the channel or pore. The apparatus may allow an ionic current to be induced across the channel or pore and, as a particle traverses through the channel, there is an associated increase in the resistivity across the channel. This increase in resistivity is proportional to the volume of electrolyte excluded by the particle. A biomineralized $CaCO_3$ or calcite particle can be induced to dissolve as it traverses through the pore enabling the volume of the biomineralized $CaCO_3$ or calcite particle to be directly monitored as it undergoes acid dissolution.

In other examples, the apparatus allows a measurement of the biomineralized $CaCO_3$ particle or calcite particle volume to be determined from knowledge of the time taken for the particle to dissolve. For a given cell geometry the time taken for the particle to dissolve will depend upon the mass/volume of calcite in the particle, the position of the calcite particle in the cell and the rate at which acid is produced at the electrode. As a result, from knowledge of the time it takes for the calcite particle to dissolve, the volume and amount of calcite can be directly inferred.

In some embodiments, the apparatus further comprises a computer program which is configured to (i) electrochemically generate a controlled amount of acid at an electrode in a carrier liquid and/or (ii) monitor the dissolution of the biomineralized $CaCO_3$ particle until it has completely dissolved to determine the amount of carbonate in the biomineralized $CaCO_3$ particle.

In some embodiments, the computer program may be configured to determine the volume of the biomineralised $CaCO_3$ particle, e.g., using a plurality of images as described herein.

EXAMPLES

In the following examples, biomineralized $CaCO_3$ particles (e.g. both a suspension of detached coccoliths and coccospheres) are placed in an electrochemical cell, and a controlled amount of acid is generated local to the biomineralized $CaCO_3$ particles as shown in the schematic in FIG. 1 (right). The resulting controlled dissolution of the biomineralized $CaCO_3$ particles can be monitored as the dissolution proceeds to complete "titration" of the calcium carbonate content. The calcite dissolution kinetics can be used to infer the amount of calcium carbonate in the biomineralized $CaCO_3$ particles.

Example 1

In one example, the calcite dissolution can be monitored optically. This also allows shape and size information to be inferred, which is related to the aggregate of bio-mineralized calcite crystals which constitute the biomineralized $CaCO_3$ particle.

Figure 2:
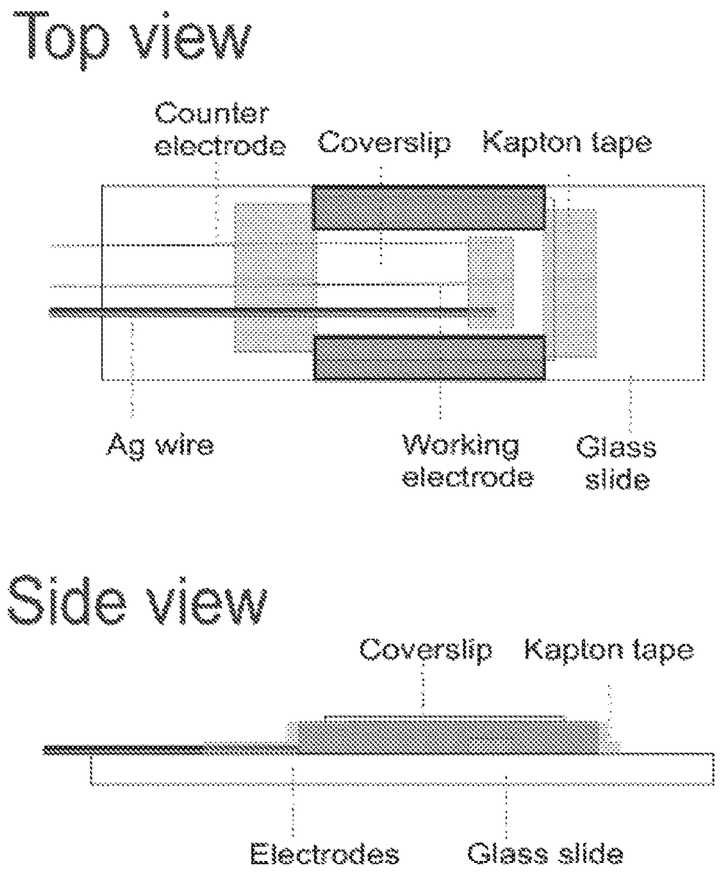
FIG. 2 provides a schematic of an example opto-electrochemical cell. The cell has three electrodes: a working, counter and reference electrode. The working and counter electrode are carbon fibre wires ($r_e$=3.5 μm), whereas the reference is an Ag wire electrode ($r_e$=25 μm). The cell depth is approximately 100 μm.

Example 1A: Opto-Electrochemical Method Determining Calcite Dissolution of a Coccolith More specifically in a first Example, a plankton sample containing coccoliths was mixed with a tiny quantity of electroactive acid precursor (10 mM 1,4-dihydroxybenzene, $H_2BQ$), the sample placed in a thin-layer electrochemical cell and the individual coccolith was monitored by dark-field optical microscopy. The thin-layer electrochemical cell consists of a three-electrode setup, including two carbon fibre electrodes which act as working and counter electrodes (diameter, 7 μm) and a third electrode, a silver wire (diameter 50 μm, Goodfellow Cambridge Ltd.) is used as the pseudo-reference electrode in a cell volume of approximately 1 cm×1 cm×100 μm (FIG. 2). The opto-electrochemical cell is built on top of a glass slide to allow the acid dissolution of individual coccoliths to be imaged during the experiment. The cell depth is roughly 100 μm. Potentiostatic control and synchronization with the camera were provided by a previously developed in-house built device (C. Batchelor-McAuley et al., *Analyst,* 2015, 140, 5048-5054) and current-amplifier (Keithley 427) from Keithley Instruments Inc, US.

Figure 3:
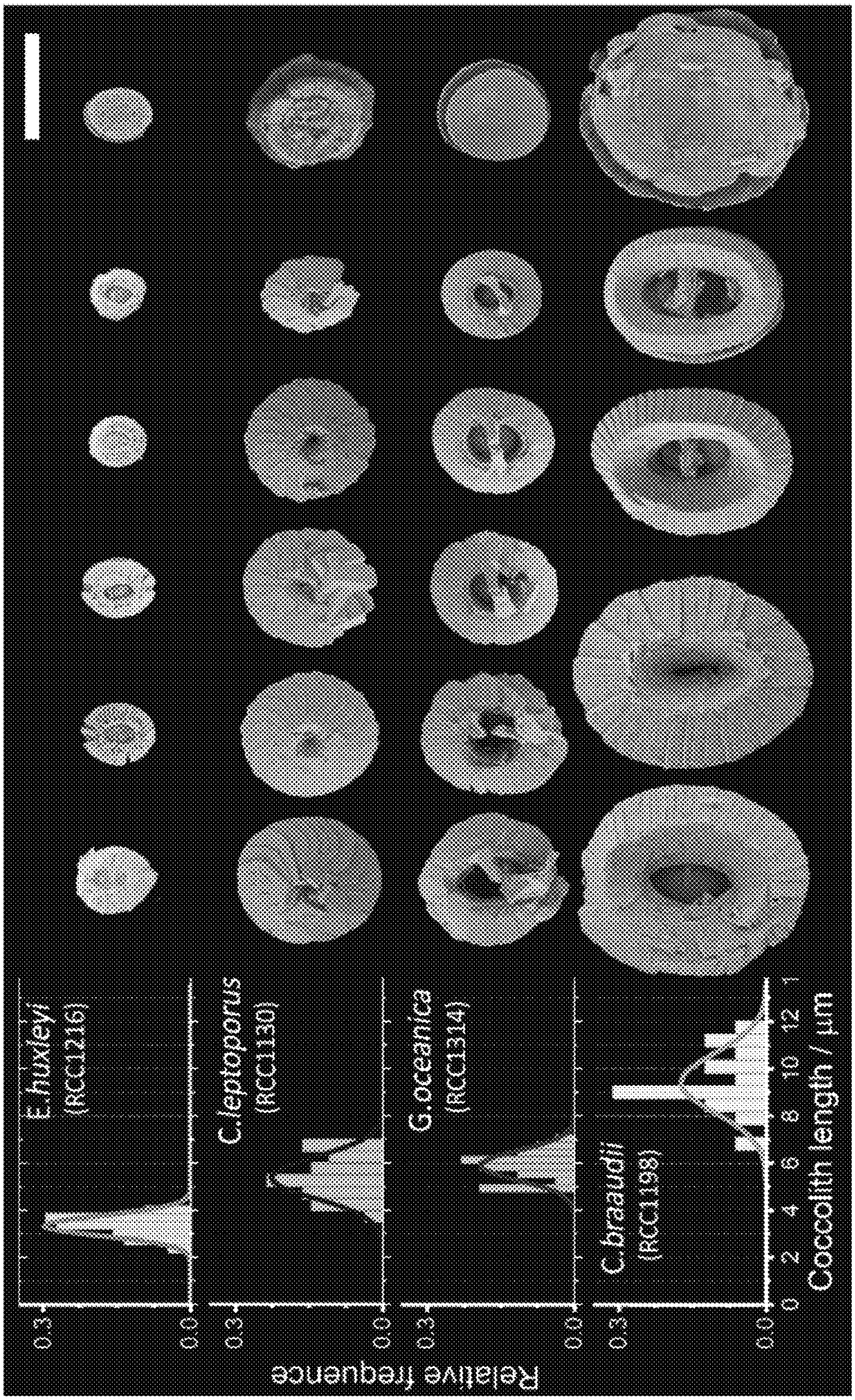
FIG. 3 shows SEM images of detached coccoliths from four species of coccolithophores used in the Examples of this application, namely: *Emiliania huxleyi, Calcidiscus leptoporus, Gephyrocapsa oceanica* and *Coccolithus pelagicus* subsp. *braaudii*. The histograms on the left show the distribution of coccolith lengths as measured from SEM images. Scale bar=5 μm.

Placoliths are quasi-spherical to elliptical in shape, where the shape is specific to the speciation of the coccolithophore as seen in FIG. 3. The overall rate of dissolution of a *C. braaudii* coccolith, in this example, could therefore be inferred by an assessment of the changes in the 'effective radius' with time, where $\pi r_{eff}^2$ is the equivalent projection area of the coccolith. This effective radius can be determined from the thresholded images and can be plotted against time, as shown in FIG. 4*b*). Two regimes for the coccolith dissolution in FIG. 4*b*) are outlined by red lines; a slow initial rate ($dr_{eff}/dt=0.056\ \mu m\ s^{-1}$) followed by a 'rapid' loss of material ($dr_{eff}/dt=0.95\ \mu m\ s^{-1}$) as the reaction completes ($r_{eff}=0$). This change in the optically measured dissolution rate was observed to be a general feature of coccolith dissolution under these conditions. Appendix section 4 presents further example dissolution transients all sharing the same qualitative dissolution behaviour. Hence, as the coccolith is dissolved, the apparent dissolution rate increases rapidly towards the end of the reaction as the coccolith thickness decreases to a point at which it is no longer identifiable in the optical image.

$CaCO_3$ Dissolution Kinetics in Strong Acid

Figure 5:
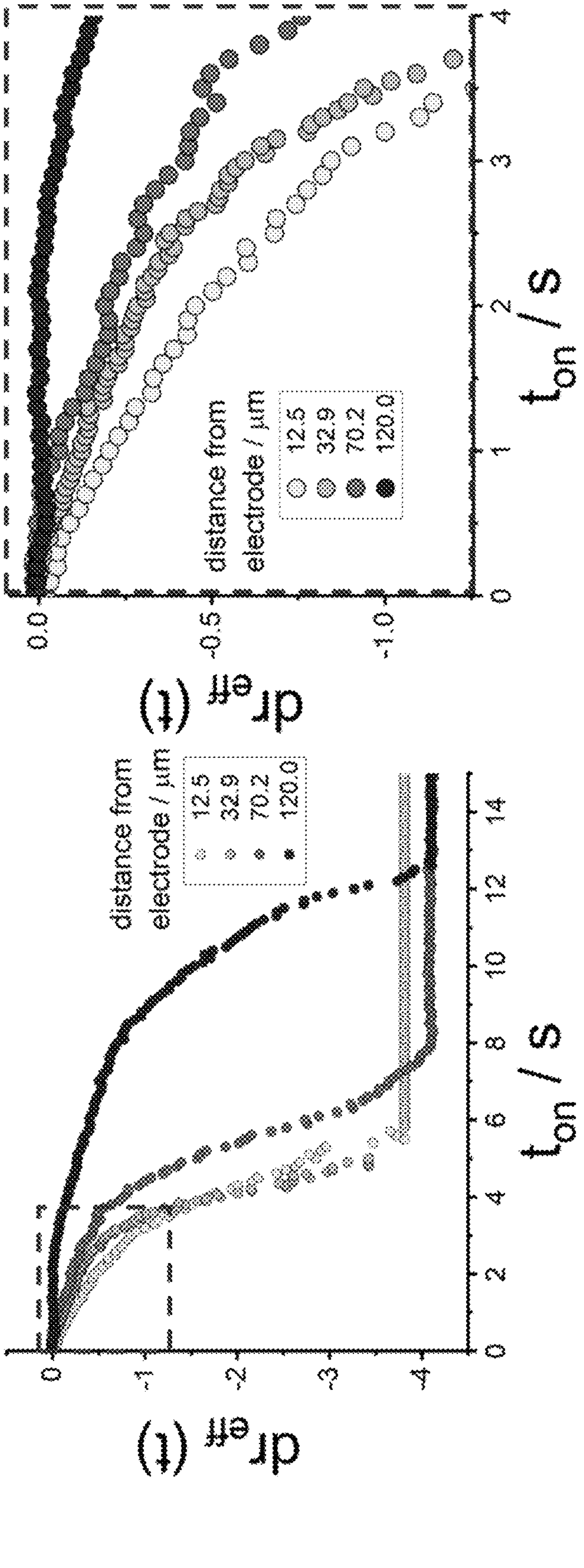
FIG. 5 shows a plot of the change in the effective radius ($dr_{eff}$) of *C. braaudii* coccoliths during the opto-electrochemical experiments in 0.1 M $KNO_3$ electrolyte. The distance of the coccolith from the electrode is shown in the legend. The y-axis plots the change in relative to that at $t_{on}$=0 s, allowing the gradient to be directly compared for intra-species variation in coccolith size.

Experiments were conducted to determine how the distance of the particle from the electrode affected the dissolution rate. The initial dissolution rate of coccoliths was seen to decrease with an increase in distance of the coccolith from the electrode, as detailed further in the Appendix section 4 below. Close to the electrode (ca. 70 μm) the dissolution starts almost immediately after the start of the proton generation (onset/potential switched on) and the dissolution rate $dr_{eff}/dt$ is linear over the time range of 0-3s. For larger electrode to lith distances, progressively longer 'lag time (s)' are observed. A ca 2.5s delay before the onset of coccolith dissolution was seen at a coccolith distance of 120 μm from the electrode (FIG. 5).

Figure 6:
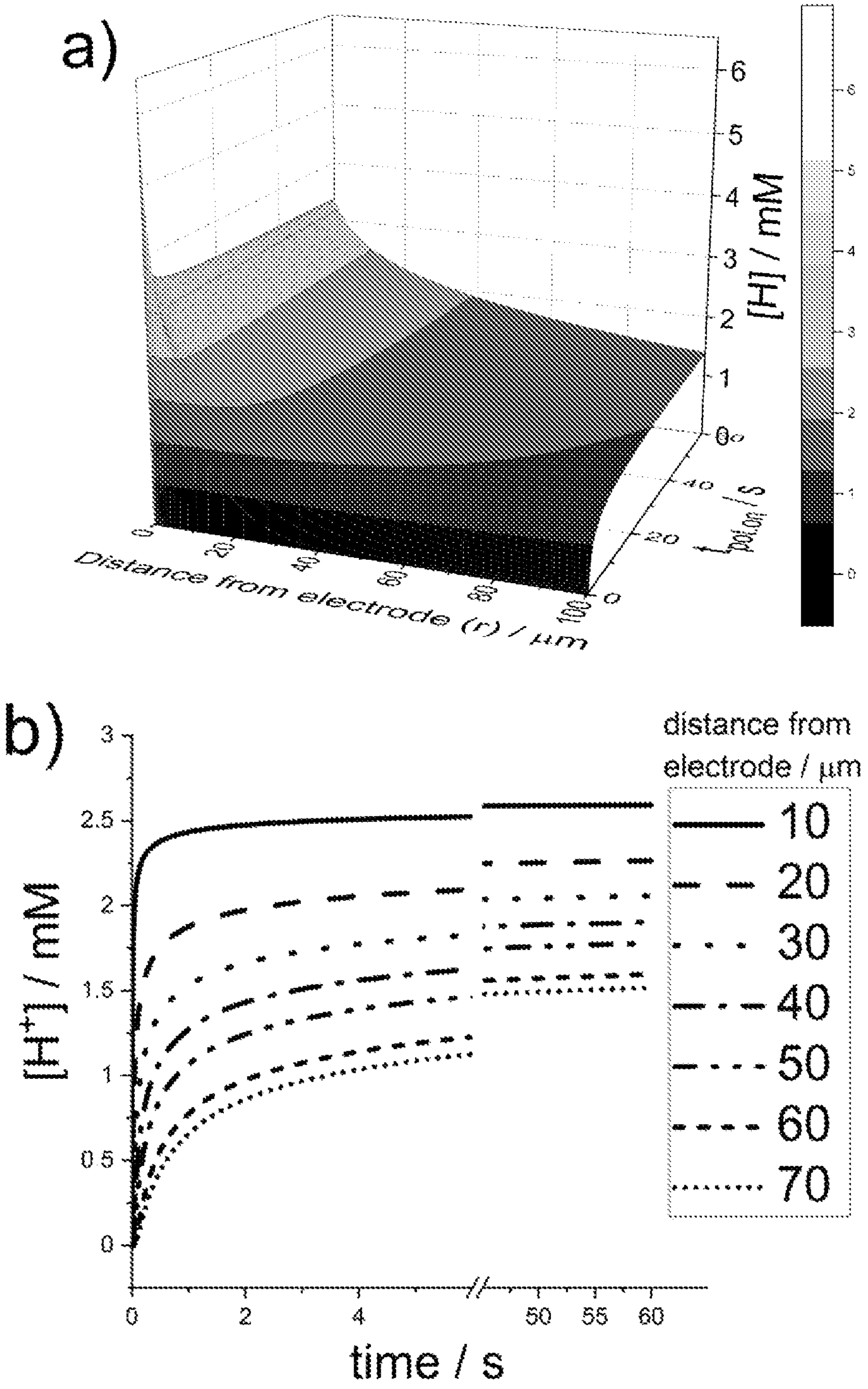
FIG. 6 shows a plot of proton concentration profile as a function distance away from the cylindrical electrode ($r_e$=3.5 μm), at different time in the simulation. b) line plots of individual [H](t) profile at different distances from the cylindrical electrode. Other simulation parameters are as follows: $[H_2BQ]_{bulk}$=10 mM, $D_{H2BQ}$=1.2×$10^{-9}$ $m^2s^{-1}$, $D_H$+=7.4×$10^{-9}$ $m^2s^{-1}$.

Oxidation of 10 mM of $H_2BQ$ leads to the formation of a ca. millimolar concentration of protons generated at the electrode interface, resulting in a highly acidic chemical environment (pH<3) local to the wire electrode. The acid, $H^+$, diffuses radially outward. The proton concentration profile varies both as a function of time t and distance x from the electrode $[H^+](x, t)$ and is modelled in Appendix section 5. In the vicinity (~50 μm) of the electrochemical interface, a near steady-state mass-transport regime is established within ~1 second, shown in FIG. 6. The time required to approach this regime increases progressively with the distance away from the electrode resulting in a delay in the dissolution onset. This explains experimental observations of a 'time lag' in the dissolution of coccoliths at a long distance from the electrode (see FIG. 5), in which as noted above a finite time is required for protons to diffuse hundreds of microns from the electrode. Hence, under the present conditions and to a good approximation, although the proton concentration varies as a function of the distance from the wire, within a distance of 70 μm from the electrode, as evidenced in FIG. 6 and FIG. 7, the unperturbed acid concentration profile can be considered essentially constant over the experimental time of interest.

When a coccolith is exposed to acid, the calcium carbonate is dissolved in accordance with the following reaction;

$$CaCO_3(s) + H^+(aq) \xrightarrow{k_1} Ca^{2+}(aq) + HCO_3^-(aq) \quad \text{(Eq. 1)}$$

$$HCO_3^-(aq)+H^+ \rightleftarrows H_2CO_3(aq) \quad \text{(Eq. 2)}$$

$$H_2CO_3(aq) \rightleftarrows H_2O(l)+CO_2(g) \quad \text{(Eq. 3)}$$

where $k_1$ is the heterogeneous rate constant as defined by flux=$k_1[H^+]$. A value of $k_1$ equal to 0.043 cm $s^{-1}$ has previously been reported for the dissolution of a macro-sized Icelandic Spar (calcite) crystal at pH<4, measured in a buffer-free electrolyte solution. For an isolated $CaCO_3$ particle the rate-determining step for the dissolution reaction may either be the rate of diffusion of protons to the mineral interface or the surface reaction rate depending on $k_1$ and the size of the $CaCO_3$ particle. For a smooth and solid (non-porous) calcium carbonate particle, this switch in the kinetic regime occurs at a particle radius of ~10 μm. Appendix section 6 simulates the effect of surface roughness of calcite particles on the dissolution kinetics when exposed to strong acid. The surface area of a coccolith is higher compared to a smooth and non-porous calcite particle of the same radius. This causes the switch in kinetic regimes to occur at a slightly lower particle radius for coccoliths. A typical *C. braaudii* coccolith has a thickness of 1-2 μm and $r_{eff}\approx 5$ μm. Due to the small dimensions of the coccolith, 1-5 μm when viewed as a calcite disc, the reaction kinetics remains in the surface reaction limited regime so that the mass-transport of protons to the particle is fast and not rate-determining. Thus $[H^+]_{surface}\approx[H^+]_{solution}$.

Previous literature reporting the value of $k_1$ were conducted under idealized conditions (1.0 M KCl) which do not reflect the ionic composition of seawater.

The following experiments sought to elucidate to what extent other components of seawater alter the dissolution kinetics.

Effects of the Chemical Components of Seawater on Dissolution Rates

The data first measured and presented in FIG. 4*b*) was measured in the K/2 growth medium. This growth medium contains a variety of salts, trace metals, minerals and a carbonate buffer as tabulated in the Appendix (see Table A1). It was therefore determined to what extent these constituents might influence the coccolith acid dissolution rate. To this end, the coccoliths were transferred to electrolytes of differing composition. Two primary factors must be considered when assessing the calcite dissolution kinetics in seawater are i) the influence of $Mg^{2+}$ on the surface reaction rate and ii) the role of the carbonate buffer. Accordingly, individual detached coccoliths (*C. braaudii*) were therefore additionally optical monitored in solutions separately containing i) 0.7 M $KNO_3$, ii) 0.7 M $KNO_3$ and 54.6 mM $Mg^{2+}$ and iii) 0.7 M $KNO_3$ and 2.4 mM $HCO_3^-$. From the thresholded images an effective particle radius was extracted as a function of time. Under all conditions, the plot of particle effective radius versus time again exhibited two distinct linear regimes where the initial rate (μm $s^{-1}$) directly reflects the calcite dissolution kinetics under the prevailing conditions. On the basis of the known distance of the coccolith from the electrode it is possible to compare this initial dissolution rate to that calculated for a smooth, solid and non-porous calcite particle of the same size dissolved in an ionic solution of 0.7 M $KNO_3$. FIG. 4*c*) plots the measured initial coccolithophore dissolution rates relative to the calculated rate for a smooth and solid particle. Opto-electrochemical dissolution of detached *C. braaudii* coccoliths in 0.7 M $KNO_3$, revealed an initial dissolution rate 6.5(±2.5) times faster than that predicted for a similarly sized 'smooth' calcite particle at equal distances from the electrode (see 2*c*)). This increase of ~6 in the dissolution rate as compared to that seen for smooth-surfaced particles reflecting the surface roughness of the bio-excreted coccolith; the dissolution rate is proportional to the calcite surface area and this enhancement of ~6 is consistent with reports in the literature for the roughness of comparable coccoliths. Performing a similar dissolution experiment with the addition of 54.6 mM $Mg^{2+}$, which correspond to the $Mg^{2+}$ level in seawater, leads to the dissolution rate changing to a relative dissolution rate of 4.5(±1.7). Furthermore, the separate addition of bicarbonate (2.4 mM) to the system decreases the dissolution rate to give a relative dissolution rate of 3.8(±1.7). Clearly, the presence of the bicarbonate anion in solution, $pK_a$ ($H_2CO_3$) =6.3, serves to partially "titrate" away a fraction of the electrogenerated protons to form its conjugate acid $H_2CO_3$ (aq) (see above) which chemically decomposes to form $H_2O$(I) and $CO_2$(aq). Hence the removal of the protons from the system leads to a concomitant decrease in the dissolution rate of coccoliths. Finally, experiments conducted in the phytoplankton culture medium, K/2, shows a relative dissolution rate of 2.9(±1.0), which is approximately a factor of two lower than that compared for a coccolith in 0.7 $KNO_3$. Since the two ions, $HCO_3^-$ and $Mg^{2+}$, serve to decrease the dissolution kinetics via non-competing mechanisms (solution phase titration and surface inhibition), within error, the decreased dissolution rate in the K/2 medium predominantly reflects the presence of the bicarbonate and magnesium ions with the effects adding to each other.

The initial calcite dissolution rate is sensitive to the composition of the ionic solution used, and due to the size of the coccoliths, the reaction is limited by the kinetics of the surface reaction. The reaction rate $dr_{eff}/dt$ is essentially constant over the course of the dissolution reaction for a given solution composition.

The following section demonstrates how this particular reaction rate can also be used to infer the thickness of the coccolithophore and hence provide a measurement of the volume of individual coccoliths.

Extracting Coccolith Volume from Dissolution Kinetics

Figure 8:
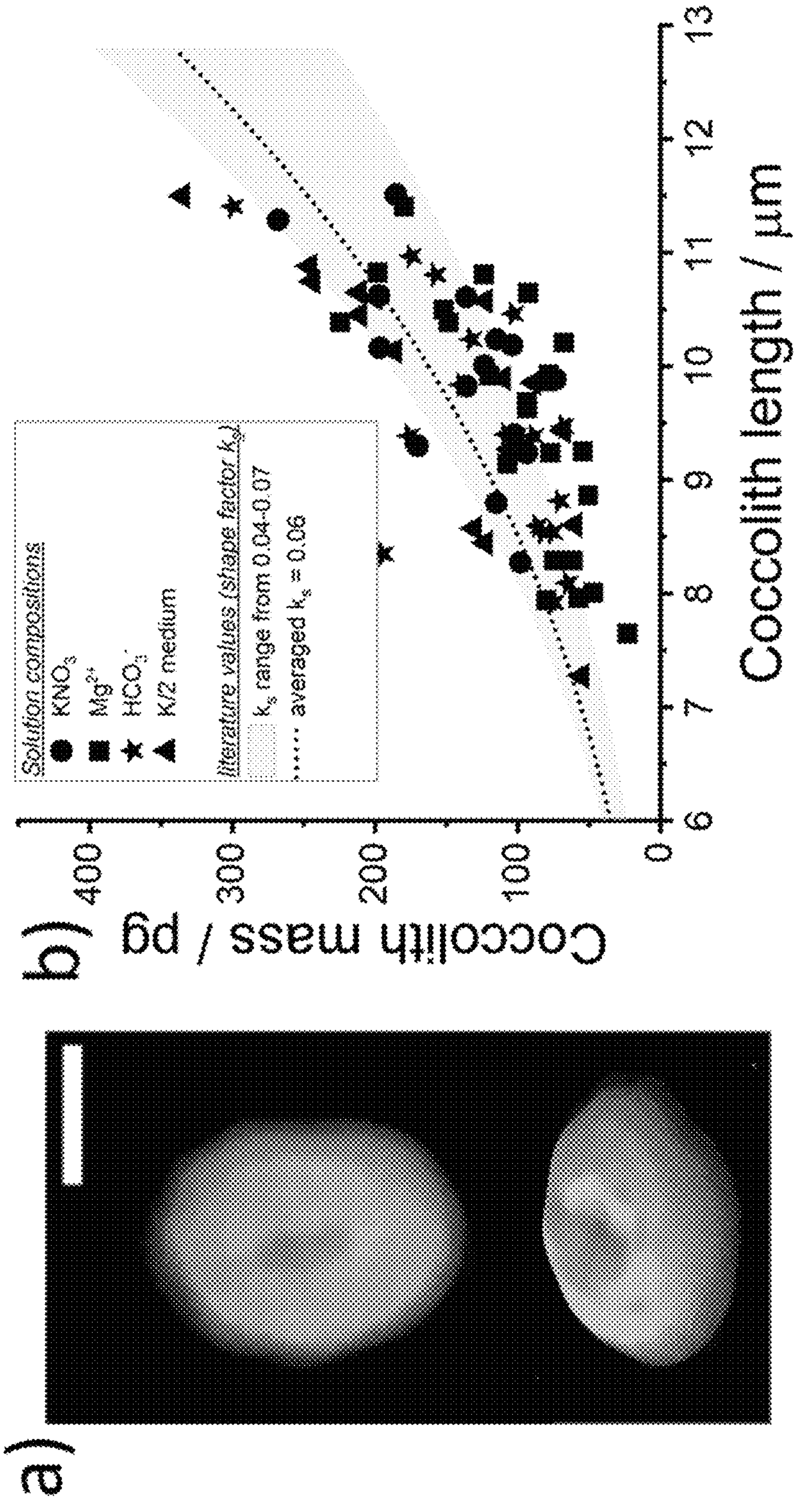
FIG. 8 shows 8A) The reconstructed representation of the *C. braaudii* coccolith dissolved in the example opto-electrochemical experiment, with K/2 growth medium as electrolyte and 10 mM $H_2BQ$ acid precursor. The temporal evolution of this coccolith during dissolution is shown in FIG. 4*a*) with an initial dissolution rate of 56 μm $s^{-1}$ as shown in FIG. 4*b*). Scale bar=5 μm. 8B) A scatter plot showing the estimated mass of *C. braaudii* coccoliths in various electrolytes, all with 10 mM of $H_2BQ$ acid precursor added prior to the experiment. The coccoliths within a distance 10-70 μm from the electrode were analyzed. The overlaid black dotted line is the estimation of coccolith mass using the recommended shape factor ($k_s$) of 0.06 and shade is the range of $k_s$ values (0.04-0.07) reported by Young et. al (Young, J. R. *Deep Sea Research Part II: Topical Studies in Oceanography* 47, 1679-1700 (2000))

In the opto-electrochemical cell, the coccolith is exposed to an electrochemically generated acid environment $[H^+](x, t)$ and the dissolution reaction occurs almost uniformly across the surface of the coccolith. In the surface-area controlled kinetic regime, the rate of mass transport is fast and at an electrode distance larger than the coccolith length, the proton concentration at the side/rim of the coccolith is no different to that on the top of the coccolith. Therefore, the initial dissolution rate as obtained from the orthographic projection of the coccolith, $dr_{eff}/dt$, is equal to d(thickness)/dt where thickness relates to the shortest dimension of the lith and so controls the rate. This rate is expected to vary between liths (both intra- and inter-species) and to further be sensitive to the prevailing chemical environment. However, for the purpose of lith volume measurement a key fact is that the dissolution rate is limited by the rate of the surface reaction (as opposed to mass-transport). Consequently, this rate is essentially constant during the course of the dissolution, due to the quasi-steady-state proton concentration arising from the cell geometry—see Appendix Sections 5 and 6. Knowledge of the initial rate enables the thickness of the calcite to be determined on a per-pixel basis. The volume of individual coccoliths can be determined by iterating through the stack of images, building on a pixel-by-pixel basis, to render the final volume of coccolith. FIG. 8*a*) depicts an example of such a 3D model of an individual coccolith where the volume was reconstructed from a series of images taken during the course of the dissolution process, shown in FIG. 4*a*).

The method of volume extraction used is independent of the conditions under which it has been measured, as the initial dissolution rate is used to directly infer the particle thickness from the time to full dissolution. From the reconstructed individual coccolith volumes, it is therefore possible, assuming a given lith calcite density, to convert the volume to a coccolith mass. FIG. 8*b*) plots the mass of individual *C. braaudii* coccoliths as measured in the four different electrolyte solutions (separated by level of shading); different symbols of the same level of shading represent data obtained from repeated experiments. Notice that the reconstruction is independent of the chemical composition of the electrolyte as diverse solutions are used to generate FIG. 8*b*). The initial dissolution rate of a coccolith is dependent on the difference in electrolyte chemical composition, the distance of coccoliths from the electrode, and less importantly, the intra-species variation in coccolith surface roughness and morphology. Since the volume reconstruction process uses the initial dissolution rate as measured, this internally "calibrates" for all of the effects discussed above so that the result is independent of the numerous variables. However, of course, the faster the initial dissolution rate, the quicker the coccolith dissolves and the fewer images there are for the volume reconstruction. The mean mass of *C. braaudii* coccoliths across all four of the electrolyte studied is 0.122(±0.064) ng, sample size=81, which is in excellent agreement with literature values. The latter was overlaid as shade and the dotted black line in FIG. 8*b*.

Figure 9:
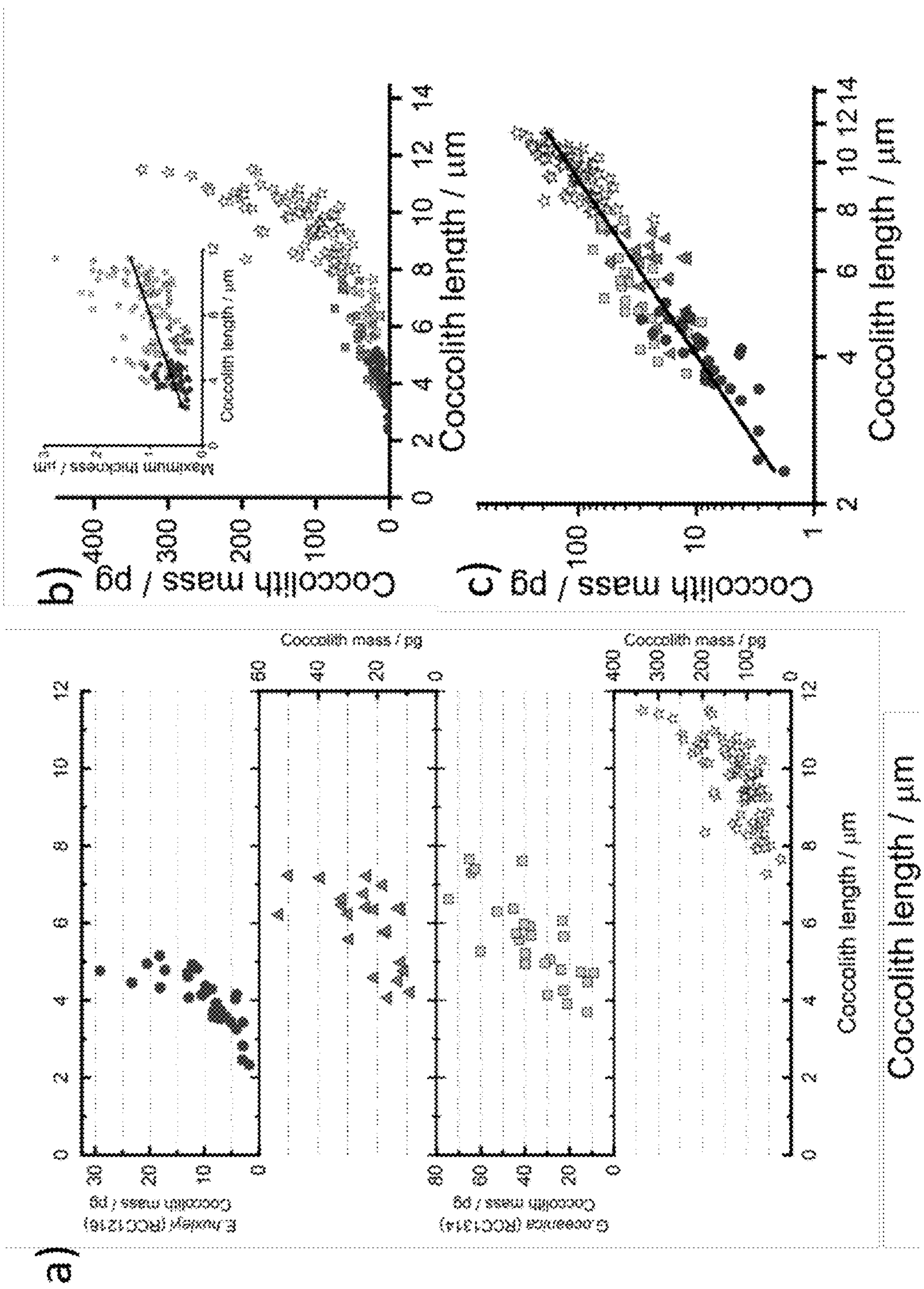
FIG. 9 shows: 9A) Coccolith mass estimated for individual coccoliths from four different coccolithophore species; 9B) Collective estimated coccolith mass against coccolith length. Inlay: the maximum thickness of coccolith from image reconstruction, Pearson's r=0.58; and 9C) Collective mass plotted on a logarithmic scale. Circles: *E. huxleyi* (RCC1216), triangles-*C. leptoporus* (RCC1130), squares—*G. oceanica* (RCC1314) and stars—*C. braaudii* (RCC1198). Line of best fit over all data: slope=2.78±0.09 and Pearson's r=0.94. The data for *E. huxleyi, G. oceanica* and *C. leptoporus* were measured directed from their respective culturing medium with added 10 mM $H_2BQ$ acid precursor, whereas those for *C. braaudii* is the collective data from all four electrolytes as seen in FIG. 4*d*).

Having evidenced the technique using coccoliths detached from *C. braaudii*, this technique was demonstrated with other coccoliths. FIG. 9 shows the inferred coccolith mass from three additional species of coccolithophore—*E.*

*huxleyi, C. leptoporus* and *G. oceanica*. The opto-electrochemical dissolutions were conducted in their corresponding culturing media, with the addition of 10 mM $H_2BQ$ acid precursor prior to the experiment. The coccolith mass is seen to generally increase with coccolith length inter-species. The average coccolith mass for *E. huxleyi, C. leptoporus* and *G. oceanica* are 10.2(±6.5), 23.6(±12.1) and 37.0(±17.8) picograms (pg) per lith, respectively. *E. huxleyi* (RCC1212) and *G. oceanica* (RCC1314) were previously studied via birefringence polarised light approach and 3-D X-ray coherent diffraction imaging; the reported mass of *E. huxleyi* coccoliths were ca. 1-6 pg for coccolith lengths between 2 to 4 μm, and the *G. oceanica* coccoliths are ca. 5-30 pg for coccolith lengths between 4 to 6 μm. (Beuvier, T. et al; *Nature communications* 10, 1-8 (2019)). Compared to the coccolith mass obtained via image reconstruction, good agreement are seen within the overlapping range of coccolith lengths.

Figure 10:
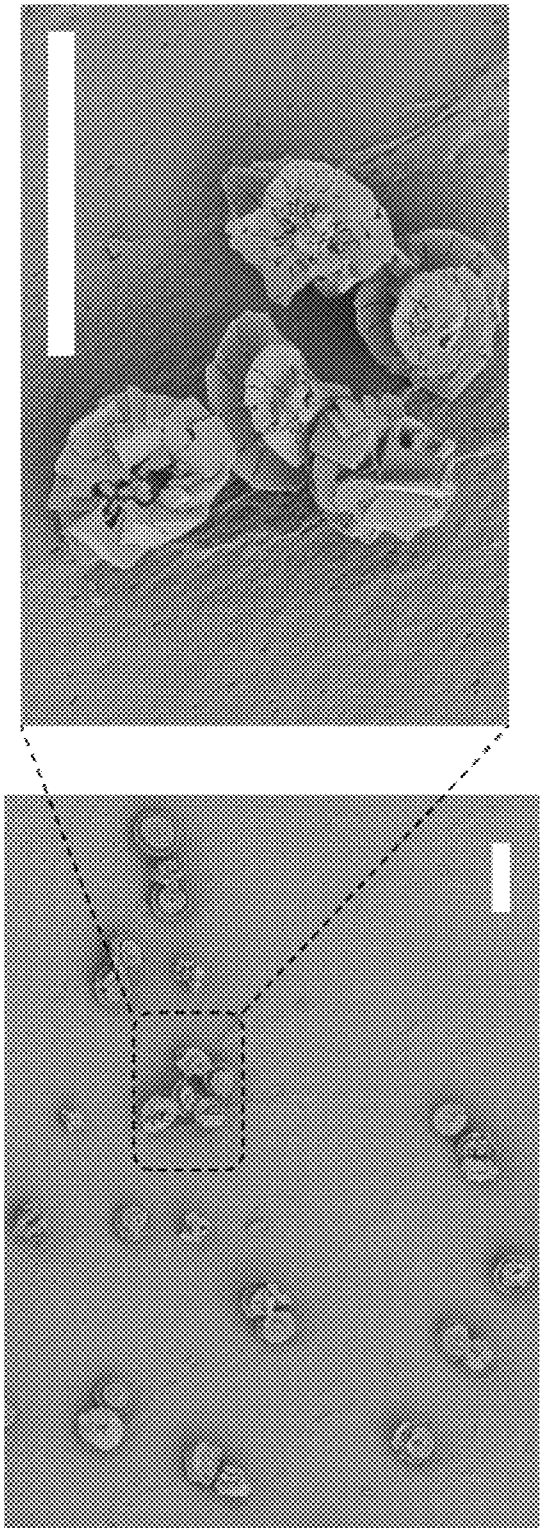
FIG. 10 shows SEM images of coccoliths detached from *C. leptoporus*, indicating the presence of some deformed coccoliths. Scale bar=10 μm.

Variation in the coccolith length range in the sample, and the proportion of malformed/broken coccolith, may be due to variations in different culturing conditions and/or experiments conducted at different stages during the coccolithophore lifecycle. The size range of the *C. leptoporus* coccoliths herein (4-7 μm) is small as compared to those generally reported by Young et. al. from sediment samples (5-11 μm, average mass=74.1 pg). Moreover, as shown in FIG. 10, SEM images revealed a large proportion of the *C. leptoporus* coccoliths in this study are either malformed or broken, which may concatenate with the small size distribution leading to an underweight average coccolith mass of 23.6 pg. FIG. 9*b*) shows the collective coccolith mass data showing the relationship of coccolith mass versus coccolith length that exists in both intra-species and inter-species, leading to a linear logarithmic plot as shown in FIG. 9*c*) with a slope equal to 2.8 (±0.1). From this, one can infer the coccolith mass, both intra- and inter-species, varies broadly with the coccolith length cubed. However, as is consistent with the literature and can be seen from the inset of FIG. 9*b*), the correlation between the measured thickness the coccolith length is low (Pearson's r value of 0.58). (Linge Johnsen, S. A., Bollmann, J., Gebuehr, C. & Herrle, J. O. *PloS one* 14, e0220725 (2019)) This present example shows that in situ electrochemical dissolution of coccoliths with simultaneous in situ optical image analysis allows the volume and mass of individual coccoliths to be estimated. The dissolution of coccoliths in a strongly acidic environment occurs under a kinetic regime controlled by the particle surface-area; within this regime, the rate of change in the projection area of the coccolith during dissolution is directly proportional to the rate of change in the coccolith thickness. This allows the coccolith to be reconstructed from the time-stacked 2D images, to provide an estimate of coccolith volume on a pixel-by-pixel basis.

The opto-electrochemical approach uses the initial rate of coccolith dissolution, inferred from $d(r_{eff})/dt$. It therefore internally calibrates all factors that may affect the dissolution rate; these include: the surface roughness of the coccolith, the distance of the coccolith from the electrode, the presence of inhibitors for calcite dissolution. Since the analysis is performed on an individual coccolith basis, it does not rely on using a quantity statistically averaged over, for example, large sediment samples (e.g. shape factor, $k_s$). Therefore, the coccolith mass estimated herein could in principle account for sample abnormalities such as those that include a large proportion of deformed, partially dissolved, or broken coccoliths. An opto-electrochemical method can also discriminate coccoliths from suspended sediments, which cannot be done in an operational manner using conventional remote sensing approaches and thus holds the potential to provide new insight into the presence of coccolithophores in the carbon pool of coastal waters, using in situ samples.

Unlike previous birefringence methods which have a detection limit in the greyscale limited to a theoretical maximum of 1.56 μm and also require a cylindrical rhabdolith to calibrate intensity with thickness; the above approach involving electrochemical generation of acid and calcite dissolution kinetics provides a facile and improved alternative due to the calibration-free approach and has no in-principle limitation to the thickness of calcite particle nor the crystalline orientation of calcites in the coccolith. Such an opto-electrochemical method can also be used to probe volumes of larger coccoliths, as evidenced by the *C. braaudii* coccoliths, and for coccospheres as demonstrated below.

Example 1A: Opto-Electrochemical Measurement of Coccospheres

Calcite dissolution kinetics can also be used to determine the amount of a much larger coccosphere. Also using the exemplary opto-electrochemical method detailed above, FIG. 11A demonstrates the electrochemical induced dissolution of a *E huxleyi* coccosphere (left) and a detached *E huxleyi* coccolith (right). This species of coccolithophore (*E huxleyi*) bears ~40-50 individual coccoliths.

Figure 11:
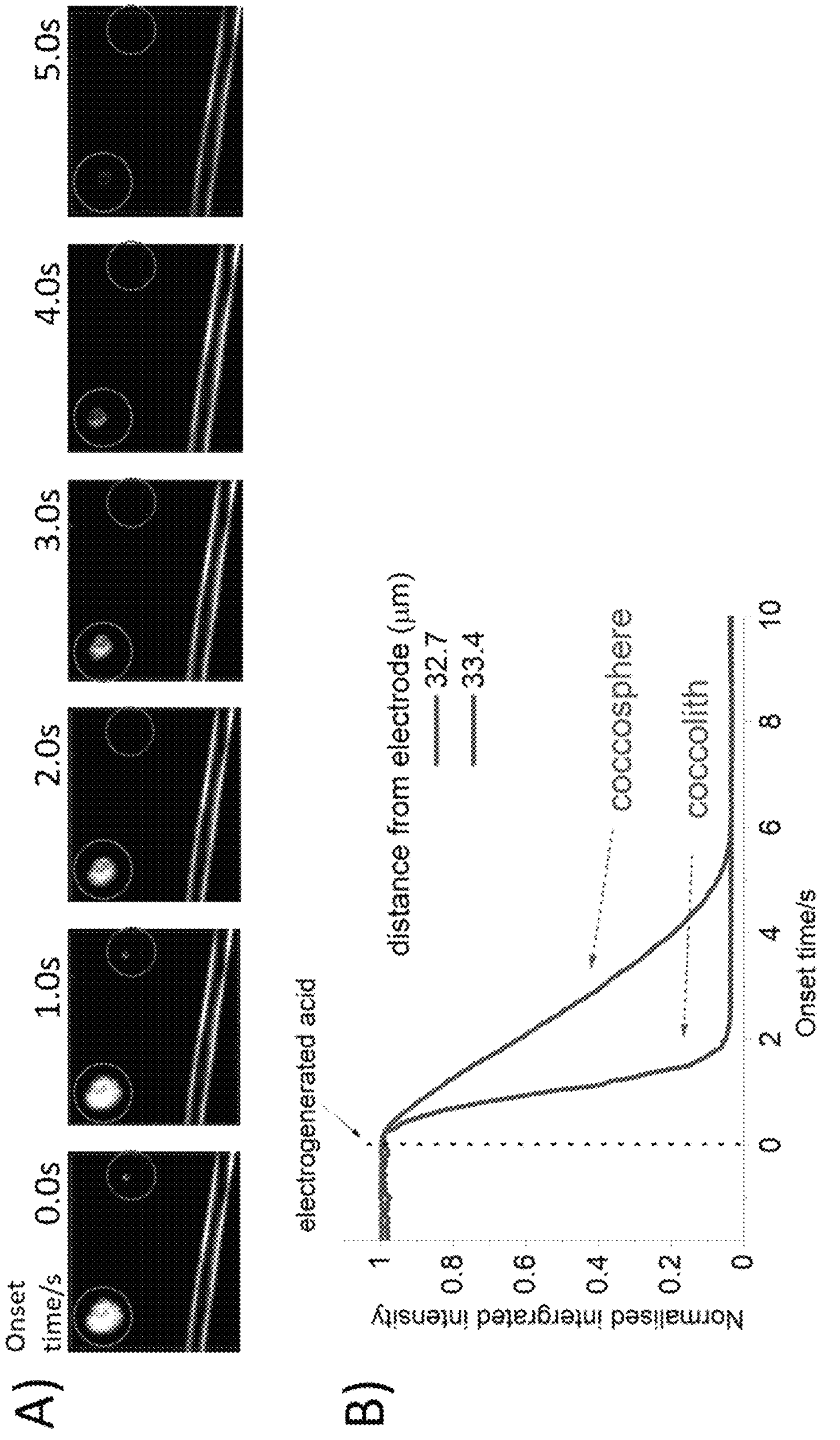
FIG. 11 shows: 11A the complete dissolution overtime of a coccosphere (left) and a coccolith (right) by electrogenerated acid; and 11B) normalised integrated intensity of the biomineralized $CaCO_3$ as a function of time.

Both the coccosphere and the coccolith were arranged approximately equidistant from the electrode, and 10 mM of $H_2BQ$ was oxidised at the electrode to generate acid in situ. As shown by FIG. 11A, both the coccolith and coccosphere can be completely dissolved by the electrogenerated acid.

Example 2

In a different example, electrical sensing zone technology can be used to yield a measure of the volume of the particle. This technique is also known as resistive pulse sensing or the coulter counter method. The measurement involves a particle traversing through a microchannel or pore of known dimensions and resistivity. An ionic current is induced to occur across the microchannel and as a particle traverses through the channel there is an associated increase in the resistivity across the channel. This increase in resistivity is proportional to the volume of electrolyte excluded by the particle. A calcite particle can be induced to dissolve as it traverses through the pore enabling the volume of the calcite particle to be directly monitored as it undergoes acid dissolution.

In other examples, a measurement of the calcite volume is determined from knowledge of the time taken for the particle to dissolve. For a given cell geometry the time taken for the particle to dissolve will depend upon the mass/volume of calcite in the particle, the position of the calcite particle in the cell and the rate at which acid is produced at the electrode. As a result, from knowledge of the time it takes for the calcite particle to dissolve, the volume and amount of calcite can be directly inferred.

Example 3: Further Optochemical Experiments to Determine the Amount of $CaCO_3$ in Coccospheres which can be Used to Determine the PIC and POC Content of Coccolithophores The following example involves experiments that utilize electrochemistry to induce acid dissolution of three coccolithophores species revealing their biomineralized calcium carbon contents ($CaCO_3$, PIC (particulate inorganic carbon)) on a single-entity basis. The three exemplified species are *Emiliania huxleyi, Gephyrocapsa oceanica* and *Coccolithus pelagicus* subsp. *braarudii*. By dissolving away the $CaCO_3$ via electrogenerated acid with optical imaging, a range of cellular properties are extracted on a single-entity basis: plankton size before and after complete acid dissolution revealing the shell thickness and size of the underlying biological cell, PIC/$CaCO_3$ content of the calcareous shell and an estimation of the PIC:POC ratio (i.e., the particulate inorganic content:particulate organic content ratio). These experiments are conducted at different parts of the growth curve to reveal the variation of the above-mentioned properties due to the change in physiology.

Figure 17:
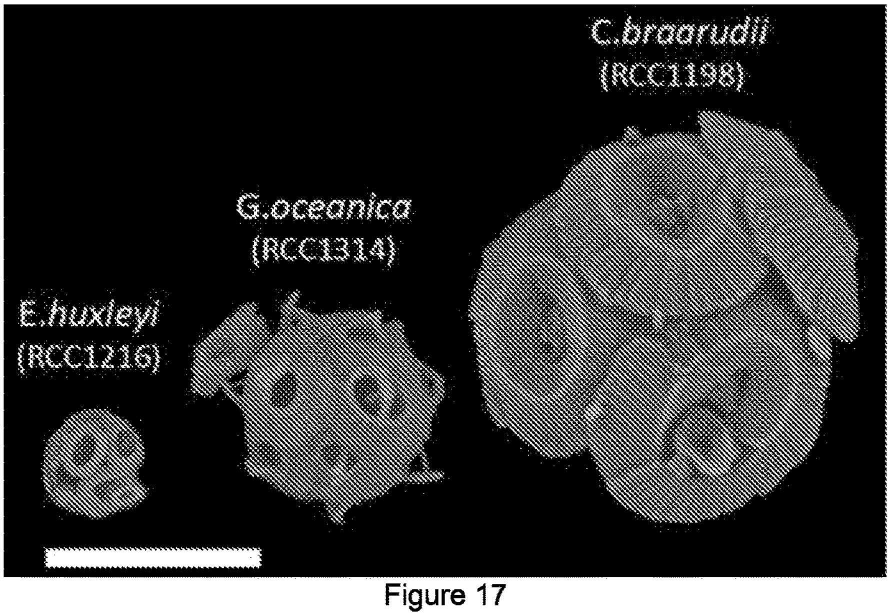
FIG. 17 shows grey-scale SEM images of *E. huxleyi, G. oceanica* and *C. braarudii* coccosphere at day 9 of incubation. Scale bar=10 μm.
Figure 18:
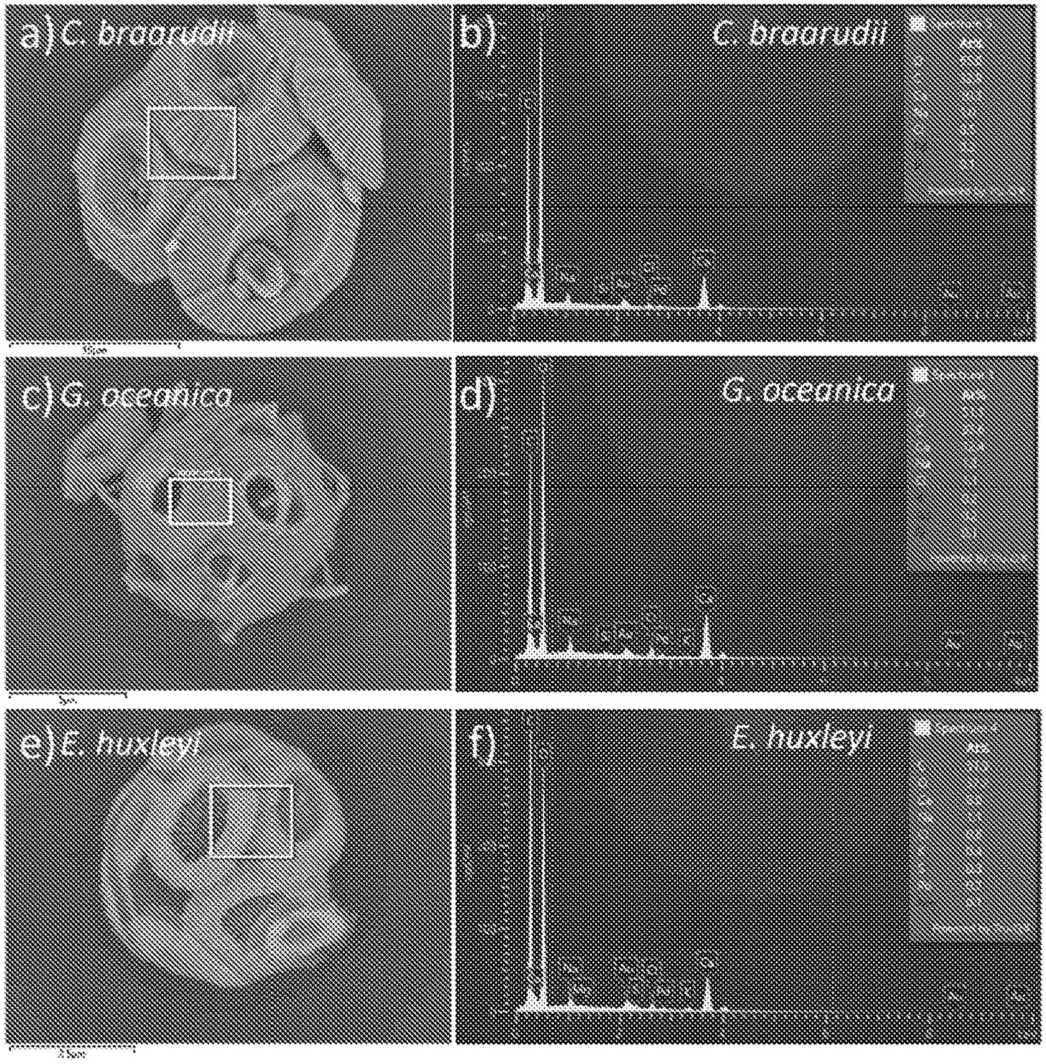
FIG. 18 shows the element analysis of *C. braarudii, G. oceanica* and *E. huxleyi* coccosphere. a, c and e) are SEM images of the coccolithophore. The scale bar can be found at the bottom-left of each of the images. b), d) and f) shows the EDX spectrum and the element distributions. The region of the EDX integration is represented by the white rectangle shown in the corresponding SEM image.

FIG. 17 shows representative SEM images of the three species of coccolithophores at day 9 of growth. The largest of the three species, *C. braarudii*, measures 20 mm in diameter whereas *E. huxleyi* is approximately 4 times smaller with a diameter of around 5 mm. Moreover, from the SEM images, one can see that on an individual coccolith level, not only the size differs from one species to another, but there is also a change in both the morphology and 'solidity' of the coccoliths produced. FIG. 18 shows the surface elemental mapping of the three coccolithophores using energy-dispersive X-ray microscopy (EDX). A relatively high ratio atom percentage of carbon (35%) and oxygen (53%) was measured to that of calcium (10%) for pure $CaCO_3$. However, this ratio is not reflective of the entire coccosphere as EDX rays penetrate only microns below the surfaces. The high ratio of measured carbon and oxygen signal, compared to that expected from $CaCO_3$, therefore reflects the polysaccharide present on the surface of coccoliths, which is reported to account for less than 3% of the coccolith by mass.

To estimate the total PIC content of the coccospheres, at the crudest level one might assume the coccosphere is a solid 'ball' of calcite and upscale the measured radius (r) obtained via SEM or other imaging techniques, by the density of calcite ($\rho$=CaCO3=2.71 g $cm^{-3}$)

$$PIC = \frac{4}{3}\pi r^3 \rho_{CaCO_3}$$

This, however, over-estimates the $CaCO_3$ mass because first the underlying biological cell is particulate organic carbon (POC) and should be separated from PIC calculation. Second, due to the nature of interlocking coccoliths the unfilled voids are not accounted for, and third, coccoliths are not perfect discs and therefore the volume of each disc is smaller than a short cylinder of the same geometric size. To overcome these challenges, we instead dissolve away the calcareous shell by generating acid controllably via electrochemistry whilst imaging the changes in the coccolithophore via in situ optical imaging.

Figure 19:
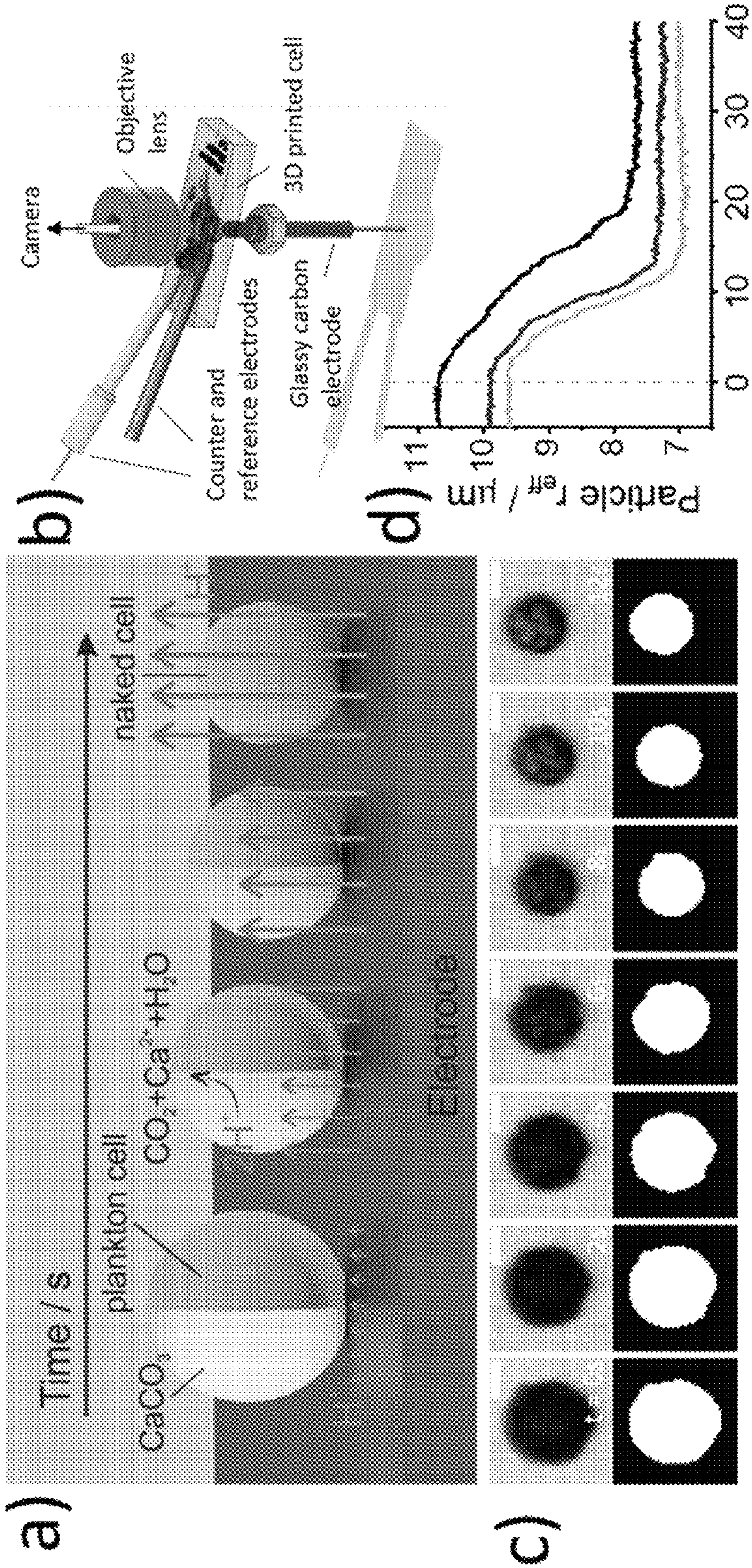
FIG. 19 shows a) A schematic image depicting the electrogenerated acid dissolution of a coccosphere. Initially, a coccolithophore cell is stationary on the surface of an electrode. At the start of the experiment a ca. millimolar level concentration of electrogenerated acid is formed at the electrode interface to dissolve off the $CaCO_3$ shell revealing the underlying biological cell which is inert to acid dissolution. b) Schematic diagram of the 3D-printed opto-electrochemical cell. Coccolithophores were dropcasted onto the glassy carbon electrode prior to the opto-electrochemical experiment. c) Optical images of an individual *C. braarudii* undergoing acid dissolution. At t=0, a potential of +1.0V vs SCE is applied to the glassy carbon electrode bathed in an aqueous solution containing 10 mM of hydroquinone $H_2BQ$ (aq), 20 mM $CaCl_2$ and 0.7 M KCl. The top row shows the optical images as recorded by the camera from a top-down view. The bottom row of images is those after image thresholding which are used to calculate the effective particle radius (reff=$(area/\pi)^{0.5}$). Scale bar=10 μm. d) A plot of the effective particle radius as a function of potential onset time for three representative *C. braarudii* individuals. Each line represents a single *C. braarudii* cell.

FIG. 19*a* illustrates the physicochemical processes that occur in such opto-electrochemical experiments. A coccolithophore residing on the electrode is exposed to electrogenerated acid which reacts with the calcareous shell of the coccolithophore leading to the full dissolution of the latter revealing the underlying 'naked' inner biological cell. Under strong acid conditions, acid dissolution of calcite goes to completion and consumes two stoichiometric equivalents of protons:

$$CaCO_3(s)+2H^+(aq)\rightarrow Ca^{2+}(aq)+CO_2(g)+H_2O(l) \quad \text{(Eqn 4)}$$

FIG. 19*b* shows the 3D-printed cell in which the opto-electrochemical experiments were conducted. The 3D-printed cell facilitates a three-electrode setup with a reaction chamber approximately 1 $cm^3$ in volume and is discussed further in the Appendix section below. Synchronised optical images of the coccolithophores are taken following the switch-on of the electrochemical proton formation revealing the dissolution of each coccosphere present on the electrode surface to allow single-entity measurements to be made. Kinetic information is inferred by monitoring the shrinkage of the $CaCO_3$ shell and allows the total PIC content of the coccosphere to be calculated, as discussed below. The size of the 'naked' coccolithophore cell also provides an estimate for the particulate organic carbon (POC) content, as will also be discussed below.

Prior to the electrochemical dissolution, coccolithophore samples were dropcasted onto the glassy carbon electrode (diameter=3 mm). The surface of the electrode acts as a supporting substrate for the coccolithophores and also as a mean for electrochemically generating acid. The solution chamber was then filled with 0.7 M KCl inert electrolyte with 20 mM $Ca^{2+}$ and millimolar concentrations of hydroquinone (2 mM for *G. oceanica* and *E. huxleyi*, and 10 mM for *C. braarudii*). 20 mM of $Ca^{2+}$ was used to reduce the dissolution of biogenic calcite prior to the start of the experiment, (further discussed in the Appendix section below) and hydroquinone was used as an example acid precursor which releases two stoichiometric equivalents of protons when electrochemically oxidised at the electrode interface.

Shown in FIG. 19*c* are optical images of a representative *C. braarudii* coccosphere undergoing electrochemically induced acid dissolution with 10 mM of hydroquinone. The top row of images shown in FIG. 19*c* are raw images obtained directly from the camera and the bottom row are those after image thresholding which is used to calculate the effective radius of the coccosphere during the experiment, assuming a perfect circle (area $\pi r_{eff}^2$, where $r_{eff}$ is the radius of a circle of equivalent area to the image of the coccolithophore). An anodic potential of +1.0 V vs. saturated calomel electrode (SCE) was applied to the working electrode to initiate the release of a local concentration of approximately millimolar of H+. As can be seen in FIG. 19*c*, within tens of seconds of the acid generation, the calcium carbonate shell of the coccolithophore is seen to dissolve completely to reveal the underlying 'naked' biological cell, which remains undissolved. The cell-wall composition of the 'naked' cell is typically cellulose or similar polysaccharide based. The change in the effective coccolithophore radius, $r_{eff}(t)$, is plotted in FIG. 19*d* for three representative *C. braarudii* coccospheres studied after 9 days of growth (see Appendix for further information regarding cell cultures). The effective coccosphere radius, $r_{eff}$, is seen to decrease quasi-linearly as a function of time after the generation of acid until it reaches a constant value of around 7-8 mm. It is clear that the decrease in coccolithophore size is associated with the acid-dissolution of biogenic calcite (i.e., the coccosphere) and the underlying biological cell is 'inert' to acid attack over the timescale of this experiment. On the most basic level, the $r_{eff}(t)$ transients provide direct physiological properties of the coccolithophore, size with and without the shell.

Figure 20:
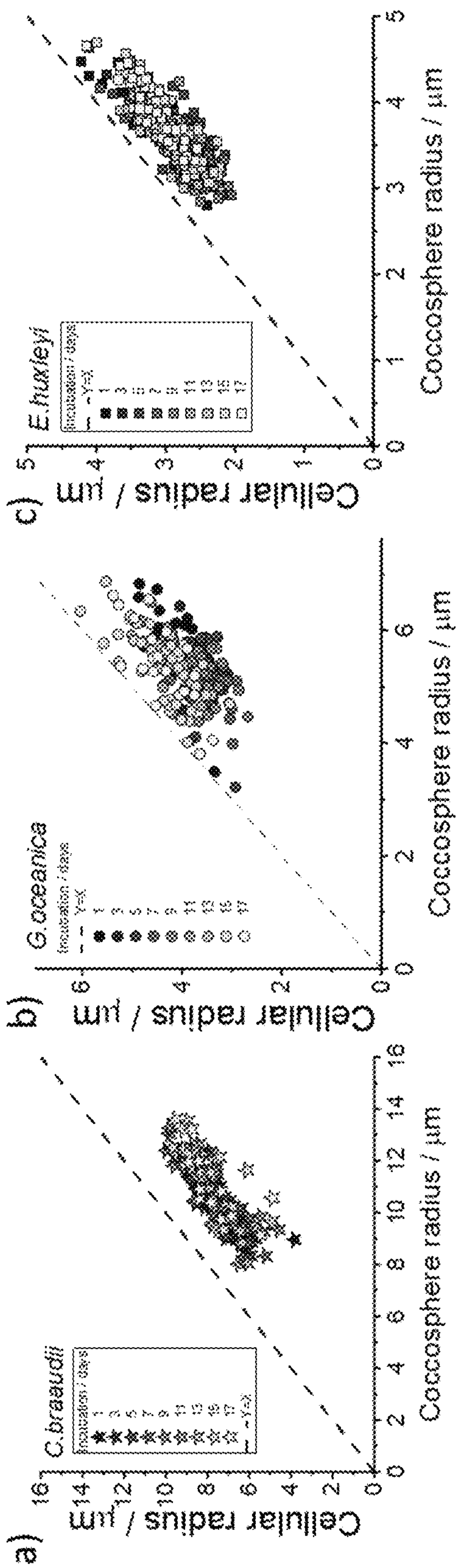
FIG. 20 shows the effective radius of coccolithophores after complete acid dissolution plotted against that prior to acid dissolution. Speciation of coccolithophores: a) *C. braarudii*, b) *G. oceanica* and c) *E. huxleyi*. The dotted line represents the y=x line corresponding to no $CaCO_3$ shell. The grey-scale of the symbols represent days of growth, from day 1 (black) to day 17 (white). The electrolyte contains 10 mM of hydroquinone $H_2BQ(aq)$, 20 mM $CaCl_2$ and 0.7 M KCl.

FIG. 20 plots the size of the individual coccolithophores measured optically, before and after, complete acid dissolution. Each data point represents data for an individual coccolithophore and the shading represents the 'age' of the culture sample from day 1 (black) to day 17 (white) since the initial inoculation. Note that data below the dashed reference line is an indication of some form of a calcareous shell, which is dissolved under acid attack. The size of the coccolithophores, before and after complete acid dissolution, is in agreement with that seen under SEM and decreases in the order of: *C. braarudii*>*G. oceanica*>*E. huxleyi*. Due to the limitation of the wavelength of light used in optical measurements, the sizing measured herein is found to overestimate by approximately 0.5 mm as compared to those measured in SEM. This is further and fully discussed as part of the measurement uncertainties in the Appendix below, with reference to Example 3. As can be seen in FIG. 20, the distribution of coccosphere and cellular size of *C. braarudii* and *E. huxleyi* are relatively invariant over 17 days of growth. On the other hand, towards the later stage of the growth phase, a thinner calcareous shell is seen on *G. oceanica* coccospheres. Separately, when the experiments were conducted in $Ca^{2+}$-free electrolytes, the predominant data points for *E. huxleyi* and *G. oceanica* in their early growth phase overlay on the y=x reference line. This is because the time required to set up the opto-electrochemical experiment after filling the reaction chamber with $Ca^{2+}$-free electrolyte, which is approximately 1-2 minutes, could dissolve away the biomineralized CaCO3 prior to the onset of electro-generation of acid at t=0. In the later growth phase, however, *E. huxleyi* and *G. oceanica* were not completely 'deshelled' in $Ca^{2+}$-free electrolyte at the onset of the electro-generated acid. Without wishing to be bound by theory, this is likely because of a higher number density of coccospheres, and detached coccoliths, present on the surface of the electrode resulting in an overlap of the diffusion field causing a local saturation of $Ca^{2+}$ and $HCO_3^-$. Complete 'deshelling' of the *C. braarudii* coccospheres was not seen by the exposure of 1-2 minutes in $Ca^{2+}$ free electrolyte. This likely reflects a much larger quantity of calcite is present on *C. braarudii* as revealed below. Having discussed the physicochemical processes that occur in the optoelectrochemical experiment, we next examined the different growth phases of the coccolithophores over 17 days following the initial inoculation.

Figure 21:
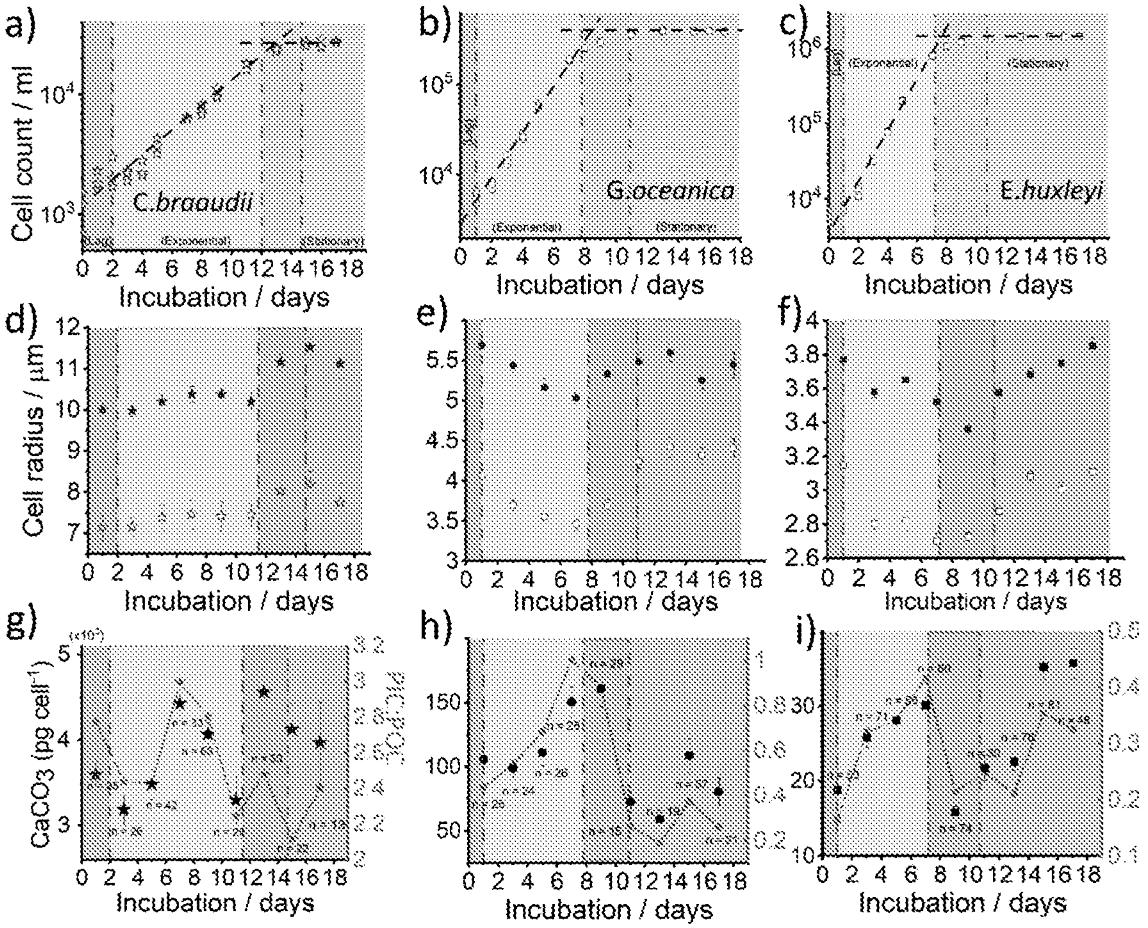
FIG. 21 shows the physical parameters of coccolithophores obtained as a function of growth for *C. braarudii* (a, d, g), *G. oceancia* (b, e, f) and *E. huxleyi* (c, f, i). All experiments were conducted between 2-4 μm on the day of measurement. a-c) Number density of coccospheres as a function of growth. d-f) Average sizes of coccolithophores before (black) and after complete acid dissolution (white) in the opto-electrochemical experiments. g-i) Mean $CaCO_3$ mass per cell (left-y axis) and PIC:POC ratio (right-y axis). The error bar reports the standard error of mean and n is the sample size (d-i).

FIG. 21*a-c* plots the measured cellular density of the coccolithophores in the growth medium over a 17 day period following inoculation. For all three species, a 'lag' phase in growth is seen in days 0-1 as time is typically required for them to acclimate to the new culture environment. Between approximately days 2-10, cellular division is fast as can be inferred from the exponential increase in the number density until it reaches a plateau at $2\times10^4$, $3\times10^5$ and $1\times10^6$ cell per mL for *C. braarudii, G. oceanica* and *E. huxleyi*, respectively. Note that the culturing flask has a filter cap allowing air exchange but the total amount of nutrients is limited to what is initially present (further detailed in the Appendix below). The plateau regime in the growth curve with no net increase in cell count is commonly known as the stationary phase and arises from either depletion of nutrients essential for cellular division, build-up of toxins or bacterial infection. Interestingly, it is suggested that the invariance in the coccolithophore number density as seen across all three species in the stationary phase is not due to a balanced rate of 'birth and death', but arises because the cellular division rate slows to a halt. Despite the near net-zero cellular division, the coccolithophores continue to grow in size. The three abovementioned growth phases, lag, exponential and stationery, are shown in FIG. 21. The different shaded regimes (left and right) represent the transition from late-exponential into the early-stationary phase.

In situ optical measurements of the coccolithophores as the calcareous shell is being dissolved away by electrogenerated acid reveal, first, the size of the coccosphere and, at the end of the dissolution, the size of the underlying biological cell. FIGS. 21*d* and 21*e* show the average coccolithophore radius optically measured before and after complete acid dissolution. A size decrease of both the coccosphere and the 'naked' cell are seen for *G. oceanica* and *E. huxleyi* during the exponential growth phase whilst a slight upward trend is seen for *C. braarudii*. As the rate of cellular division increases in the exponential phase, the growth time for the coccolithophores in between divisions are shortened. Consequently, this results in a decrease in cellular and coccosphere size for *G. oceanica* and *E. huxleyi* as each cellular division halves the biomass and coccoliths for individual plankton. This trend is, however, not seen for *C. braarudii* possibly due to a much slower cellular division rate as compared to *G. oceanica* and *E. huxleyi*. For all three species, in the stationary phase, an increase in both the coccosphere and cellular size are seen as cellular division slows to a halt, with excellent agreement with literature observations. Having discussed the physiological data directly extractable from the shape transient of the coccolithophore shown in FIG. 21, next it is discussed how the PIC content is calculated for each individual coccolithophores.

At the start of the opto-electrochemical experiment, the onset of the electrochemical potential is jumped to drive the complete oxidation of hydroquinone to form two stoichiometric equivalents of protons at the electrode interface (see Eqn (4 above)). As shown schematically in FIG. 19*a*, the acid diffuses from the electrode to react with the calcareous shell of the coccolithophore (i.e., the coccosphere), which in the following is treated as a calcite-organism "core-shell" particle with the shell being $CaCO_3$. The total flux of proton, $j_{tot}$ (mol $s^{-1}$) reacting with the coccosphere is controlled by (1) how fast the protons can diffuse to the particle, i.e. mass transport of protons, $j_{MT}$ (mol $s^{-1}$) to a sphere on a plate, and (2), the rate of heterogeneous reaction of calcite with protons, $j_{surf}$ (mol $s^{-1}$)

$$j_{tot} = \left(\frac{1}{j_{MT}} + \frac{1}{j_{surf}}\right)^{-1} \quad \text{(Eqn 5)}$$

where $$j_{MT} = 8\pi \ln(2)\left(D_{H_2BQ}D_{H^+}\right)^{0.5} c_{H_2BQ,bulk}(r_{sphere}(t)) \text{ and}$$

$$j_{surf} = 8\pi R_f (r_{sphere}(t))^2 k_0 c_{H_2BQ,bulk}\left(D_{H_2BQ}/D_{H^+}\right)^{0.5}$$

where D is the diffusion coefficient (mol $m^{-2}$), $C_{H_2BQ,bulk}$ is the bulk concentration of the acid precursor hydroquinone ($H_2BQ$), $r_{sphere}$ is the radius of the calcite particle and is a function of time (t), $k_0$ is the heterogeneous rate constant (0.043 cm $s^{-1}$) for acid dissolution of calcite in strong acid (pH<3) and $R_f$ is the surface roughness of the calcite particle. See Appendix for further discussion on the acid dissolution kinetics of calcite and derivation of Eqn 5. As can be inferred from Eqn 5, in the limit of a tiny calcite particle, the overall rate of reaction is limited by the rate of surface reaction ($j_{MT}>>j_{surf}$). On the other hand, if the calcite particle is large, the overall rate of calcite dissolution is limited by how fast the protons can diffuse to the particle interface ($j_{MT}<<j_{surf}$). This switch-over in the acid dissolution of calcite occurs around a particle radius of 10 μm. It is important to note that the mass-transport limited rate is proportional to the geometric size of the particle and the surface-limited rate of reaction is proportional to the specific surface area of the particle ($4\pi R_f r^2$). For the size range of coccolithophores in this study, the rate of the acid dissolution is neither limited by the mass-transport protons nor it is surface-limited, but is subject to mixed kinetics.

The total number of moles of electrogenerated acid reacting with the calcareous shell per unit time during the experiment, $j_{tot}(t)$, can be calculated knowing $r_{sphere}(t)$, which is extracted from the experiment and shown in FIG. 19*d*. Thus, by knowing each $CaCO_3$ reacts with 2 stoichiometric equivalents of protons, the total mass of calcite, or PIC per coccolithophore cell, can be calculated $$PIC = \frac{RMM_{CaCO_3}}{2}\int_0^{t_{dissolved}} j_{tot}(t)dt \quad \text{(Eqn (6))}$$

where $RMM_{CaCO3}$ is the molar mass of $CaCO_3$ (100.1 g $mol^{-1}$) and $t_{dissolved}$ is the time at which the size of the coccosphere becomes invariant in the presence of electrogenerated acid corresponding to the total time taken for the shell to dissolve.

The $CaCO_3$ contents (PIC) calculated for *C. braarudii, G. oceanica* and *E. huxleyi* are shown in FIG. 21*g-i* and FIG. 22. This was calculated using an estimated surface roughness factor ($R_f$) of 4 (See Appendix—Example 3 for a discussion and the extent of uncertainty of $R_f$, among other factors, contribute towards the calculation of the $CaCO_3$ mass).

Figure 22:
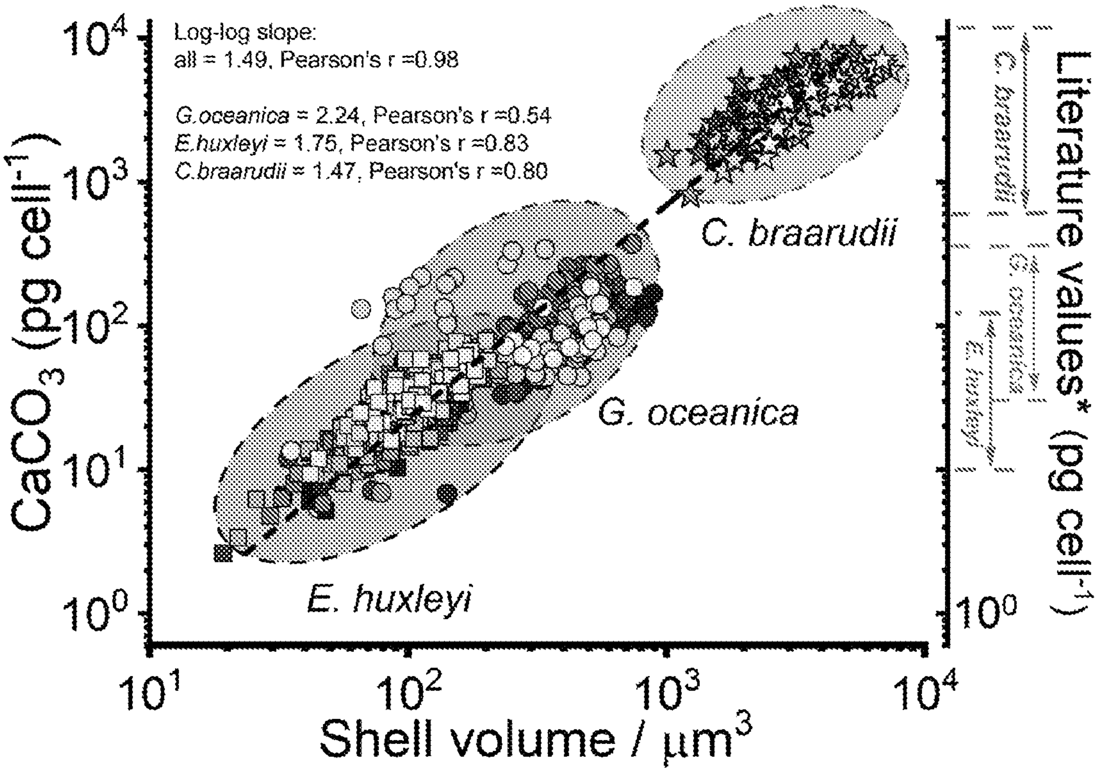
FIG. 22 shows the calculated calcium carbonate content of individual coccospheres plotted against the shell volume of the coccolithophore, calculated using the size before and after complete acid dissolution. Note the log-log scale. Squares—*E. huxleyi*, circles—*G. oceanica* and stars—*C. braarudii*. *The range of literature values for $CaCO_3$ mass per coccolithophore cell (pg $cell^{-1}$) were calculated by using a range of reported coccolith masses multiplied by an estimate of 10-20 coccoliths per cell. The grey-scale of the symbols represent days of growth, from day 1 (black) to day 17 (white), see the legends shown in FIG. 21.

FIG. 21 *g-i* plots the average $CaCO_3$ mass plotted against days of growth for the three coccolithophore species and FIG. 22 shows individual coccolithophore $CaCO_3$ mass versus the volume of the calcareous shell calculated measured before and after complete acid dissolution. *C. braarudii* was the largest out of the three species and carries the most calcium carbonate (averaging 3.0-4.5 ng cell per cell at different parts of the growth curve), followed by *G. oceanica* (50-160 pg per cell) and *E. huxleyi* (15-35 pg per cell). These results are in good agreement with the $CaCO_3$ masses estimated by multiplying the literature reported coccolith mass range by the expected number of 10-20 coccoliths per cell. The estimated $CaCO_3$ per cell from literature reported coccolith values are shown in FIG. 22. For *G. oceanica* (FIG. 21*h*) and *E. huxleyi* (FIG. 21*i*), an increase in their average PIC content is clearly evidenced throughout their exponential growth followed by a drop in the PIC content as it transits into the stationary phase. In the stationary phase, an increase in PIC is seen for *E. huxleyi* but not for *G. oceanica*, no clear trend was seen for *C. braarudii.*

The organic carbon content of the phytoplankton cell is reported to be correlated positively with the volume of the phytoplankton cell $$POC = 0.109V^{0.991} \quad \text{(Eqn (7))}$$

where POC is the carbon mass (pg per cell) of the organic matter and V is the volume of the phytoplankton cell ($\mu m^3$) calculated from the optically measured cellular radius after complete acid dissolution. Eqn (7) is an empirical expression derived from 30 small phytoplankton ranging from 2-60 μm, with $r^2$=0.937 reported in the logarithmic form. The right-hand side axis of FIG. 21*g-i*, in black, shows the estimated PIC:POC ratio for the three species. To compare like for like, the value of PIC used to calculate PIC:POC ratio is converted to the inorganic carbon mass (PIC=$CaCO_3$ mass per cell×12.0/100.1). *C. braarudii* has the highest PIC:POC ratio (2.0-3.0) followed by *G. oceanica* (0.2-1.0) and *E. huxleyi* (0.1-0.4).

Interestingly, the PIC:POC ratio shows a similar trend to the calculated PIC as a function of phytoplankton growth.

In summary, physiological data of single-entity coccolithophores such as the coccosphere size, the internal cellular size, the quantity of PIC and POC are reported. It is clear that, between species, an increase in $CaCO_3$ mass is seen for the bigger coccolithophores. For *G. oceanica* and *E. huxleyi* it is clear from FIG. 21 that the changes in the $CaCO_3$ content along the growth curve (h and i) are not correlated with the coccosphere size (e and f). Specifically, during days 2-7 in the exponential growth an increase of $CaCO_3$ cellular content are seen for *G. oceanica* and *E. huxleyi* but their respective coccosphere and naked cell size decreases. Moreover, as *G. oceanica* transits into the stationary phase (days 8-17) an increase in the average coccosphere size is seen but the $CaCO_3$ content per cell drops. A closer look at FIGS. 21*d-f* reveals that the size variation of the underlying 'naked' cell mirrors closely to that of the coccosphere prior to acid dissolution (cell+calcareous shell). In FIG. 22, a clear trend between the $CaCO_3$ mass and the shell volume can be seen. The latter is calculated using the optically measured radius before and after complete acid dissolution assuming a spherical shell. Since the calcareous shell is composed of inter-locking coccoliths encrusting the underlying biological cell, it is shown that the $CaCO_3$ mass is correlated to the volume of the calcareous shell rather than to the initial coccosphere size (shell+cell).

Conclusion of Example 3 Coccosphere Experiments

Single-entity measurements of calcifying coccolithophores were realised via in situ opto-electrochemical acid-induced dissolutions. Simultaneous optical measurement of the coccolithophore before and after complete acid dissolution revealed the calcareous shell thickness and the size of the underlying 'naked' biological cell of the same coccolithophore. This allowed the following single-entity measurements to be made: PIC calculated via calcite dissolution kinetics, POC estimated from the volume of the 'naked' cell and, hence, an estimation of the PIC:POC ratio could be determined on a single-cell basis.

The masses of biomineralized $CaCO_3$ content of individual coccolithophores was found to vary over 3-orders of magnitudes ranging from a few picograms (*E. huxleyi*) to tens of nanograms (*C. braarudii*). These weights are too small to be measured via traditional methods of 'weighing'. Importantly, our data reveal that the calcification degree of the coccolithophore is not correlated with the size of the coccosphere but to the volume of the calcareous shell because the underlying biological cell scales proportionally with the coccosphere size.

SUMMARY

While the above examples use exemplary methods to monitor calcite dissolution, the principle of dissolving a particle within the diffusion field of an electrode using an applied electrical current or potential to locally generate acid which reacts with the biomineralized $CaCO_3$ can be used to 'titrate' the $CaCO_3$ content, the 'end point' of the titration corresponding to the disappearance (full dissolution) of the particle. The resulting controlled dissolution of coccoliths and coccospheres can be monitored by any method as the dissolution proceeds to complete "titration" of the calcium carbonate content. Measuring the mass of individual biomineralized $CaCO_3$ particles are useful for probing the physiological condition of the coccolithophore community and their response to the changes in the local marine environment.

APPENDIX

The following Appendix provides the materials and methods relating to Example 1 and 3 detailed above.

Example 1

Appendix Section 1—Chemicals 1.1 Electrochemistry

Potassium nitrate was purchased from Scientific Laboratory Supplies Limited, U.K. 1,4-dihydroxybenzene was purchased from Sigma-Aldridge, U.K. Detrital calcium carbonate powder was purchased from Alfa Aesar, U.S. The shape of the received calcium carbonate crystallinity in the $CaCO_3$ powder is rhombohedral under light microscope, which is a strong indication of calcite crystalline. The powder was ground in a pestle and mortar for 10 minutes to obtain the quasi-spherical-shaped calcite described in Section 2.2. All chemicals were used without further purification. Aqueous solutions were made using ultrapure water (Millipore, resistivity 18.2 MΩ cm at 25° C.). All of the $H_2BQ$ solutions were freshly prepared on the day of the experiments.

1.2 Cell Culturing Media

The cultures used in this study were obtained from Roscoff Culture Collection (RCC, France): *E. huxleyi* (RCC1216), *G. oceanica* (RCC1314), *C. leptoporus* (RCC1130) and *C. braarudii* (RCC1198). All cultures were maintained by regular batch culturing on a K/2 enriched growth medium modified from the recipe for K medium by Keller et al. with f/2 vitamins and silica component omitted (M. D. Keller, R. C. Selvin, W. Claus and R. R. Guillard, *Journal of Phycology,* 1987, 23, 633-638). Aquil synthetic ocean water was used instead of natural seawater. The final molarity of each of the medium components in the K/2 recipe are summarized in Tables S1. To maintain the cultures, regular batch culture inoculations were made into Tissue Culture Treated Flasks (culture area 25 $cm^2$, Corning™ Falcon™, USA), under sterile conditions, to a total culture volume of 40 ml. All cultures were kept in a PHCbi MLR-352-PE Incubator (PHC Eurpe B.V.), on a 14:10 light—dark cycle with a PAR intensity of 40-60 μmol $m^{-2}$ $s^{-1}$. For the electrochemical dissolution experiments, coccolith samples in their respective late stationary phase were studied. This resulted in proportionally more detached coccoliths to complete coccospheres in the culture medium.

TABLE A1

A summary of the molar concentration of all the components in the synthetic ocean water based K/2 growth medium.

| | | Molar Concentration in final K/2 growth medium (mol $dm^{-3}$) |
|---|---|---|
| Synthetic Ocean Water (SOW) based on the Aquil medium recipe | NaCl | $4.20 \times 10^{-1}$ |
| | $Na_2SO_4$ | $2.88 \times 10^{-2}$ |
| | KCl | $9.39 \times 10^{-3}$ |
| | $NaHCO_3$ | $2.38 \times 10^{-3}$ |
| | KBr | $8.40 \times 10^{-4}$ |
| | $H_3BO_3$ | $4.85 \times 10^{-5}$ |
| | NaF | $7.15 \times 10^{-5}$ |
| | $MgCl_2 \cdot {}_6H_2O$ | $5.46 \times 10^{-2}$ |
| | $CaCl_2 \cdot {}_2H_2O$ | $1.05 \times 10^{-2}$ |
| | $SrCl_2 \cdot {}_6H_2O$ | $6.38 \times 10^{-5}$ |
| K/2 medium enrichment based on the K recipe, with silica component omitted | $NaNO_3$ | $4.41 \times 10^{-4}$ |
| | $NH_4Cl$ | $2.50 \times 10^{-5}$ |
| | $Na_2$ b-glycerophosphate | $5.00 \times 10^{-6}$ |
| | $H_2SeO_3$ | $5.00 \times 10^{-9}$ |
| | $Na_2EDTA \cdot 2H_2O$ | $5.55 \times 10^{-5}$ |
| | $FeCl_3 \cdot 6H_2O$ | $5.85 \times 10^{-6}$ |
| | $MnCl_2 \cdot 4H_2O$ | $4.50 \times 10^{-7}$ |
| | $ZnSO_4 \cdot 7H_2O$ | $4.00 \times 10^{-8}$ |
| | $CoCl_2 \cdot 6H_20$ | $2.10 \times 10^{-8}$ |
| | $Na_2MoO_4 \cdot 2H_2O$ | $1.30 \times 10^{-8}$ |
| | $CuSO_4 \cdot 5H_2O$ | $5.00 \times 10^{-9}$ |
| F/2 vitamin enrichment[2] | Thiamine•HCl (Vitamin B1) | $2.96 \times 10^{-7}$ |
| | Biotin (Vitamin H) | $2.05 \times 10^{-9}$ |
| | Cyanocobalamin (Vitamin B12) | $3.69 \times 10^{-10}$ |

Appendix Section 2—Imaging 2.1 Scanning Electron Microscopy

The phytoplankton culture containing the coccoliths were filtered using a poly-carbonate filter (0.01 μm), washed with deionized water, and subsequently dried at atmospheric pressure. Prior to the imaging, 10 nm of gold thin-layer was coated over the sample using a rotary pumped coater (Q150RES, Quorum, UK). Scanning Electron Microscopy (SEM) images were obtained using a Sigma 300 FEG-SEM from Zeiss with an accelerating voltage of 2.0 kV.

FIG. 10 presents a representative image of the *C. leptoporus* coccoliths used in this study. As highlighted in the Examples, a number of the coccoliths were found to be deformed.

2.2 Optical Microscopy

Optical measurements were made on a Zeiss Axio Examiner, A1 Epifluorescence microscope (Carl Zeiss Ltd., Cambridge U.K.), using a 40× oil immersion objective (Plan-Apochromat 40×/1.3 Iris (UV)VIS-IR). The objective lens aperture was set to 0.7 to optimize for darkfield contrast. The darkfield illumination of coccoliths was achieved by using an oil-immersion darkfield condenser (NA=1.2/1.4, Carl Zeiss Ltd., Cambridge U.K.). The video acquisition was provided by a Hamamatsu ORCA-Flash 4.0 digital CMOS camera (Hamamatsu, Japan), providing 16-bit images with 4-megapixel resolution.

2.3 Image Analysis and Volume Determination

Figure 12:
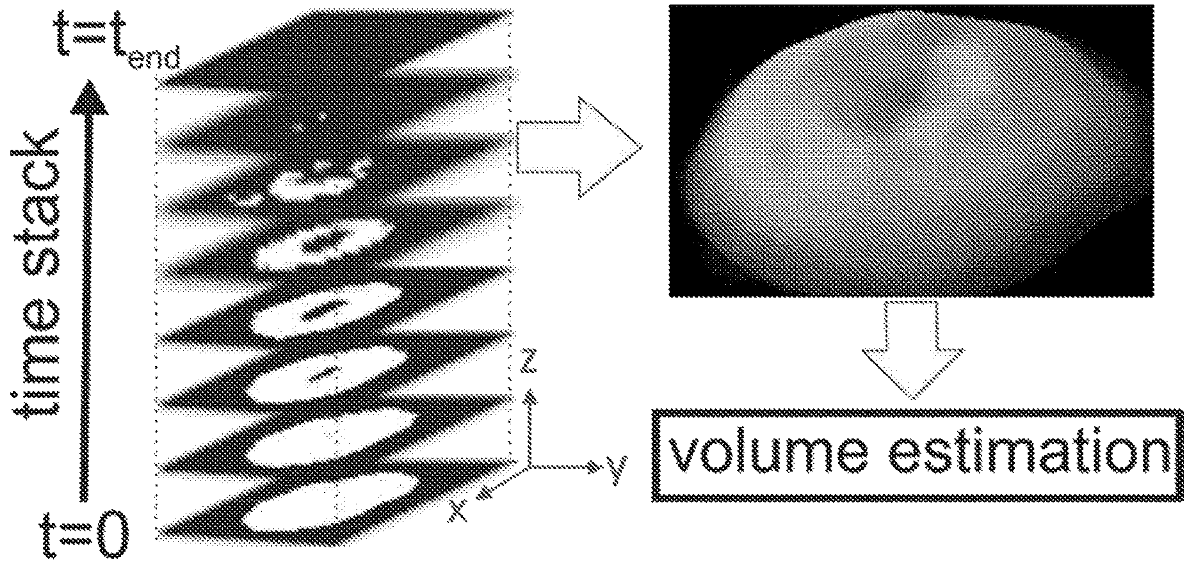
FIG. 12 provides a schematic showing the image reconstruction process in estimating the volume of the coccolith prior to dissolution. All image analysis were performed in Fiji ImageJ freeware.

During the course of the opto-electrochemical experiment the cell was optically imaged at 10 fps. The resulting series of images were analyzed using (Fiji) ImageJ freeware. (J. Schindelin, I. Arganda-Carreras, E. Frise, V. Kaynig, M. Longair, T. Pietzsch, S. Preibisch, C. Rueden, S. Saalfeld and B. Schmid, *Nature Methods,* 2012, 9, 676-682). Macro scripting in ImageJ allows the coccoliths to be identified and the distance from the working electrode to be measured, reported as electrode edge to coccolith centre. The stack of images containing individual coccoliths were cropped and duplicated to allow auto-threshold ('Huang2') over the stack histogram to be performed for each of the individual coccoliths. 'Huang2' is a built-in implementation allowing systematic image thresholding without input from the user. This is described on the Imagej website, https://imagej.net/Auto_Threshold. The projection area of a coccolith is found by counting the total number of white pixels in the binary 2-D image multiplied by the pixel resolution (0.155×0.155 $\mu m^2$ $pixel^{-1}$). To estimate the volume of a coccolith, the number of white pixels in the z-stack of binary images as obtained during the coccolith dissolution is summed across each of the image coordinates in the x-y directions—illustrated in FIG. 12. The number of white pixels in the z-stack, at each x-y image coordinate, is then multiplied by the initial dissolution rate (obtained experimentally, $\mu m\ s^{-1}$) and the time between each image to reveal the reconstructed coccolith as shown in FIG. 12 (shaded). Assuming the coccolith is entirely made of calcite, the mass of each coccolith is estimated by multiplying the estimated volume by the density of calcite (2.71 g $cm^{-3}$ at 25° C.).

Notice that the image reconstructed *C. braaudii* coccolith in FIG. 12 resembles the shape of that obtained in SEM images. The finer structural detail of the coccolith is not comparable to imaging using electron microscopy due to the limitation of optical resolution and the nature of reconstruction from a stack of projection images. But in terms of the estimation of coccolith mass, this method reconstructs coccoliths with mass values spanning over 2 orders of magnitude, successfully showing both intraspecies and interspecies variation.

Appendix Section 3: Redox Chemistry of the Acid Precursor 1,4-Dihydroxybenzene 1,4-dihydroxybenzene ($H_2BQ$) is used as an acid precursor in the above Examples. $H_2BQ$ is a redox-active species able to undergo a two-electron oxidation leading to the formation of benzoquinone (BQ) in aqueous solution. The first and second $pK_a$s of $H_2BQ$ at 25° C. are reported to be 9.85 and 11.84, respectively. Consequently at around neutral pH the $H_2BQ$ is fully protonated. Consequently, as shown in the expression below oxidation of the $H_2BQ$ leads to the release of two protons.

$$H_2BQ(aq) - 2e^- \rightleftharpoons BQ(aq) + 2H^+ \quad \text{Eq. S1}$$

Figure 13:
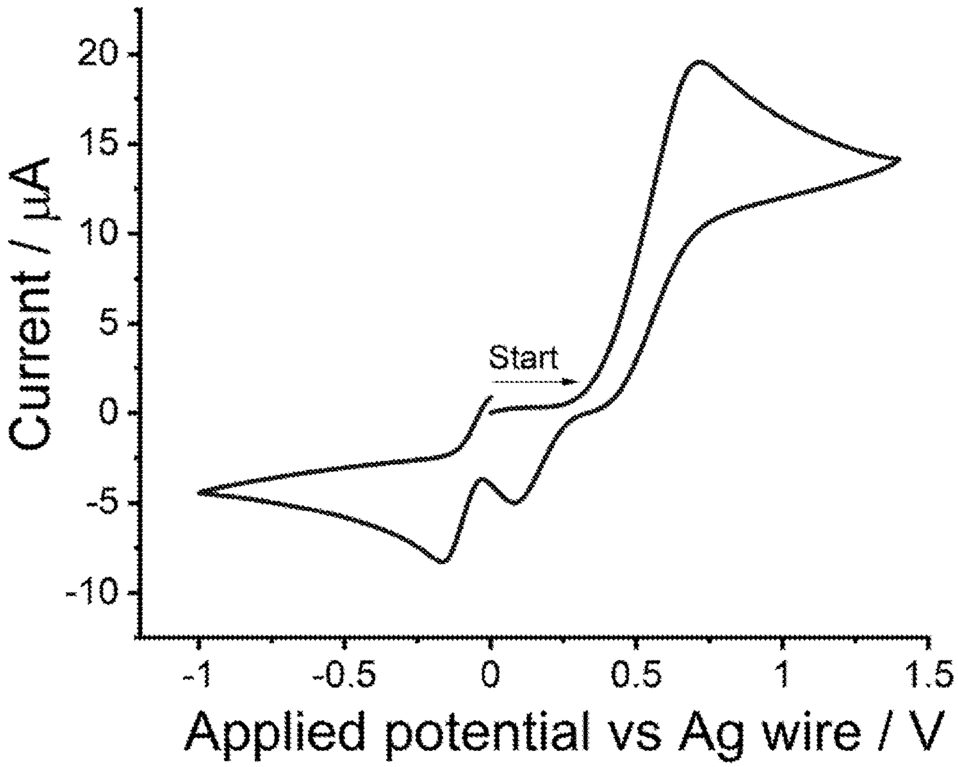
FIG. 13 shows a cyclic voltammogram of 10 mM $H_2BQ$ in 0.7 M $KNO_3$ recorded in the example opto-electrochemical cell at a voltage scan rate of 50 $mVs^{-1}$. The working electrode is a carbon fibre wire electrode (radius=3.5 μm, length ~1 cm). The potential was swept anodically from a starting potential of 0.0V to +1.4 V vs Ag wire before reversing the sweep direction to −1.0 V and stopped at 0.0 V.

FIG. 13 shows a cyclic voltammogram of 10 mM $H_2BQ$ recorded in 0.7 M $KNO_3$ electrolyte, recorded in the above discussed opto-electrochemical cell. The potential was swept from an initial potential of 0 V anodically to +1.4 V (vs Ag wire) at a voltage scan rate of 50 $mVs^{-1}$. A clear oxidative peak corresponding to the oxidation of the $H_2BQ$ occurs at ~+0.7 V (vs Ag wire). In the absence of pH buffering species, although the electrolyte is initially neutral in pH the electrode interface quickly becomes highly acidic due to a build-up of protons generated electrochemically (Eq. S1). Thus, the forward anodic $H_2BQ$/BQ peak seen at +0.7 V (vs Ag wire) in FIG. 13 is similar to that previously reported in pH 2.0 buffered electrolyte. From the cyclic voltammogram, it is clear that at an applied over-potential of +1.2 V (vs Ag wire) the 2-electrons oxidation of $H_2BQ$ is fully driven to generate BQ and 2 stoichiometric equivalents of protons.

In the above examples, the 1,4-dihydroxybenzene is used as an acid precursor which upon oxidation leads to the release of protons and hence a decrease in the pH local to the electrode. The spatial and temporal evolution of $[H^+]$ in the opto-electrochemical cell is discussed in Appendix Section 5.

Figure 4:
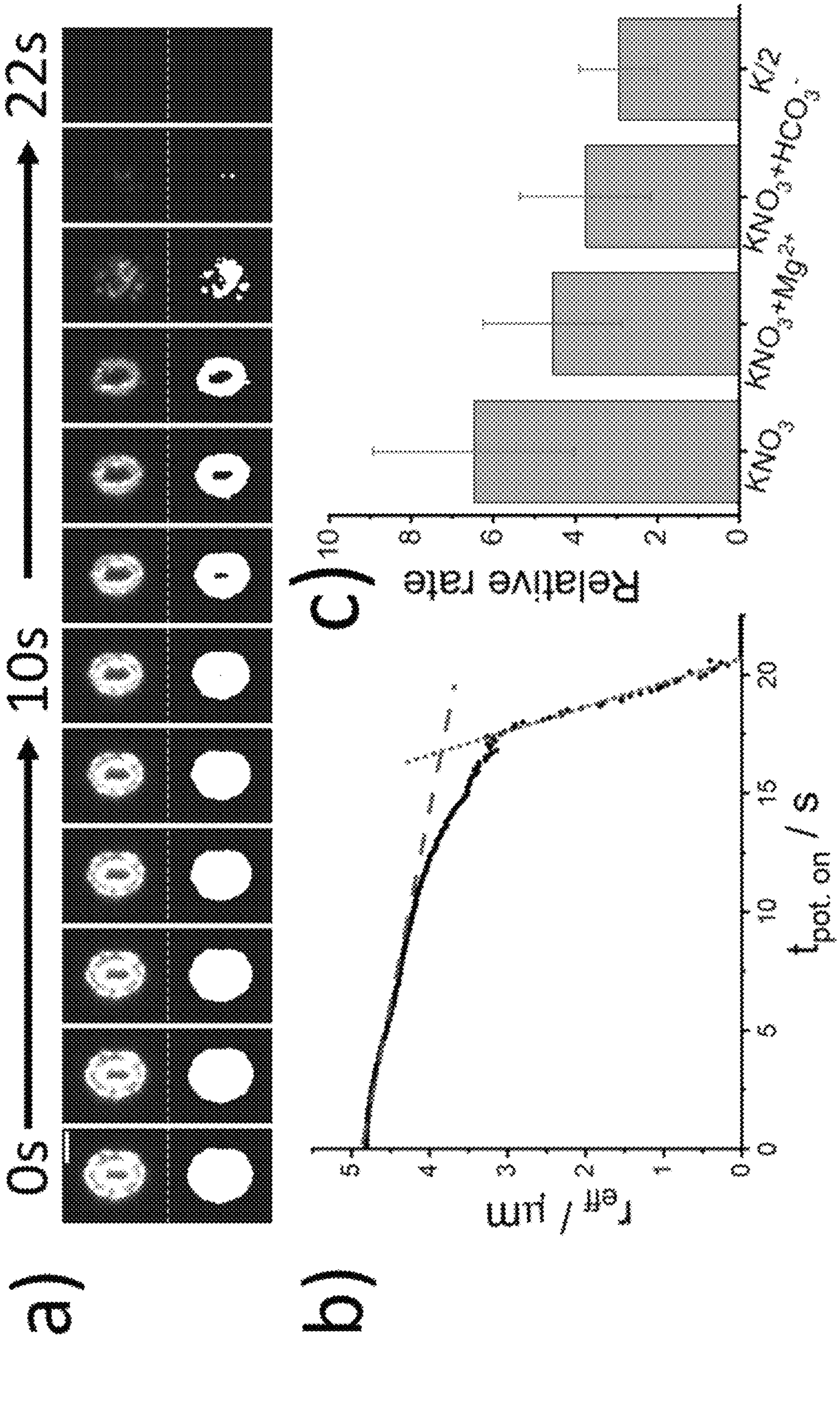
FIG. 4 shows an example opto-electrochemical dissolution of a representative coccolith from *C. braaudii*. A potential of +1.2 V (vs Ag wire) was applied to the working electrode from $t_{on}$=0 s. a) Temporal evolution of the coccolith optically imaged via dark-field scatter—top: raw image, bottom: image after auto-threshold. The coccolith is situated at 45.5 μm from the carbon fibre electrode, measured from the lith centre to the electrode edge. The electrolyte solution was K/2 culture medium with 10 mM hydrobenzoquinone ($H_2BQ$) (aq). The time interval of the images is 2 seconds and the scale bar is 5 μm. b) A plot of the effective radius of the coccolith versus time. c) Dissolution rates measured in different electrolyte medium relative to that predicted for smooth and non-porous calcite particles (see text). Bars: (left to right) 0.7 M $KNO_3$, 0.7 M $KNO_3$+54.6 mM $Mg^{2+}$, 0.7 M $KNO_3$+2.4 mM $HCO_3^-$ and K/2 culture medium.

Appendix Section 4: Experimental Calcite Dissolution Rate Versus Distance from the Electrode As discussed in Appendix Section 3, the pH gradient in the opto-electrochemical experiments is a function of both time and distance of coccolith from the electrode. FIG. 4 shows the temporal change in the effective radius of *C. braaudii* coccoliths situated at different distances from the electrode. The experiment was conducted in a buffer-free 0.7 M $KNO_3$ electrolyte solution. The y-axis shows a relative change in the effective coccolith radius as compared to that measured prior to the acid dissolution ($t_{pot\ on}$=0 s) so as to normalize for intra-speciation size differences. For coccoliths within ~70 μm from the electrode, two linear slopes can be seen for the reasons discussed in the main text. An initial slope ($\mu m\ s^{-1}$) can be extracted from the initial 3 seconds of dissolution, as can be seen in FIG. 4*b*); generally, the further the coccolith is away from the electrode, the initial dissolution rate is seen to be slower and requires a longer time for complete dissolution ($r_{eff}$=0 μm). For coccoliths much further away from the electrode, such as the one at 120 μm shown in FIG. 4 however, a delay of ~2.5s can be seen before the dissolution is initialized by electrochemically generated acid. This is entirely consistent with the diffusion of protons from the electrode interface outwards into the solution, in which a finite time is required for an appreciable amount of protons to reach a distance of hundreds of microns from the electrode—shown in Appendix Section 6.4.

Appendix Section 5: Mass-Transport of Electrochemically Generated Reagents: Numerical Simulation The opto-electrochemical cell (depicted in FIG. 2) consists of a carbon fibre working electrode ($r_e$=3.5 μm) in a cell volume of approximately 1 cm×1 cm×100 μm. To a good approximation and when within a distance less than or equal to the cell-height from the electrode, the diffusion field remains radial and Fick's second law in cylindrical coordinates can be used to describe the solution phase mass-transport. In the absence of coupled homogeneous kinetics the concentration of species i, is described by:

$$\frac{\partial[i]}{\partial t} = D_i\left(\frac{\partial^2[i]}{\partial r^2} + \frac{2}{r}\frac{\partial[i]}{\partial r}\right) \quad \text{Eq. S2}$$

where t is time (s), r is the radial distance from the centre of the cylinder and $D_i$ is the diffusion coefficient of the $i^{th}$ species ($m^2\ s^{-1}$). We are concerned with the diffusional flux of protons (and $H_2BQ$) to and from the cylindrical wire electrode. The initial conditions we simulate are $$t = 0,\ r_e \le r \le r_{max},\ [H_2BQ]_r = [H_2BQ]_{bulk},\ [H^+]_r\ \&\ [BQ]_r = 0\ \text{mM} \quad \text{Eq. S3}$$

where $r_e$ is the radius of the cylindrical electrode ($r_e$=3.5 μm), $r_{max}$ is a point at a semi-infinite distance away from the electrode such that the concentration is unperturbed during the course of the reaction. The bulk and initial 1,4-dihydroxybenzene concentration is set to $[H_2BQ]_{bulk}$=10 mM as per the opto-electrochemical experiment.

At the start of the opto-electrochemical experiments, the applied potential at the working electrode is stepped from 0V to an over-potential of +1.2V (vs Ag wire) to drive the full two-electrons two-protons oxidation of $H_2BQ(aq)$ at the electrode-solution interface (more of which see Appendix section 3)

$$H_2BQ(aq) - 2e^- \rightarrow BQ(aq) + 2H^+(aq) \quad \text{Eq. S4}$$

The electrochemical reaction occurs within an electron tunnelling distance from the working electrode, leading to a depletion of $H_2BQ$ at the electrode-solution interface $$t > 0,\ [H_2BQ]_{r_e} = 0 \quad \text{Eq. S5}$$

Concurrently, two protons are formed at the electrode-solution interface for each of $H_2BQ$ undergoing oxidation $$t > 0\ \&\ r = r_e,\ D_{H_2BQ}\frac{\partial[H_2BQ]}{\partial r} = -2D_{H^+}\frac{\partial[H^+]}{\partial r} \quad \text{Eq. S6}$$

Note that the electrogenerated BQ is not known to affect the dissolution kinetics of calcium carbonate and is not included in the simulation. The mass-transport of material is described by Fick's second law of diffusion in cylindrical coordinates Eq. S2

$$t > 0\ \&\ r_e < r < r_{max}\begin{cases} \dfrac{\partial[H_2BQ]}{\partial t} = D_{H_2BQ}\left(\dfrac{\partial^2[H_2BQ]}{\partial r^2} + \dfrac{1}{r}\dfrac{\partial[H_2BQ]}{\partial r}\right) \\ \dfrac{\partial[H^+]}{\partial t} = D_{H^+}\left(\dfrac{\partial^2[H^+]}{\partial r^2} + \dfrac{1}{r}\dfrac{\partial[H^+]}{\partial r}\right) \end{cases} \quad \text{Eq. S7}$$

At the outer simulation boundary condition ($r=r_{max}$) the bulk concentration is not perturbed during the timescale of the simulation.

$$r = r_{max}\begin{cases} [H_2BQ]_{r_{max}} = [H_2BQ]_{bulk} \\ [H^+]_{r_{max}} = 0 \end{cases} \quad \text{Eq. S8}$$

$$\text{where } r_{max} = r_e + 6\sqrt{D_{H^+}t_{max}}$$

The simulation is discretized using a finite difference method and solved back-implicitly. Numerical convergence, mass conservation and benchmark against known analytical expression is performed to ensure numerical accuracy (E. Kätelhön and R. G. Compton, *Analyst,* 2015, 140, 2592-2598).

FIG. 6*a*) shows the predicted temporal (t) and spatial (r) evolution of proton concentration$[H^+]$(r, t) within the opto-electrochemical cell. Similarly, FIG. 6*b* depicts the proton profile as a function of time during the experiment, at difference distances from the electrode. We have not considered the consumption of the protons by the calcium carbonate and further we assume that the solution is unbuffered; experimentally this is equivalent to the case where 0.7 M $KNO_3$ is used as the electrolyte. However, the simulation gives the concentration profile of the protons in the absence of being consumed at $CaCO_3$ particle. Importantly the mass-transport to/from a microcylinder is convergent and consequently in this geometry the flux tends to a quasi-steady-state ("quasi" here denotes that in the longer time limit ($t>r^2/D$) the flux to the cylinder is proportional to the inverse of log time, as opposed to truly time independent). As can be seen in FIG. 6*b*), within seconds of the opto-electrochemical experiment, the proton concentration at a distance r away from the electrode is above millimolar.

Appendix Section 6: Calcite Particle Dissolution Kinetics

In this section, the acid dissolution of quasi-spherical-shaped calcite particles is first discussed. Upon exposure of the calcite to a homogeneous acidic chemical environment, the following chemical reaction occurs $$CaCO_3(s) + H^+(aq) \xrightarrow{k_1} Ca^{2+}(aq) + HCO_3^-(aq) \quad \text{Eq. S9}$$

where $k_1$ is the heterogeneous rate constant ($cm\ s^{-1}$). There are two important limits for this reaction. First, the reaction may be limited by the mass-transport of protons to the calcite interface. Second, the reaction may be limited by the surface reaction rate. As will be outlined below the switch in rate determining step is predominantly controlled by the size of the particle and the surface reaction rate. $k_1$ 6.1 Surface Reaction Kinetics The reaction flux at the particle-solution interface can be expressed as $$D_{Ca^{2+}}\frac{\partial[Ca^{2+}]}{\partial r}\Big|_{r=r_{particle}} = -D_{H^+}\frac{\partial[H^+]}{\partial r}\Big|_{r=r_{particle}} = -k_1[H^+]_{surface} \quad \text{Eq. S10}$$

where r is radial distance from the centre of the spherical calcite particle, $r_{particle}$ is the radius of calcite particle, $D_j$ is the diffusion coefficient of species j and [j] is the concentration of species j. The subscript 'surface' denotes the surface concentration at the particle-solution interface.

For every mole of $Ca^{2+}$ (aq) released into the solution, one mole of $CaCO_3$ (s) must have reacted with acid. Therefore, it is helpful to express Eq. S10 in terms of the rate in change of the particle size. First, the reaction flux (Eq. S10) is multiplied by the surface area of the calcite particle to obtain the rate of reaction $$D_{Ca^{2+}}\frac{\partial[Ca^{2+}]}{\partial r}|_{r=r_{particle}} * \text{Area} = \frac{\partial(\text{mols of } CaCO_3(s))}{\partial t} = -k_1[H^+]_{surface} * \text{Area} \quad \text{Eq. S11}$$

Since the number of moles of $CaCO_3$(s) in a spherical calcite particle is equal to the volume multiplied by the density of calcite ($\rho_{CaCO_3}$=2.71×10$^{-4}$ mol m$^{-3}$), Eq. S11 becomes $$\frac{\partial(\text{mols of } CaCO_3(s))}{\partial t} = \frac{\partial(V * \rho CaCO_3)}{\partial t} = -k_1[H^+]_{surface}4\pi r^2_{particle} \quad \text{Eq. S12}$$

using chain rule, ∂V/∂t can be expressed in terms of $\partial r_{particle/\partial t}$ $$\frac{\partial V}{\partial t} = \frac{\partial V}{\partial r_{particle}}\frac{\partial r_{particle}}{\partial t} = 4\pi r_{particle^2}\frac{\partial r_{particle}}{\partial t} \quad \text{Eq. S13}$$

Substituting Eq. S13 into Eq. S12 and rearranging give $$\frac{\partial r_{particle}}{\partial t} = -\frac{k_1}{\rho CaCO_3}[H^+]_{surface} \quad \text{Eq. S14}$$

Eq. S14 describes the rate of particle shrinkage for a perfectly smooth spherical calcite particle dissolving under a highly acid chemical environment (pH<4.0) with nothing else present in the solution other than inert electrolytes. In other words, it describes the rate in the absence of calcite dissolution inhibitors. Since $k_1$, and $\rho_{CaCO_3}$ are constants, the rate of particle shrinkage is directly proportional to the proton concentration at the particle-solution interface. The higher the surface proton concentration, the quicker the calcite dissolves and shrink.

In the Example opto-electrochemical experiments, the dissolution of coccoliths were not only conducted in inert electrolytes (0.7 M $KNO_3$) but also in phytoplankton culture mediums. Note that $KNO_3$ is considered inert because neither $K^+$ (as above) nor $NO_3^-$ are not known to complex with chemicals involved in the calcite dissolution reaction. The phytoplankton culture medium contains a mixture of electrolytes, minerals, nutrients and metal ion chelators, not too dissimilar to those found in natural seawater. Notably, this includes 54 mM of $Mg^{2+}$ (aq) and 2.4 mM of is generalized to $$\frac{\partial r_{particle}}{\partial t} = -\frac{k_1 c_p}{\rho CaCO_3}[H^+]_{surface} \quad \text{Eq. S15}$$

where an additional variable $c_p$ has been added to account for the fact that the interfacial kinetics may deviate from the case of an idealized smooth spherical particle. Notably, the surface roughness of the calcite particle will serve to increase the rate ($c_p$>1), whereas as demonstrated by data shown in the main text and Table A2, the presence of a carbonate buffer and magnesium ions also decrease the reaction rate. Trace metal and organic carbon impurities within biogenic coccoliths may also affect $c_p$.

6.2 Mass-Transport and the Effect of Particle Size

The expression for the rate of dissolution given in Eq. S15 is proportional to the surface proton concentration. For an isolated particle we can consider how this surface proton concentration varies during the course of a reaction. To approach this problem we simulate the surface proton concentration at a spherical calcite particle when exposed to a highly acidic solution. At t=0 s, a spherical calcite particle is exposed to a homogeneous solution of proton $[H^+]_{bulk}$. The proton concentration is initially homogeneous throughout the solution $$t = 0,\ r_{particle} \le r \le r_{max}: [H^+]_r = [H^+]_{bulk} \quad \text{Eq. S16}$$

At t>0, acid dissolution reaction at the particle surface leads to a consumption of proton, at a rate described by Eq. S14, accompanied by a concomitant replenishment of protons, diffusing down the concentration gradient from the semi-infinite bulk solution as described by Fickian diffusion laws (Eq. S2). The boundary conditions at t>0 are:

$$t > 0\begin{cases} r = r_{particle}, & D_{H^+}\frac{\partial[H^+]}{\partial r}|_{r=r_{particle}} = -k_1[H^+]_{surface} \\ r_{particle} < r < r_{max}, & \frac{\partial[H^+]}{\partial t} = D_{H^+}\left(\frac{\partial^2[H^+]}{\partial r^2} + \frac{2}{r}\frac{\partial[H^+]}{\partial r}\right) \\ r = r_{max}, & [H^+]_{r_{max}} = [H^+]_{bulk} \end{cases} \quad \text{Eq. S17}$$

where $[H^+]$ is the concentration of protons (mol m$^{-3}$), $D_{H^+}$ is the diffusion coefficient of $H^+$ (mol m$^{-2}$), t is time (s), r is the distance from the centre of particle and $r_{max}$ is, again, a distance sufficient far away from the particle interface such that the concentration at $r_{max}$ is unperturbed from the bulk concentration during the simulation $$r_{max} = r_{particle} + 6\sqrt{D_{H^+} t_{max}} \quad \text{Eq. S18}$$

As in Section 5, the differential equations are discretized using finite difference methods and solved backwards implicitly (R. G. Compton, E. Katelhon, K. R. Ward and E. Laborda, *Understanding Voltammetry: Simulation of Electrode Processes*, World Scientific, 2020). The simulation was benchmarked thoroughly with analytical expressions including tests such as conservation of mass and convergence study, more of which is detailed in authors' previous work (E. Katelhon and R. G. Compton, *Analyst*, 2015, 140, 2592-2598).

Figure 14:
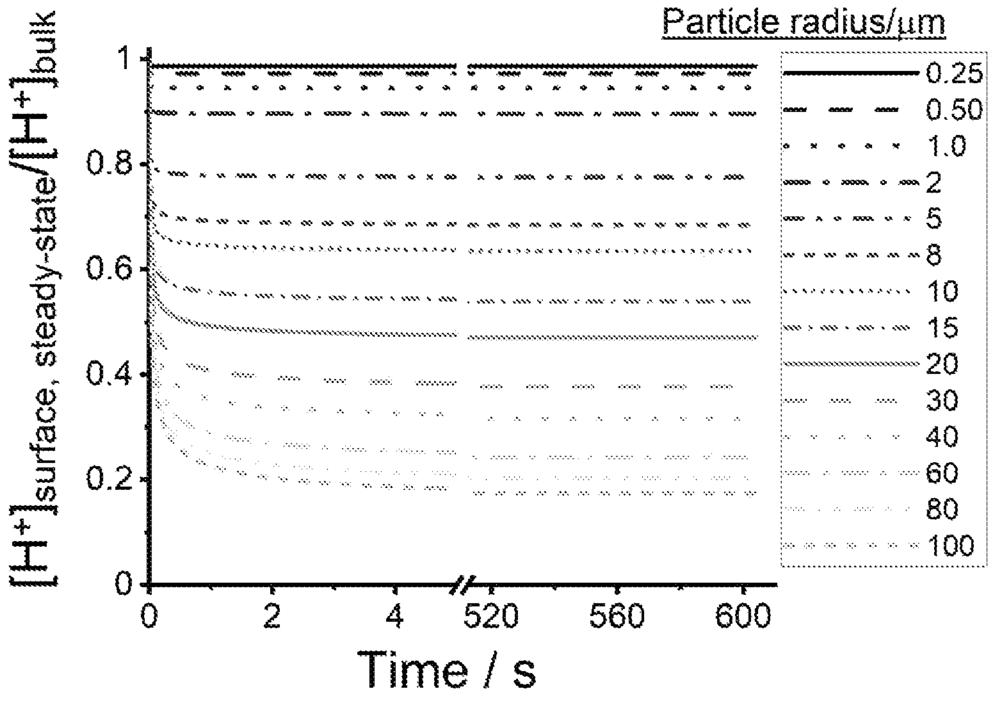
FIG. 14 shows a plot of surface proton concentration with time, normalized to the bulk concentration of protons. Other simulation parameters are: $k_1$=0.043 $cm^{-1}$, $D_{H+}$=7.4:$10^{-9}$ $m^2s^{-1}$, $c_p$=1 and the range of $r_{particle}$ is shown in graph legend (0.25-100 μm).

FIG. 14 shows the $[H^+]_{surface}$ as a function of time for 'smooth' spherical calcite particles with different radius. As can be seen, a steady-state $[H^+]_{surface}$ is reached within a couple of seconds of simulation as a result of the high diffusion coefficient of $H^+$ in aqueous solution. As the size of particle increases from sub-micron to larger than 10 microns, the $[H^+]_{surface}$ at steady-state is seen to decrease to a value less than 60% of the bulk proton concentration; this is a classic change in the convergence diffusion regime for when the particle size is small compare to the diffusion layer thickness, to that of a 'linear' diffusion regime when the particle size is big compare to the diffusion layer thickness.

Figure 15:
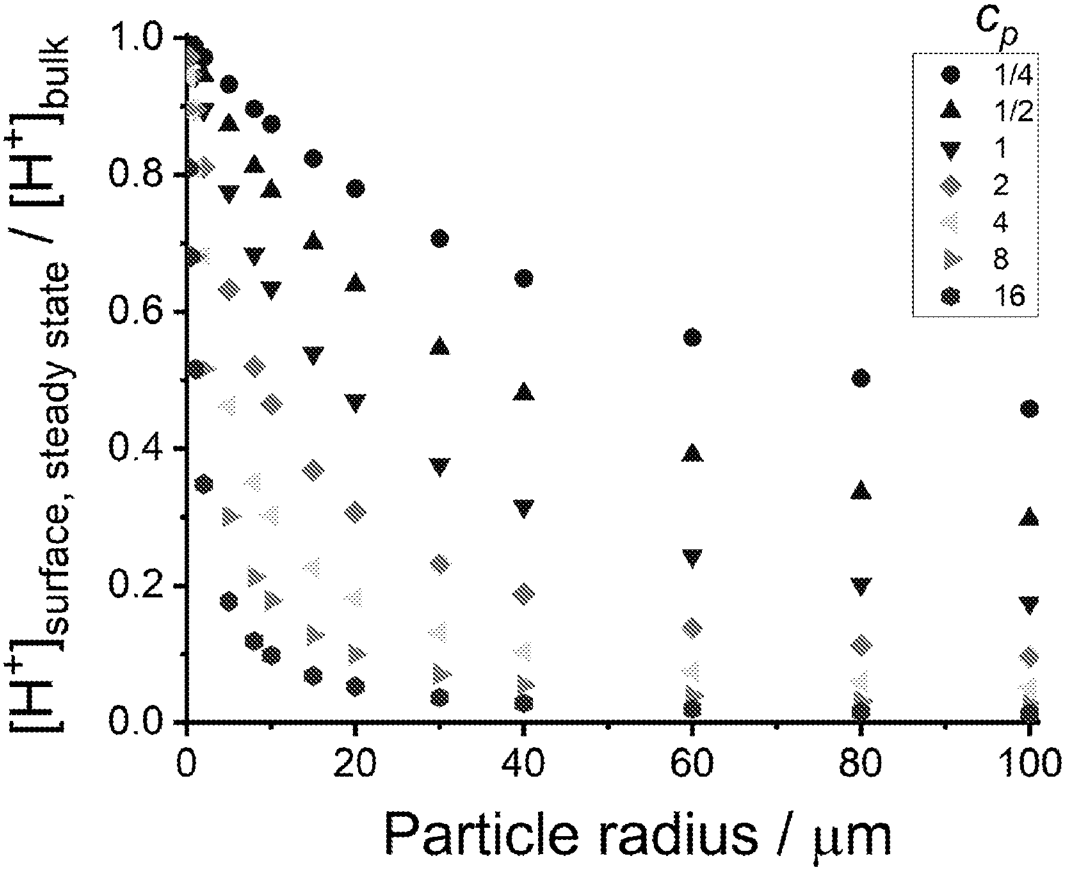
FIG. 15 shows a plot of the steady-state surface proton concentration, relative to the bulk concentration, as a function of both the radius of the particle and $c_p$ values. Other simulation parameters are: $k_1$=0.043 cm $s^{-1}$, $D_{H+}$=7.4 times $10^{-9}$ $m^2$ $s^{-1}$ and the range of $r_{particle}$ and $c_p$ is shown in the plot.

FIG. 15 plots the steady-state $[H^+]_{surface}$ for particle with different surface roughness, as expressed by increasing the value of $c_p$ in equation Eq. S15. As the surface of the particle becomes rougher (high $c_p$), more surface-area of calcite is available to react, thus leading to a decrease in the surface proton concentration.

In the Examples above, the dissolution of coccoliths is analysed as of disk-like calcite particles with a non-unity surface roughness factor. The largest of all species in this study (*C. braaudii*) has a typical coccolith thickness of 1-2 μm and $r_{eff}$<6 μm.

It can be inferred from FIG. 15 that if a calcite particle, with equivalent dimensions to that of a coccolith, were to be exposed to a strong acidic chemical environment, the deviation in $[H^+]_{surface}$ is no more than ~30% from $[H^+]_{bulk}$.

For the smaller types of coccoliths, such as those found bearing on *E. huxleyi* (typically measured thickness <0.7 μm and $r_{eff}$<2.5 μm) the $[H^+]_{surface}$ is approximately equal to $[H^+]_{bulk}$.

Therefore, the dissolution of coccoliths in a strong acidic environment occurs within a regime controlled by the surface reaction rate ($[H^+]_{surface} \approx [H^+]_{bulk}$), and not the mass-transport of protons to the particle ($[H^+]_{surface} \approx 0$).

6.3 Experimental Verification of the Dissolution Kinetics

Figure 16:
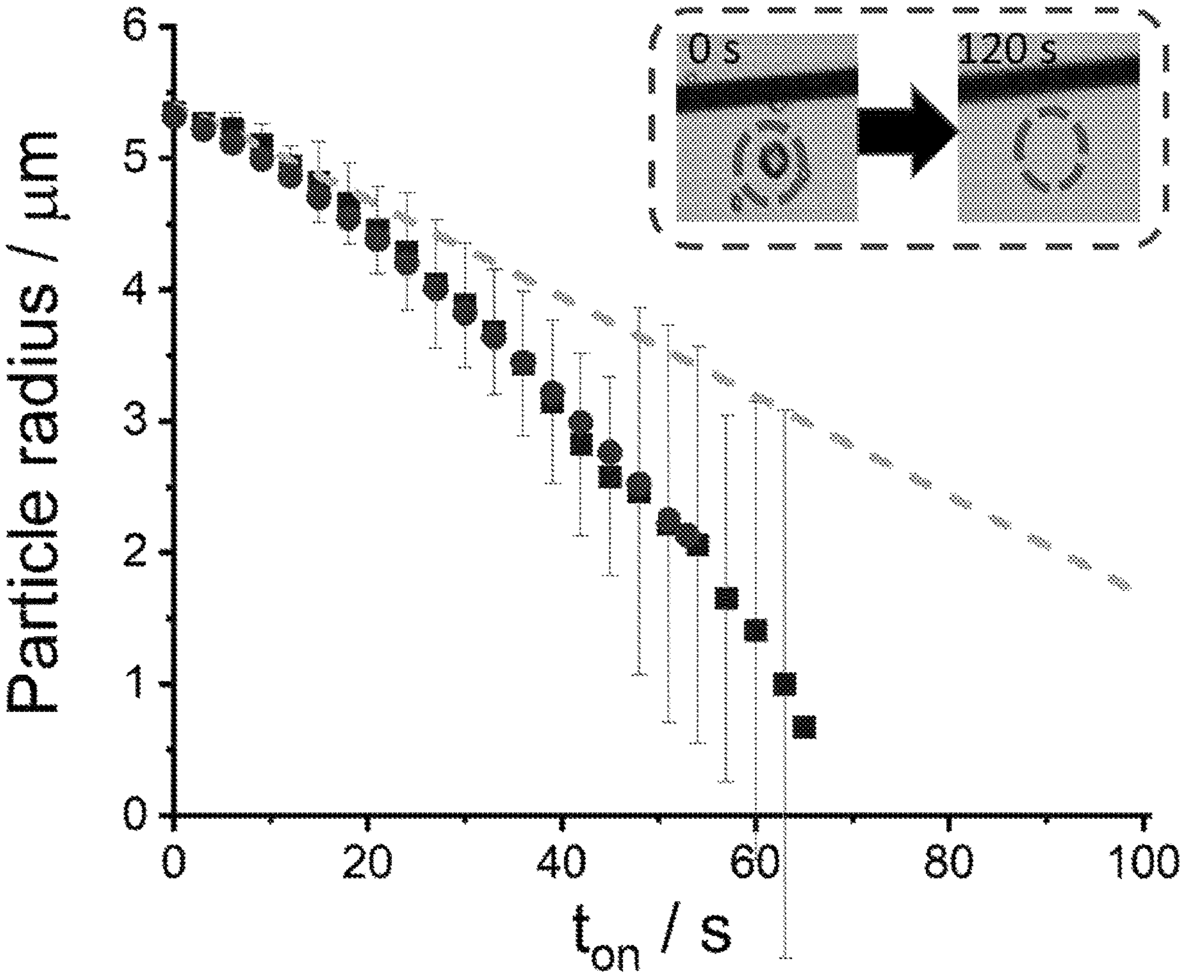
FIG. 16 shows the change in the particle radius of a quasi-spherical detrital calcite particle with time(s) at a distance of 16 μm from the carbon-fibre wire electrode ($r_e$=3.5 μm). At the start of the experiment ($t_{on}$=0 s), the potential applied to the wire electrode is stepped from 0V to +1.2V (vs Ag wire) to fully drive the oxidation of 10 mM $H_2BQ$ (aq) in the 0.7 M $KNO_3$ electrolyte. The dissolution of the detrital particle analysis via two approaches: square—the particle radius measured from the centre of mass (average with error bar) and the dots is the $r_{eff}$ calculated from the projection area after image threshold, where $\pi r_{eff}^2$=area. The dotted line is the predicted calcite dissolution rate occurring at a surface-area controlled rate. Inlay shows the detrital particle at $t_{on}$=0 s and at $t_{on}$=120 s.

In order to verify the above model, the dissolution of a solid calcite particle was studied in the electrochemical cell. FIG. 16 shows the rate of calcite particle shrinkage ($r_{eff}$=5.4 μm) when exposed to the strong acidic environment, the experimental conditions mirror those used in the coccolith in the opto-electrochemical experiment. The purple squares and red dots represents two approaches in quantifying the particle size from image analysis. The green dashed line is the expected dissolution rate for a solid particle as numerically predicted based on the above model and where $c_p$=1. The initial slope (μm $s^{-1}$) within the first tens of seconds matches with excellent agreement to that numerically predicted rate of shrinkage when $[H^+]_{surface}=[H^+](r,t)$; where $[H^+](r,t)$ is the numerically simulated proton concentration in the opto-electrochemical experiment—see Appendix section 5. Notice the initial slope deviates from linearity after 20 seconds is similar to the 'dog leg' kinetics seen with the dissolution of coccoliths. This is due to the start of the dissolution of the calcite particle perpendicular to the projection plane of the 2D image.

Figure 7:
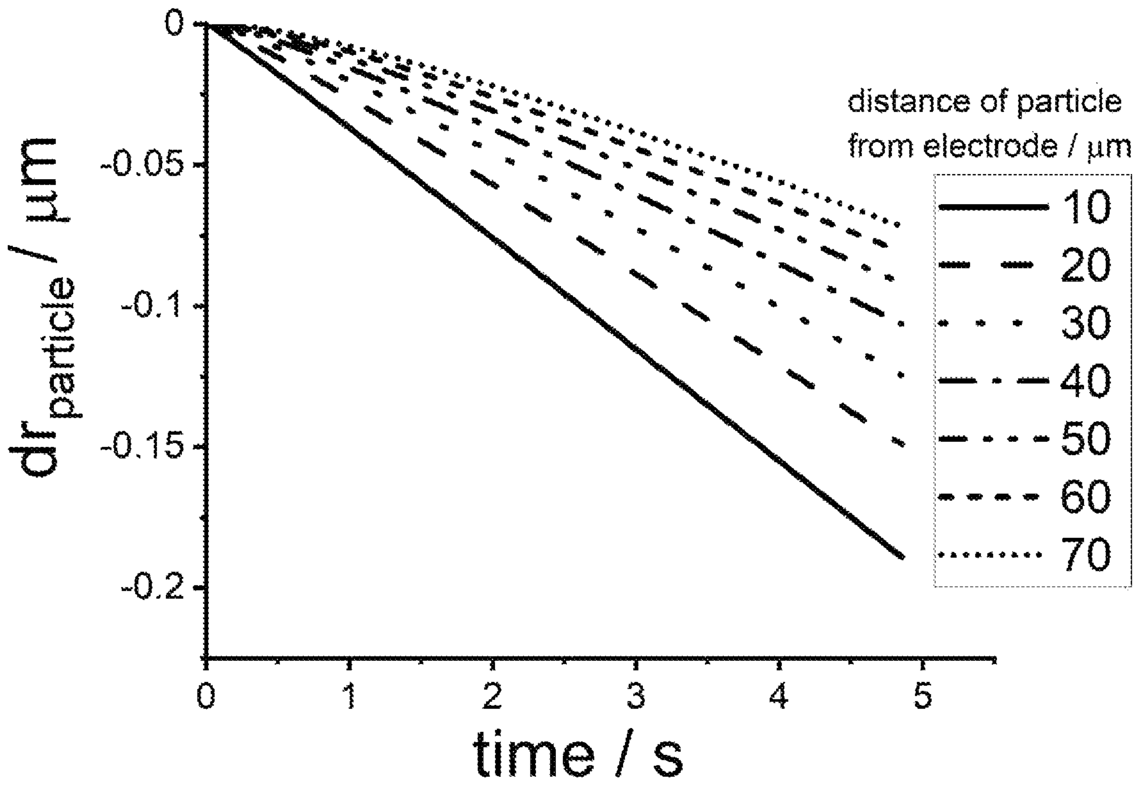
FIG. 7 demonstrates the shrinkage of solid calcite particles ($c_p$=1) as a function of time in the opto-electrochemical cell. The particle distance from the electrode (r) is shown in the legend. The proton concentration [H](r, t) used for the calculation is reported in FIG. 6.

6.4 Numerically Predicted Dissolution Kinetics of a Calcite Particle as a Function of Distance from the Electrode FIG. 7 predicts the shrinkage of perfectly spherical solid calcite particles in the above opto-electrochemical experiment. The change in particle-size as a function of time is calculated via Eq. S15, using the proton concentration profile $[H^+](r, t)$ shown in FIG. 6—simulated for an inert electrolyte ($c_p$=1).

The initial dissolution rate, ($dr_{particle}/dt$) in FIG. 7, is shown to be sensitive to the distance of particle from the electrode, with a faster dissolution rate for particle near to the electrode. A particle distance of 70 μm from the electrode, however, the dissolution rate at t≈0s is sluggish due to the finite time required for the proton to diffusion from the electrode, but over the course of ~2-3 s, the slope is approximately averaged to a constant value. This is fully consistent with that seen experimental for dissolution of coccolith, as shown in FIG. 5.

Appendix and Experimental Section for Example 3

Chemicals

The chemicals are sourced as described for Example 1, and wherein calcium chloride dihydrate and potassium chloride were purchased from Sigma-Aldridge, U.K.

Cell Culture

The cultures are as described for Example 1, i.e., wherein cultures were grown on a K/2 enriched growth medium, but wherein all cultures were kept in a PHCbi MLR-352-PE Incubator (PHC Europe B.V.), on a 14:10 light-dark cycle with a PAR intensity of 20-40 μmol $m^{-2}$ $s^{-1}$. Electrochemistry studies of the coccolithophores were conducted between 2-4 μm each day so that the various measurements of cell morphology were obtained at roughly the same time point in the circadian rhythm. Simultaneously, the cell numbers per mL for each experimental culture were measured using a coulter counter (Beckman Coulter Z2 Particle Counter) so that culture growth could be tracked alongside measuring cellular $CaCO_3$ each day (see FIG. 21 *a-c*)

Scanning Electron Microscopy

Phytoplankton cultures were filtered using a polycarbonate filter (3.0 μm), washed with deionized water, and subsequently dried at atmospheric pressure. Prior to the imaging, a thin layer of gold was coated over the filtered sample using a rotary pumped coater (Q150RES, Quorum, UK). The Scanning Electron Microscopy (SEM) images and Energy-dispersive X-ray (EDX) spectroscopy were obtained using a Sigma 300 FEG-SEM from Zeiss with an accelerating voltage of 10.0 kV.

Optical Microscopy

Optical measurements were made on a Zeiss Axio Examiner, A1 Epifluorescence microscope (Carl Zeiss Ltd., Cambridge U.K.), using a 20× objective lens (NA=0.5, EC Plan-Neofluar) for *E. huxleyi* and *G. oceanica* and 10× objective lens (NA=0.3, EC Plan-Neofluar) for *C. braarudii*. The video acquisition was provided by a Hamamatsu ORCA-Flash 4.0 digital CMOS camera (Hamamatsu, Japan), providing 16-bit images with 4-megapixel resolution.

Opto-Electrochemistry Apparatus

The 3D-printed (Form 2, Formlabs, UK) opto-electrochemical cell houses a three-electrode setup: a glassy carbon electrode (diameter=3.00 mm, BASi, USA) as the working electrode, a saturated calomel electrode (SCE, ALS distributed by BASi, Tokyo, Japan) was used as the reference electrode and a graphite carbon rod as the counter electrode. Approximately 50 μL of culture sample containing the coccolithophores were dropcasted onto the glassy carbon electrode prior to the experiment. A period of time of approximately 30 s was allowed for the coccolithophores to sediment onto the surface of the electrode before the culturing solution were adsorbed carefully by tissue. The opto-electrochemical cell is then filled with ~1.0 ml of electrolyte containing 0.7 M KCl, 20 mM $CaCl_2$ and either 2 or 10 mM of $H_2BQ$. A higher concentration of the acid-precursor is used for *C. braarudii* (10 mM of $H_2BQ$) and 2 mM is used for *G. oceanica* and *E. huxleyi*. Potentiostatic control and synchronization with the microscopy camera were provided by a previously developed in-house built device (see *Analyst,* 2015, 140, 5048-5054) and current amplifier (Keithley 427) from Keithley Instruments Inc, US. A potential of +1.0V vs SCE was applied to the working electrode to drive fully the oxidation reaction of hydroquinone to form benzoquinone and two molar equivalents of protons. The opto-electrochemical experiments require approximately 5 minutes from setup to completion. This includes: injecting coccolithophore samples into the opto-electrochemical cell, setting up the optical focus for imaging, connecting the electrodes to the potentiostat and the time required for the electro-generated acid to completely dissolve pico- to nanograms of biogenic calcium carbonate. Depending on the number density of the coccolithophore sample, which varies between species and incubation period, typically 10-50 individual coccolithophore were analysed per opto-electrochemical experiment.

Image Analysis

During the course of the opto-electrochemical experiment the cell was optically imaged at 10 fps. The resulting series of images were analyzed using (Fiji distribution) ImageJ freeware. Macro scripting in ImageJ allows living coccolithophore individuals to be identified and separated from inanimate shrapnel by their in vivo chl-a fluorescence signals. Coccolithophores that are within a distance of five coccosphere radii are removed from the analysis, (see below for acid dissolution kinetics of coccolithophores). The stack of images containing the individual coccospheres was auto-thresholded by built-in imageJ methods to extract the projection area in the 2-D image plane. The image analysis to calculate the PIC and POC of all individual coccolithophores present in an experiment requires approximately 4-5 minutes and this can be executed in parallel to the experiments.

Energy-Dispersive X-Ray Spectroscopy of Coccolithophores

FIG. 18 shows SEM images of *C. braarudii, G. oceanica* and *E. huxleyi* after 9 days of growth. The white rectangles represent the region of interest in which the energy-dispersive X-ray (EDX) spectrums were sampled. The ratio of the elements is shown in the inlay of the EDX spectrum. The elemental mapping reports carbon (~35%), oxygen (~53%), calcium (~10%) and other trace elements such as sodium and chloride which may arise from residues of the culture medium. EDX reveals a higher atomic ratio of carbon and oxygen to the amount of calcium expected for pure $CaCO_3$. This is likely due to the polysaccharide layer present on the surface of the biogenic coccoliths. Note that the EDX reported ratio of Ca:C:O is likely not representative of the entire coccosphere because the ray penetration is typically only microns below the surface of dense materials. The mass percentage of polysaccharides on *E. huxleyi* and *G. oceanica* coccoliths are reported to be no more than 3%. Assuming that all calcium is $CaCO_3$, the remainder carbon and oxygen atom % associated with the polysaccharide layer is approximately 1:1 which is in full consistence with the molecular formula of common polysaccharide units such as glucose, fructose and mannose ($C_6H_{12}O_6$).

Dissolution of Coccospheres in Ca2+-Free Electrolyte

The solubility constant $$(K_{sp}^{0})$$

of calcite, $CaCO_3$, in infinite dilution at 298K is $3.3\times10^{-9}$ $M^{2.9}$ $$CaCO_3(s) \rightleftharpoons Ca^{2+}(aq)+CO_3^{2-}(aq);K_{SP}=[Ca^{2+}][CO_3^{2-}] \quad \text{Equation S16}$$

In seawater, however, the solubility of calcite changes as a function of temperature (K) and salinity (g/kg, ‰):

$$\log(K_{sp}^{*}) = \log(K_{sp}^{0}) + \left(-0.77712 + 0.0028426T + \frac{178.34}{T}\right)S^{0.5} - 0.07711S + 0.0041249S^{1.5} \quad \text{Equation S17}$$

Figure 23:
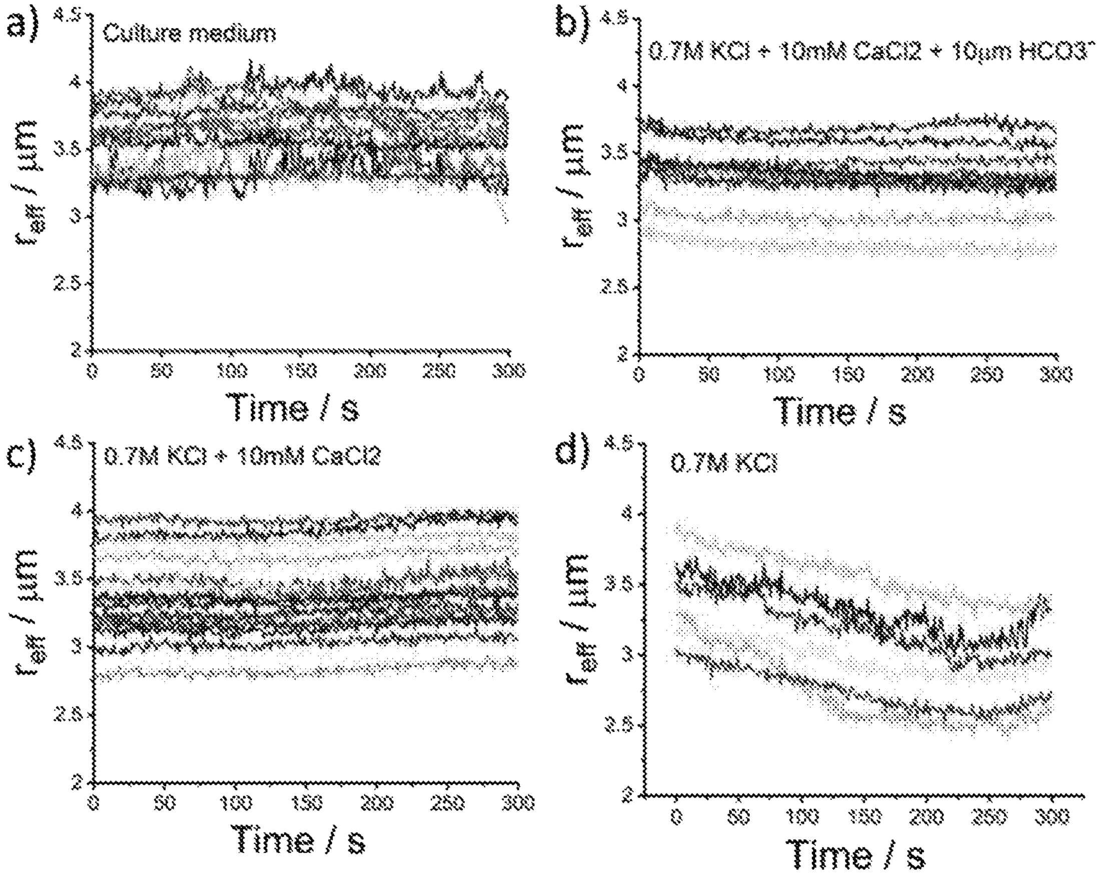
FIG. 23 shows the optical sizing of *E. huxleyi* coccospheres as a function of time immersed in different compositions of aqueous electrolytes: a) K/2 culture medium, b) 0.7 M KCl, 10 mM $CaCl_2$ and 10 μM $NaHCO_3$, c) 0.7 M KCl and 10 mM $CaCl_2$ and d) 0.7 M KCl only. In all cases, approximately 30s is required to set to the image acquisition after exposing the coccolithophore to the electrolyte. Each line represents an individual coccolithophore.
Figure 24:
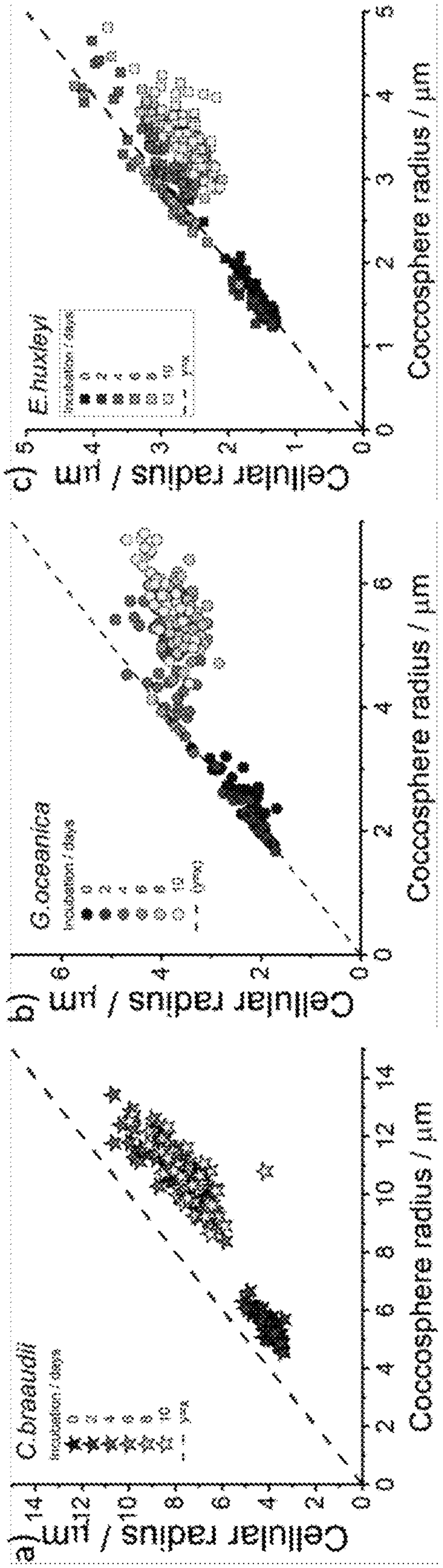
FIG. 24 shows the effective radius of coccolithophores measured after complete acid dissolution against that prior to acid dissolution. Speciation of coccolithophores: a) *C. braarudii*, b) *G. oceanica* and c) *E. huxleyi*. The electrolyte contains 0.7 M KCl and either 10 mM of $H_2BQ$ for *C. braarudii* or 2 mM $H_2BQ$ for *G. oceanica* and *E. huxleyi*. The dotted line represents the y=x line corresponding to no $CaCO_3$ shell.

Using a typical seawater salinity of ~30‰, the solubility of calcite $K_{sp}$*, in seawater at 298K can be calculated using Equation S17 to give a value of $3.5\times10^{-7}$ $M^2$. This suggests a solution saturated with $CaCO_3$ will contain ~0.6 mM of $Ca^{2+}$ and $CO_3^{2-}$. FIG. 23 shows the optically measured size of individual coccolithophores as a function of time in electrolytes containing various saturation levels of $Ca^{2+}$ and $CO_3^{2-}$. Each line represents a single/individual coccolithophore cell. As can be seen in FIG. 23*a*), the size of the *E. huxleyi* coccospheres were invariant over 6 minutes in the culture medium, which contains an over-saturation of 2.4 mM of $HCO_3^-$ and 10 mM of $Ca^{2+}$. The radius of *E. huxleyi* coccospheres spans over the size range of 3.2-3.9 μm. This is not surprising because coccolithophores grow in the K/2 culture medium which mimics sea-water conditions. Moving away from the culture medium, in a solution containing 0.7 M KCl and 10 mM of $Ca^{2+}$ and $HCO_3$ (oversaturated with respect to calcite), the size of the coccolithophores were also invariant over the timescale of the experiment. Next, removing the $HCO_3^-/CO_3^{2-}$ components to leave a solution containing only 10 mM of $Ca^{2+}$ and 0.7 M KCl, as shown in FIG. 23*c*), is sufficient to prevent the dissolution of the calcareous shell over the time of the experiment. In the absence of neither $Ca^{2+}$ nor $HCO_3^-$, however, the coccolithophore radius decreased by approximately 0.5 μm over the time scale of a few minutes. It is clear that this corresponds to the dissolution of the biogenic calcite shell of the *E. huxleyi* coccolithophores in an under-saturated solution with respect to $CaCO_3$. Moreover, FIG. 24 plots the size of the individual coccolithophores measured optically in the opto-electrochemical experiment, before and after, complete acid dissolution in the absence of added $Ca^{2+}$. As can be seen, the *E. huxleyi* and *G. oceanica* coccosphere at the early part of the growth curve lie on the y=x line which corresponds to no shell at the time of the opto-electrochemical measurement (invariant to acid attack). This is because the time required to set up the opto-electrochemical experiment, which is approximately 3 minutes after the addition of $Ca^{2+}$-free electrolyte, the calcareous shell had already dissolved. Therefore, it is preferable to conduct the opto-electrochemical experiments with the addition of at least 10 mM of $Ca^{2+}$ in the electrolyte. Note that $HCO_3^-$ is not added because it is neither essential nor preferred, and because it could prohibit the acid dissolution of calcite as $HCO_3^-$ is a buffer and can react with the electrogenerated protons.

Acid Dissolution Kinetics of Core-Shell Particles: Theory

In this section, we consider the rate at which the calcite in a coccolithophore is expected to dissolve when the coccosphere is supported on an acid-producing electrode substrate. The electrode produces acid by oxidising hydroquinone ($H_2BQ$) to benzoquinone (BQ) as given by:

$$H_2BQ(aq)\rightarrow BQ(aq)+2H^+(aq)+2e^- \quad \text{Equation S18}$$

This locally formed acid diffuses outward and reacts with the biogenic calcite, as described by the following reaction:

$$CaCO_3(s)+2H^+(aq)\rightarrow Ca^{2+}(aq)+CO_2(g)+H_2O(l) \quad \text{Equation S19}$$

In the following, we will consider the coccolithophore to be a perfect sphere and determine the mass-transport limited flux to it.

Mass-Transport Controlled Flux to a Sphere on a Generator

For a sphere isolated in the solution phase the diffusion only mass-transport limited flux (j/mol $s^{-1}$) to the surface of the sphere is:[10]

$$j_{MT} = 4\pi rDC\left(\frac{r}{(D\pi t)^{0.5}} + 1\right) \quad \text{Equation S20}$$

At short times the flux to the surface is proportional to the surface area of the particle and at long times a steady-state is attained where the rate is proportional to the radius of the particle. Importantly for the present case when the sphere is supported on a planar surface, and hence the surface diffusionally blocks material from reaching the particle, then the steady-state flux ($j_{MT,ss}$) to the particle in the long-time limit is an analytically tractable problem, where:

$$j_{MT,ss} = 4\pi rDC\ln(2) \quad \text{Equation S21}$$

The presence of the supporting surface decreases the diffusional mass-transport limited flux by ca. 30% as compared to a sphere isolated in the solution (1−ln(2)). For the experimental example in this work, the acid is not present in the bulk solution but is generated electrochemically from an acid precursor at the electrode surface. Hence, we can think of the electrode as a generator of, and particle being a 'collector', of protons.

In the following, we consider the case where at the electrode, species A (hydrobenzoquinone) is converted into two stoichiometric equivalents of B (protons).

$$A \rightarrow 2B \quad \text{Equation S22}$$

Figure 25:
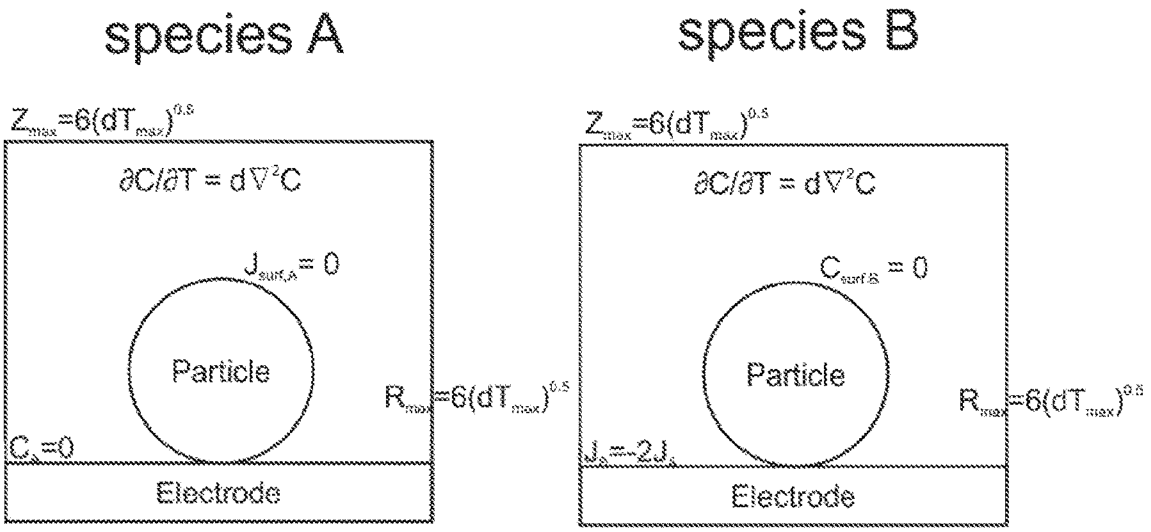
FIG. 25 shows a schematic of the mass-transport problem that requires solving for a slowly dissolving spherical particle on a generating plate (electrode). Initially, species A is uniformly distributed across the solution phase and species B is not present. Nomenclature follows that used in *Understanding Voltammetry: Simulation Of Electrode Processes*, World Scientific Publishing Company, 2013.

Species B diffuse down the concentration gradient away from the electrode surface and is subsequently irreversibly consumed at the surface of the calcite particle according to Equation S17. In this model we only need to consider the mass-transport of two species, A and B, as shown in FIG. 25. Initially, the concentration of species A is uniform across the solution phase and there is no species B present. After the electrode is 'switched-on' species A is then consumed at a mass-transport limited rate at the electrode surface to form two stoichiometric equivalents of B. Species B then diffuses out from the electrode and is itself irreversibly and instantaneously consumed at the particle surface. The model contains separate variables to account for unequal diffusion coefficients of species A and B. Due to the symmetry of the system, and through the use of a cylindrical coordinate system, the problem can be reduced to two-dimensions. Solving this generator-collector problem requires numerical simulation. Herein we use a fully implicit central finite difference scheme to solve the diffusion equation subject to the boundary conditions outlined in FIG. 25. Numerical solving of the resulting system of simultaneous equations was achieved using a GPU optimised iterative solver method (see *Journal of Electroanalytical Chemistry,* 2020, 877, 114607; and R. D. Falgout and U. M. Yang, *hypre: A library of high performance preconditioners*, Springer, 2002) allowing the fully implicit two-dimensional problem to be solved without recourse to the use of explicit terms as used for example in the ADI method.

Figure 26:
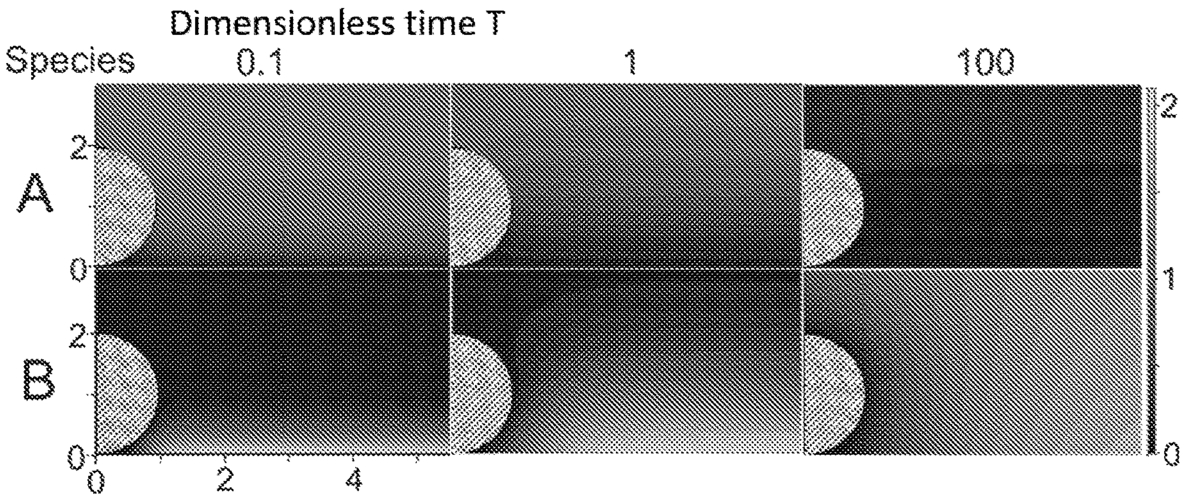
FIG. 26 shows the concentration profiles for both species A (top row) and B (bottom row) for a particle on a generating plate for three different times. Initially, species A is uniformly present in the solution phase at a concentration of 1, and there is no B. Species A is subsequently converted to species B (at the electrode, x-axis) at a diffusion-limited rate. Following the stoichiometry of the reaction, two B are produced per A. Hence at the electrode surface at short times the concentration of the B is 2. B subsequently diffuses away from the interface and is consumed irreversibly and instantaneously at the surface of the spherical particle. Note both the x- and y-axis are normalised to the size of the particle, where the particle has a radius of 1.

There are two important questions that can be answered by this numerical model a) does the flux to the sphere reach a steady-state and if so on what timescale and b) if a steady-state flux is attained what controls the magnitude of the flux. FIG. 26 presents the numerically calculated concentration profiles for species A and B at three different times where the diffusion coefficients of species A and B are equal. In this figure only half of the particle is shown, further, the x and y coordinates are normalised to the size of the particle where the particle has a radius of one. The time is also presented in its dimensionless form, $T=Dt/r^2$. At short times (T=0.1) the diffusion layer is small as compared to the size of the particle. As T increases the diffusion layer expands and species B is consumed at the particle surface. Integration of the flux of B across the particle surface allows the flux to the particle to be numerically assessed as a function of time.

Figure 27:
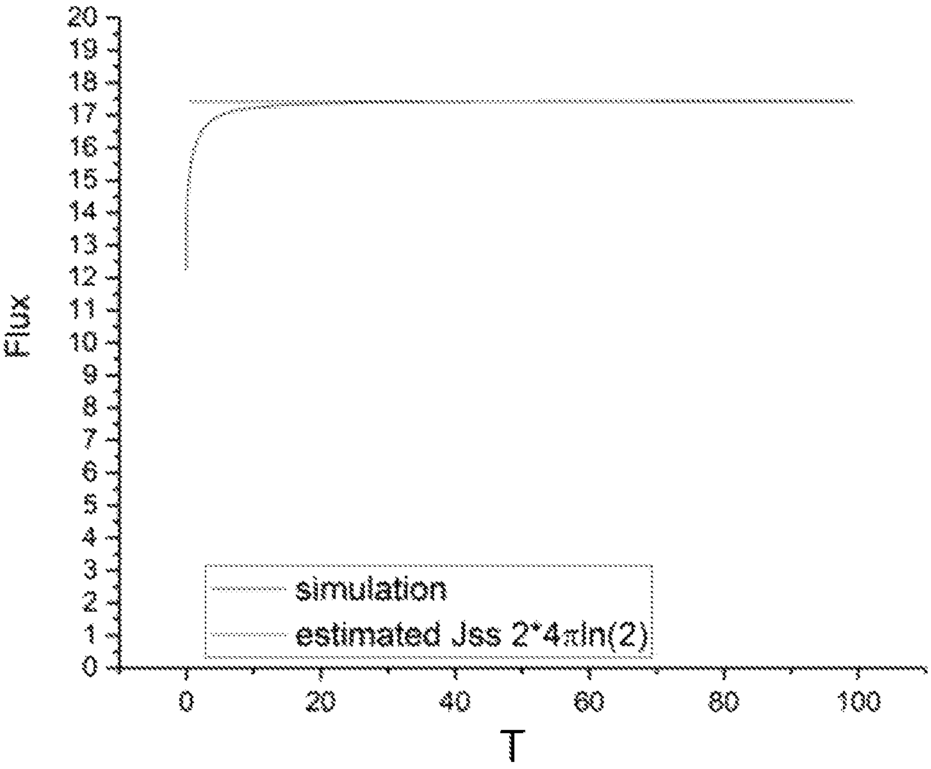
FIG. 27 shows a plot of the numerically calculated flux to the spherical particle on the generating electrode. As B is not initially present in the solution phase at very short times the flux of B to the particle is close to zero, before rising and after $T\approx 1$ reaching a steady-state flux.

FIG. 27 presents the dimensionless flux (=j/DCr) of B to the particle as a function of the dimensionless time (T). At short times the flux of B to the particle is low and increases as the diffusion layer of B expands. At long times (T>20) a steady-state flux of B to the particle arises, moreover this steady-state is rapidly attained where even at T=1, the flux is within 10%of its steady-state value. For example, for a particle with a 10 micron radius we would predict that the flux to the sphere will be within 10%of its steady-state value after only ~0.1 seconds. Furthermore, in the case where the diffusion coefficient of species A is equal to B then the steady-state dimensionless flux of B to the particle surface is found to be 17.4. Analytically this steady-state flux is equal to $\chi^{4\pi\ ln}(2)$, where $\chi$ is the stoichiometric ratio between species A and B, i.e. for the present model this value is 2. Hence, the steady-state flux to the spherical particle on a generating electrode is the same as the flux to a sphere on a surface bathed in a bulk solution of B, where the concentration of B is double that of A. All that needs to be considered is how unequal diffusion coefficients of species A and B will influence the flux of B to the particle surface. Succinctly stated the flux to the particle is proportional to the square root of the product of the two diffusion coefficients. Consequently, at steady-state the flux (j/mol $s^{-1}$) of species B to the particle in its dimensional version, where B is generated at the supporting electrode is, reported for the first time:

$$j_{MT} = \chi 4\pi \ln(2)(D_A D_B)^{0.5} c_{A,bulk} r_{sphere} \quad \text{Equation S23}$$

where for the present case $\chi$ equals 2, reflecting the stoichiometry of the electrode reaction. In the above experiments, this expression is used to describe the mass-transport limited flux of protons to the coccolithophore.

Uncertainty in PIC Measurements

In this section, the uncertainties associated with both the measurement leading to, and the calculation of, PIC are discussed. In particular, first, experimentally, the error associated with the optical sizing of particles is compared to that obtained under SEM imaging. Second, for the calculation of PIC an estimated value of the surface roughness factor ($R_f$) is used and how much of this uncertainty affects the PIC content.

Particle Sizing Measurements: Optical Imaging Versus SEM

Figure 28:
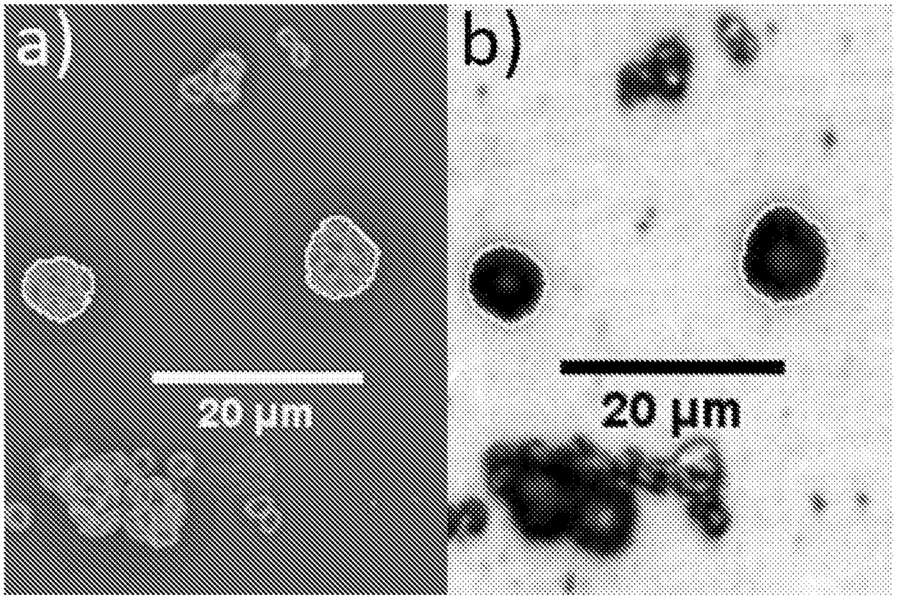
FIG. 28 shows identical *E. huxleyi* coccolithophores imaged using a) SEM and b) optical microscope with a 20× obj. lens. The white outline is used to calculate the projection area of the coccosphere, statistics of which are displayed in Table A3. Scale bar=20 μm.

FIG. 28 shows a direct comparison of the same *E. huxleyi* sample taken by SEM and optical microscopy. The region of interests outlined were obtained after image thresholding. The outlined area is used to calculate the effective particle radius ($r_{eff}$) assuming a perfect sphere (area=$\pi r_{eff}^2$). The below Table summarises the size difference between SEM and optical images of the same coccolithophore individuals. As can be seen, optical measurements have the tendency to overestimate $r_{eff}$ by up to 20% relative to that obtained via SEM imaging. This overestimation in the optical size measurements is due to the limitation in the wavelength of light (~400 nm) resulting in a blurred edge of the particle. Note that this is an intrinsic limitation of optical techniques for sizing micron-sized particles. No correction for optical measurement of $r_{eff}$ was made for PIC and POC calculations.

TABLE A3

| Species | Sample size | $r_{eff}$ (SEM)/ μm | $r_{eff}$ (optics)/ μm | Over-estimation by optics/μm | Over-estimation by optics in % |
|---|---|---|---|---|---|
| *C. braarudii* | 11 | 10.7 ± 1.0 | 10.9 ± 1.1 | 0.2 | +1.8% |
| *G. oceanica* | 4 | 5.0 ± 0.3 | 5.9 ± 0.3 | 0.9 | +18.0% |
| *E. huxleyi* | 8 | 3.2 ± 0.3 | 3.9 ± 0.4 | 0.7 | +21.8% |

Effects of Surface Roughness

The dissolution of coccolithophores ($r_{eff}$~10 μm) under strong acid conditions occurs in a mixed kinetics regime as discussed in the main text. The total flux of acid reacting away from the calcareous shell, $j_{tot}$ (mol $s^{-1}$), is the reciprocal of the sum of the reciprocal of $j_{surf}$ and $j_{MT}$. Where the surface-limited reaction kinetics, $j_{surf}$, is directly proportional to the surface roughness factor ($R_f$). Note that $R_f$ is related to the specific surface area of a sphere by $$Area=4\pi R_f r^2$$

The $R_f$ value of a standard golf ball, accounting for the area of the dimples, is approximately ~1.3. Therefore, it is not unreasonable that a coccosphere, encrusted with interlocking coccoliths, may have $R_f$ values ranging from 2-6. The PIC values reported above are all calculated assuming an $R_f$ value of 4. Further work involved calculation of the PIC masses of coccolithophores using different values of $R_f$ (=2, 4 and 6). For *C. braarudii*, the PIC mass calculated using $R_f$=4±2 gives an average value of 3.9 ng±9/20%. For *E. huxleyi*, the effect of uncertainty of $R_f$ is larger resulting in an average PIC mass of 26 pg±19/32%. Note that due to the difference in the $r_{eff}$ proportionality for $j_{surf}$ and $j_{MT}$, the calculated PIC mass has a larger uncertainty for smaller sized coccospheres as a result of the estimated $R_f$.

Appendix Section 7—Coccolith Data

The table below tabulates all coccolith data shown in the Example 1 above.

TABLE A2

Tabulated Coccolith data from opto-electrochemical experiments. Distance from electrode was measured from the electrode edge to coccolith centre. All the electrolyte has an addition of 10 mM $H_2BQ$ acid precursor prior to the experiment. The concentration of the chemical components are: 0.7M $KNO_3$, 54.6 mM $Mg^{2+}$ and 2.4 mM $HCO_3$-. See SI Section 1.2 for K/2 culture medium. Effective radius ($r_{eff}$) was calculated from the coccoliths projection area measured after image threshold (Area = $\pi r_{eff}^2$). Coccolith length denotes the longest length of the coccolith, which is equivalent to the major axis for elliptical liths. The initial slope was the initial dissolution rate $dr_{eff}/dt$, obtained from $t_{on}$ = 0 s as shown in FIG. 5. Maximum thickness was obtained from the coccolith volume reconstruction. $c_p$ was the factor increase in dissolution rate as compared to a smooth and solid calcite particle with radius $r_{eff}$. Coccolith volume was obtained from image reconstruction and coccolith mass was estimated using a calcite density of 2.71 g $cm^{-3}$.

| Species | Electrolyte | Distance from electrode/μm | $r_{eff}$/ μm | Coccolith length/ μm | Initial slope/ μm $s^{-1}$ | Maximum thickness/ μm | $c_p$ | Coccolith volume/ $μm^3$ | Coccolith mass/pg |
|---|---|---|---|---|---|---|---|---|---|
| *C. braaudii* | $KNO_3$ | 13.5 | 4.1 | 8.6 | 0.16 | 0.9 | 4.4 | 31.0 | 82.3 |
| *C. braaudii* | $KNO_3$ | 32.9 | 3.4 | 7.6 | 0.16 | 0.8 | 6.3 | 21.0 | 53.9 |
| *C. braaudii* | $KNO_3$ | 33.2 | 2.9 | 7.0 | 0.12 | 0.5 | 4.8 | 15.0 | 40.7 |
| *C. braaudii* | $KNO_3$ | 32.8 | 3.9 | 7.9 | 0.11 | 0.8 | 4.1 | 32.0 | 53.4 |
| *C. braaudii* | $KNO_3$ | 42.8 | 5.1 | 10.8 | 0.06 | 1.2 | 5.5 | 105.0 | 159.9 |
| *C. braaudii* | $KNO_3$ | 61.2 | 3.8 | 7.7 | 0.06 | 0.4 | 5.5 | 26.6 | 21.4 |
| *C. braaudii* | $KNO_3$ | 79.0 | 4.4 | 8.8 | 0.13 | 0.9 | 5.7 | 42.5 | 115.2 |
| *C. braaudii* | $KNO_3$ | 42.4 | 5.0 | 10.6 | 0.16 | 1.4 | 8.2 | 72.8 | 197.3 |
| *C. braaudii* | $KNO_3$ | 54.3 | 4.3 | 9.9 | 0.10 | 0.7 | 7.1 | 27.2 | 73.7 |
| *C. braaudii* | $KNO_3$ | 70.2 | 4.8 | 10.2 | 0.13 | 1.0 | 12 | 42.5 | 115.2 |
| *C. braaudii* | $KNO_3$ | 40.8 | 4.5 | 10.2 | 0.10 | 0.9 | 5.4 | 38.4 | 104.1 |
| *C. braaudii* | $KNO_3$ | 21.2 | 4.6 | 10.0 | 0.13 | 1.1 | 4.5 | 45.6 | 123.6 |
| *C. braaudii* | $KNO_3$ | 34.5 | 4.0 | 9.2 | 0.19 | 1.1 | 8.7 | 34.6 | 93.8 |
| *C. braaudii* | $KNO_3$ | 11.4 | 4.7 | 10.2 | 0.20 | 2.0 | 5.4 | 72.6 | 196.7 |
| *C. braaudii* | $KNO_3$ | 27.1 | 4.6 | 10.6 | 0.087 | 1.1 | 3.6 | 50.3 | 136.3 |
| *C. braaudii* | $KNO_3$ | 27.7 | 5.1 | 11.3 | 0.12 | 2.1 | 5.1 | 98.9 | 268.0 |
| *C. braaudii* | $KNO_3$ | 29.2 | 4.5 | 9.8 | 0.082 | 1.2 | 3.5 | 50.2 | 136.0 |
| *C. braaudii* | $KNO_3$ | 12.5 | 3.8 | 8.3 | 0.24 | 1.3 | 7.0 | 36.3 | 98.4 |
| *C. braaudii* | $KNO_3$ | 21.6 | 4.8 | 11.5 | 0.27 | 1.4 | 9.5 | 68.5 | 185.6 |
| *C. braaudii* | $KNO_3$ | 10.1 | 5.1 | 9.3 | 0.47 | 2.1 | 12 | 62.8 | 170.2 |
| *C. braaudii* | $KNO_3$ | 40.3 | 4.3 | 9.4 | 0.16 | 1.0 | 7.9 | 37.9 | 102.7 |
| *C. braaudii* | $KNO_3$ + $Mg^{2+}$ | 23.1 | 3.3 | 7.6 | 0.15 | 0.5 | 5.1 | 8.5 | 23.1 |
| *C. braaudii* | $KNO_3$ + $Mg^{2+}$ | 35.2 | 4.2 | 9.3 | 0.094 | 0.6 | 4.0 | 20.0 | 54.3 |
| *C. braaudii* | $KNO_3$ + $Mg^{2+}$ | 86.3 | 5.3 | 10.8 | 0.10 | 1.3 | 8.4 | 73.1 | 198.1 |
| *C. braaudii* | $KNO_3$ + $Mg^{2+}$ | 15.3 | 3.6 | 8.0 | 0.17 | 0.9 | 5.1 | 17.3 | 46.9 |
| *C. braaudii* | $KNO_3$ + $Mg^{2+}$ | 22.2 | 4.7 | 10.4 | 0.20 | 1.8 | 6.9 | 82.7 | 224.1 |
| *C. braaudii* | $KNO_3$ + $Mg^{2+}$ | 23.2 | 4.9 | 10.4 | 0.11 | 1.1 | 3.7 | 54.7 | 148.2 |

TABLE A2-continued

Tabulated Coccolith data from opto-electrochemical experiments. Distance from electrode was measured from the electrode edge to coccolith centre. All the electrolyte has an addition of 10 mM $H_2BQ$ acid precursor prior to the experiment. The concentration of the chemical components are: 0.7M $KNO_3$, 54.6 mM $Mg^{2+}$ and 2.4 mM $HCO_3$-. See SI Section 1.2 for K/2 culture medium. Effective radius ($r_{eff}$) was calculated from the coccoliths projection area measured after image threshold (Area = $\pi r_{eff}^2$). Coccolith length denotes the longest length of the coccolith, which is equivalent to the major axis for elliptical liths. The initial slope was the initial dissolution rate $dr_{eff}/dt$, obtained from $t_{on}$ = 0 s as shown in FIG. 5. Maximum thickness was obtained from the coccolith volume reconstruction. $c_p$ was the factor increase in dissolution rate as compared to a smooth and solid calcite particle with radius $r_{eff}$. Coccolith volume was obtained from image reconstruction and coccolith mass was estimated using a calcite density of 2.71 g $cm^{-3}$.

| Species | Electrolyte | Distance from electrode/μm | $r_{eff}$/ μm | Coccolith length/ μm | Initial slope/ μm $s^{-1}$ | Maximum thickness/ μm | $c_p$ | Coccolith volume/ $\mu m^3$ | Coccolith mass/pg |
|---|---|---|---|---|---|---|---|---|---|
| *C. braaudii* | $KNO_3$ + $Mg^{2+}$ | 34.7 | 4.0 | 9.7 | 0.15 | 1.2 | 6.1 | 34.5 | 93.5 |
| *C. braaudii* | $KNO_3$ + $Mg^{2+}$ | 38.5 | 3.9 | 9.1 | 0.13 | 1.2 | 5.6 | 39.5 | 107.0 |
| *C. braaudii* | $KNO_3$ + $Mg^{2+}$ | 50.7 | 4.5 | 9.6 | 0.14 | 1.0 | 7.2 | 34.4 | 93.2 |
| *C. braaudii* | $KNO_3$ + $Mg^{2+}$ | 57.3 | 4.7 | 9.9 | 0.072 | 1.0 | 4.2 | 44.2 | 119.8 |
| *C. braaudii* | $KNO_3$ + $Mg^{2+}$ | 70.2 | 4.8 | 10.6 | 0.053 | 0.7 | 3.6 | 34.1 | 92.4 |
| *C. braaudii* | $KNO_3$ + $Mg^{2+}$ | 17.5 | 4.9 | 10.2 | 0.042 | 0.6 | 1.3 | 24.9 | 67.5 |
| *C. braaudii* | $KNO_3$ + $Mg^{2+}$ | 27.2 | 4.4 | 9.9 | 0.046 | 0.6 | 1.7 | 29.0 | 78.5 |
| *C. braaudii* | $KNO_3$ + $Mg^{2+}$ | 24.9 | 4.9 | 10.8 | 0.063 | 1.0 | 2.3 | 45.6 | 123.6 |
| *C. braaudii* | $KNO_3$ + $Mg^{2+}$ | 26.7 | 3.9 | 9.2 | 0.088 | 0.9 | 3.2 | 28.4 | 77.0 |
| *C. braaudii* | $KNO_3$ + $Mg^{2+}$ | 28.6 | 5.0 | 11.4 | 0.10 | 1.3 | 3.9 | 66.3 | 179.7 |
| *C. braaudii* | $KNO_3$ + $Mg^{2+}$ | 44.4 | 4.1 | 7.9 | 0.085 | 0.8 | 4.2 | 29.4 | 79.7 |
| *C. braaudii* | $KNO_3$ + $Mg^{2+}$ | 65.6 | 4.5 | 9.9 | 0.053 | 0.7 | 3.4 | 28.8 | 78.0 |
| *C. braaudii* | $KNO_3$ + $Mg^{2+}$ | 48.3 | 3.6 | 8.3 | 0.085 | 0.7 | 4.4 | 22.6 | 61.2 |
| *C. braaudii* | $KNO_3$ + $Mg^{2+}$ | 51.2 | 3.4 | 8.0 | 0.099 | 0.7 | 5.3 | 21.2 | 57.5 |
| *C. braaudii* | $KNO_3$ + $Mg^{2+}$ | 27.6 | 4.7 | 10.5 | 0.14 | 1.2 | 5.4 | 56.0 | 151.7 |
| *C. braaudii* | $KNO_3$ + $Mg^{2+}$ | 29.6 | 3.7 | 8.3 | 0.14 | 1.0 | 5.3 | 27.5 | 74.5 |
| *C. braaudii* | $KNO_3$ + $Mg^{2+}$ | 64.1 | 3.8 | 8.9 | 0.072 | 0.6 | 4.6 | 18.6 | 50.4 |
| *C. braaudii* | $KNO_3$ + $HCO_3$- | 34.7 | 5.3 | 11.4 | 0.13 | 2.1 | 5.5 | 110.5 | 299.5 |
| *C. braaudii* | $KNO_3$ + $HCO_3$- | 86.3 | 4.3 | 9.4 | 0.054 | 1.1 | 4.4 | 40.0 | 108.4 |
| *C. braaudii* | $KNO_3$ + $HCO_3$- | 86.9 | 5.1 | 11.0 | 0.055 | 1.2 | 4.5 | 64.4 | 174.5 |
| *C. braaudii* | $KNO_3$ + $HCO_3$- | 16.5 | 3.9 | 9.4 | 0.13 | 1.1 | 3.9 | 37.4 | 101.3 |
| *C. braaudii* | $KNO_3$ + $HCO_3$- | 56.1 | 4.5 | 10.5 | 0.045 | 1.0 | 2.6 | 38.0 | 103.0 |
| *C. braaudii* | $KNO_3$ + $HCO_3$- | 22.5 | 4.8 | 10.8 | 0.13 | 1.7 | 4.6 | 71.7 | 194.3 |
| *C. braaudii* | $KNO_3$ + $HCO_3$- | 59.8 | 4.2 | 9.5 | 0.032 | 0.6 | 1.9 | 25.1 | 68.0 |
| *C. braaudii* | $KNO_3$ + $HCO_3$- | 18.5 | 4.3 | 9.4 | 0.16 | 2.3 | 5.0 | 64.9 | 175.9 |
| *C. braaudii* | $KNO_3$ + $HCO_3$- | 7.6 | 4.5 | 9.8 | 0.12 | 1.4 | 2.9 | 51.5 | 139.6 |
| *C. braaudii* | $KNO_3$ + $HCO_3$- | 5.8 | 3.8 | 8.5 | 0.15 | 1.3 | 3.5 | 27.9 | 75.5 |
| *C. braaudii* | $KNO_3$ + $HCO_3$- | 6.5 | 3.8 | 7.9 | 0.11 | 1.1 | 2.5 | 27.7 | 75.1 |
| *C. braaudii* | $KNO_3$ + $HCO_3$- | 10.6 | 4.1 | 8.5 | 0.043 | 0.9 | 1.1 | 30.5 | 82.6 |
| *C. braaudii* | $KNO_3$ + $HCO_3$- | 20.4 | 4.6 | 8.8 | 0.031 | 0.6 | 1.0 | 26.1 | 70.6 |
| *C. braaudii* | $KNO_3$ + $HCO_3$- | 11.4 | 4.7 | 10.8 | 0.15 | 1.5 | 4.1 | 58.1 | 157.4 |
| *C. braaudii* | $KNO_3$ + $HCO_3$- | 19.5 | 3.8 | 8.1 | 0.18 | 1.0 | 5.9 | 24.0 | 65.1 |

TABLE A2-continued

Tabulated Coccolith data from opto-electrochemical experiments. Distance from electrode was measured from the electrode edge to coccolith centre. All the electrolyte has an addition of 10 mM $H_2BQ$ acid precursor prior to the experiment. The concentration of the chemical components are: 0.7M $KNO_3$, 54.6 mM $Mg^{2+}$ and 2.4 mM $HCO_3$-. See SI Section 1.2 for K/2 culture medium. Effective radius ($r_{eff}$) was calculated from the coccoliths projection area measured after image threshold (Area = $\pi r_{eff}^2$). Coccolith length denotes the longest length of the coccolith, which is equivalent to the major axis for elliptical liths. The initial slope was the initial dissolution rate $dr_{eff}/dt$, obtained from $t_{on}$ = 0 s as shown in FIG. 5. Maximum thickness was obtained from the coccolith volume reconstruction. $c_p$ was the factor increase in dissolution rate as compared to a smooth and solid calcite particle with radius $r_{eff}$. Coccolith volume was obtained from image reconstruction and coccolith mass was estimated using a calcite density of 2.71 g $cm^{-3}$.

| Species | Electrolyte | Distance from electrode/μm | $r_{eff}$/ μm | Coccolith length/ μm | Initial slope/ μm $s^{-1}$ | Maximum thickness/ μm | $c_p$ | Coccolith volume/ $μm^3$ | Coccolith mass/pg |
|---|---|---|---|---|---|---|---|---|---|
| *C. braaudii* | $KNO_3$ + $HCO_3$- | 23.9 | 4.4 | 9.3 | 0.098 | 0.9 | 3.5 | 35.9 | 97.2 |
| *C. braaudii* | $KNO_3$ + $HCO_3$- | 23.9 | 4.9 | 10.2 | 0.13 | 1.1 | 4.5 | 48.8 | 132.3 |
| *C. braaudii* | $KNO_3$ + $HCO_3$- | 47.2 | 4.1 | 8.6 | 0.091 | 0.8 | 4.6 | 31.9 | 86.4 |
| *C. braaudii* | $KNO_3$ + $HCO_3$- | 9.4 | 3.9 | 8.3 | 0.29 | 2.1 | 7.3 | 71.7 | 194.4 |
| *C. braaudii* | $KNO_3$ + $HCO_3$- | 9.7 | 3.9 | 9.4 | 0.080 | 0.9 | 2.0 | 32.8 | 88.9 |
| *C. braaudii* | K/2 | 41.9 | 5.0 | 10.9 | 0.12 | 1.7 | 5.8 | 90.8 | 246.0 |
| *C. braaudii* | K/2 | 10.6 | 4.7 | 10.7 | 0.076 | 1.9 | 2.0 | 77.9 | 211.2 |
| *C. braaudii* | K/2 | 26.8 | 4.8 | 10.1 | 0.070 | 1.5 | 2.6 | 68.9 | 186.6 |
| *C. braaudii* | K/2 | 33.5 | 5.0 | 10.5 | 0.059 | 1.7 | 2.5 | 77.8 | 210.8 |
| *C. braaudii* | K/2 | 61.8 | 3.9 | 9.4 | 0.037 | 0.8 | 2.3 | 25.2 | 68.2 |
| *C. braaudii* | K/2 | 88.6 | 4.6 | 9.9 | 0.041 | 0.7 | 3.7 | 32.8 | 88.9 |
| *C. braaudii* | K/2 | 16.7 | 4.5 | 9.3 | 0.067 | 1.0 | 2.0 | 38.4 | 104.0 |
| *C. braaudii* | K/2 | 22.4 | 4.2 | 9.3 | 0.089 | 1.0 | 3.1 | 38.8 | 105.1 |
| *C. braaudii* | K/2 | 25.0 | 3.4 | 7.3 | 0.095 | 0.9 | 3.4 | 20.4 | 55.4 |
| *C. braaudii* | K/2 | 21.3 | 5.2 | 11.5 | 0.077 | 2.8 | 2.6 | 123.7 | 335.1 |
| *C. braaudii* | K/2 | 28.0 | 5.0 | 10.7 | 0.063 | 2.1 | 2.4 | 90.0 | 243.8 |
| *C. braaudii* | K/2 | 40.3 | 3.9 | 8.6 | 0.050 | 1.6 | 2.3 | 48.2 | 130.5 |
| *C. braaudii* | K/2 | 45.5 | 4.8 | 10.6 | 0.054 | 1.4 | 2.7 | 73.8 | 199.9 |
| *C. braaudii* | K/2 | 87.1 | 5.0 | 10.6 | 0.052 | 1.0 | 4.3 | 45.3 | 122.8 |
| *C. braaudii* | K/2 | 19.3 | 4.2 | 9.9 | 0.092 | 1.1 | 3.0 | 40.6 | 110.1 |
| *C. braaudii* | K/2 | 21.8 | 3.9 | 8.6 | 0.064 | 0.7 | 2.1 | 22.2 | 60.1 |
| *C. braaudii* | K/2 | 20.1 | 4.0 | 8.4 | 0.098 | 1.0 | 3.2 | 45.3 | 122.8 |
| *E. huxleyi* | K/2 | 11.2 | 1.1 | 2.3 | 0.33 | 0.3 | 8.9 | 0.7 | 1.8 |
| *E. huxleyi* | K/2 | 20.5 | 1.4 | 3.4 | 0.097 | 0.2 | 3.2 | 1.1 | 2.9 |
| *E. huxleyi* | K/2 | 21.0 | 1.6 | 3.7 | 0.34 | 0.6 | 11 | 2.8 | 7.6 |
| *E. huxleyi* | K/2 | 21.5 | 2.2 | 4.7 | 0.11 | 0.4 | 3.9 | 4.8 | 13.1 |
| *E. huxleyi* | K/2 | 24.6 | 1.6 | 3.6 | 0.21 | 0.8 | 7.6 | 3.1 | 8.4 |
| *E. huxleyi* | K/2 | 30.2 | 1.2 | 2.5 | 0.18 | 0.4 | 7.0 | 1.1 | 3.0 |
| *E. huxleyi* | K/2 | 35.3 | 1.5 | 3.4 | 0.13 | 0.4 | 5.4 | 1.9 | 5.2 |
| *E. huxleyi* | K/2 | 37.8 | 1.3 | 2.8 | 0.10 | 0.3 | 4.6 | 1.1 | 3.0 |
| *E. huxleyi* | K/2 | 9.3 | 1.8 | 3.9 | 0.34 | 0.4 | 8.8 | 2.9 | 7.9 |
| *E. huxleyi* | K/2 | 13.2 | 1.5 | 3.5 | 0.48 | 0.6 | 13 | 2.6 | 7.1 |
| *E. huxleyi* | K/2 | 16.1 | 1.9 | 4.3 | 0.21 | 0.4 | 6.2 | 3.2 | 8.7 |
| *E. huxleyi* | K/2 | 34.8 | 1.4 | 3.7 | 0.31 | 0.8 | 13 | 3.1 | 8.3 |
| *E. huxleyi* | K/2 | 40.0 | 1.6 | 3.6 | 0.13 | 0.4 | 6.1 | 2.3 | 6.2 |
| *E. huxleyi* | K/2 | 18.0 | 1.7 | 4.1 | 0.60 | 0.9 | 19 | 4.8 | 12.9 |
| *E. huxleyi* | K/2 | 39.5 | 1.8 | 4.2 | 0.19 | 0.3 | 8.8 | 1.5 | 4.2 |
| *E. huxleyi* | K/2 | 43.5 | 2.1 | 5.0 | 0.22 | 0.8 | 11 | 7.6 | 20.5 |
| *E. huxleyi* | K/2 | 23.9 | 2.2 | 4.8 | 0.23 | 0.6 | 8.2 | 6.4 | 17.3 |
| *E. huxleyi* | K/2 | 27.9 | 2.2 | 5.2 | 0.22 | 0.6 | 8.1 | 6.7 | 18.2 |
| *E. huxleyi* | K/2 | 11.5 | 1.5 | 3.7 | 0.34 | 0.7 | 9.2 | 3.1 | 8.3 |
| *E. huxleyi* | K/2 | 29.2 | 1.7 | 4.1 | 0.28 | 0.7 | 11 | 3.9 | 10.5 |
| *E. huxleyi* | K/2 | 15.1 | 1.8 | 4.2 | 0.26 | 0.5 | 7.7 | 3.5 | 9.6 |
| *E. huxleyi* | K/2 | 18.3 | 2.3 | 4.8 | 0.35 | 1.1 | 11 | 10.8 | 29.2 |
| *E. huxleyi* | K/2 | 24.7 | 2.2 | 4.5 | 0.25 | 0.9 | 9.1 | 8.6 | 23.3 |
| *E. huxleyi* | K/2 | 34.0 | 2.0 | 4.6 | 0.15 | 0.5 | 6.3 | 4.8 | 13.0 |
| *E. huxleyi* | K/2 | 46.5 | 2.1 | 4.9 | 0.077 | 0.4 | 3.9 | 4.5 | 12.2 |
| *E. huxleyi* | K/2 | 9.7 | 1.9 | 4.3 | 0.64 | 0.9 | 16 | 6.7 | 18.1 |
| *E. huxleyi* | K/2 | 10.4 | 1.6 | 4.0 | 0.12 | 0.3 | 3.2 | 1.6 | 4.3 |
| *E. huxleyi* | K/2 | 16.2 | 1.6 | 3.8 | 0.23 | 0.5 | 7.0 | 2.6 | 7.1 |
| *E. huxleyi* | K/2 | 23.7 | 1.7 | 4.4 | 0.29 | 0.6 | 10 | 3.6 | 9.8 |
| *E. huxleyi* | K/2 | 30.1 | 2.1 | 4.8 | 0.14 | 0.4 | 5.4 | 4.2 | 11.3 |
| *E. huxleyi* | K/2 | 38.8 | 1.5 | 3.3 | 0.11 | 0.3 | 4.8 | 1.5 | 4.2 |
| *C. leptoporus* | K/2 | 14.5 | 3.5 | 6.4 | 0.024 | 0.3 | 0.69 | 8.8 | 23.8 |
| *C. leptoporus* | K/2 | 80.8 | 2.6 | 5.8 | 0.020 | 0.3 | 1.5 | 6.5 | 17.5 |
| *C. leptoporus* | K/2 | 81.2 | 2.7 | 5.8 | 0.023 | 0.5 | 1.8 | 6.2 | 16.8 |
| *C. leptoporus* | K/2 | 76.6 | 2.9 | 6.4 | 0.012 | 0.2 | 0.88 | 4.4 | 11.9 |
| *C. leptoporus* | K/2 | 24.0 | 1.8 | 4.2 | 0.095 | 0.5 | 3.4 | 3.3 | 8.9 |
| *C. leptoporus* | K/2 | 94.8 | 2.9 | 6.4 | 0.010 | 0.2 | 0.93 | 4.8 | 12.9 |

TABLE A2-continued

Tabulated Coccolith data from opto-electrochemical experiments. Distance from electrode was measured from the electrode edge to coccolith centre. All the electrolyte has an addition of 10 mM $H_2BQ$ acid precursor prior to the experiment. The concentration of the chemical components are: 0.7M $KNO_3$, 54.6 mM $Mg^{2+}$ and 2.4 mM $HCO_3^-$. See SI Section 1.2 for K/2 culture medium. Effective radius ($r_{eff}$) was calculated from the coccoliths projection area measured after image threshold (Area = $\pi r_{eff}^2$). Coccolith length denotes the longest length of the coccolith, which is equivalent to the major axis for elliptical liths. The initial slope was the initial dissolution rate $dr_{eff}/dt$, obtained from $t_{on}$ = 0 s as shown in FIG. 5. Maximum thickness was obtained from the coccolith volume reconstruction. $c_p$ was the factor increase in dissolution rate as compared to a smooth and solid calcite particle with radius $r_{eff}$. Coccolith volume was obtained from image reconstruction and coccolith mass was estimated using a calcite density of 2.71 g $cm^{-3}$.

| Species | Electrolyte | Distance from electrode/μm | $r_{eff}$/ μm | Coccolith length/ μm | Initial slope/ μm $s^{-1}$ | Maximum thickness/ μm | $c_p$ | Coccolith volume/ $μm^3$ | Coccolith mass/pg |
|---|---|---|---|---|---|---|---|---|---|
| *C. leptoporus* | K/2 | 29.7 | 2.2 | 4.5 | 0.056 | 0.5 | 2.1 | 4.8 | 13.0 |
| *C. leptoporus* | K/2 | 54.0 | 2.0 | 4.6 | 0.027 | 0.4 | 1.5 | 7.8 | 21.1 |
| *C. leptoporus* | K/2 | 44.2 | 3.3 | 7.2 | 0.034 | 0.6 | 1.6 | 14.5 | 39.2 |
| *C. leptoporus* | K/2 | 55.4 | 1.9 | 4.1 | 0.13 | 0.9 | 7.4 | 6.1 | 16.4 |
| *C. leptoporus* | K/2 | 46.5 | 3.1 | 6.4 | 0.019 | 0.4 | 0.96 | 7.8 | 21.1 |
| *C. leptoporus* | K/2 | 53.8 | 3.2 | 6.5 | 0.027 | 0.6 | 1.5 | 11.8 | 31.9 |
| *C. leptoporus* | K/2 | 69.7 | 3.4 | 7.0 | 0.009 | 0.3 | 0.60 | 6.7 | 18.2 |
| *C. leptoporus* | K/2 | 30.2 | 2.1 | 5.0 | 0.074 | 0.5 | 2.9 | 4.4 | 12.0 |
| *C. leptoporus* | K/2 | 38.1 | 3.1 | 6.2 | 0.045 | 0.5 | 2.0 | 11.0 | 29.7 |
| *C. leptoporus* | K/2 | 40.7 | 3.2 | 6.2 | 0.088 | 1.0 | 4.1 | 19.6 | 53.2 |
| *C. leptoporus* | K/2 | 19.3 | 3.4 | 7.2 | 0.029 | 0.3 | 0.93 | 8.7 | 23.6 |
| *C. leptoporus* | K/2 | 31.5 | 3.7 | 7.2 | 0.043 | 0.6 | 1.7 | 18.5 | 50.1 |
| *C. leptoporus* | K/2 | 53.7 | 2.4 | 4.8 | 0.029 | 0.3 | 1.6 | 4.0 | 11.0 |
| *C. leptoporus* | K/2 | 56.2 | 3.2 | 6.8 | 0.028 | 0.4 | 1.6 | 9.1 | 24.6 |
| *C. leptoporus* | K/2 | 59.3 | 3.2 | 6.6 | 0.032 | 0.5 | 1.9 | 11.8 | 32.0 |
| *G. oceanica* | K/2 | 16.6 | 2.2 | 4.7 | 0.14 | 0.5 | 4.2 | 5.5 | 14.9 |
| *G. oceanica* | K/2 | 33.4 | 1.9 | 4.7 | 0.10 | 0.7 | 4.3 | 3.3 | 9.0 |
| *G. oceanica* | K/2 | 37.0 | 2.4 | 5.7 | 0.19 | 0.9 | 8.1 | 8.4 | 22.7 |
| *G. oceanica* | K/2 | 8.6 | 2.6 | 5.7 | 0.12 | 0.9 | 2.9 | 13.7 | 37.2 |
| *G. oceanica* | K/2 | 14.1 | 2.0 | 5.1 | 0.22 | 1.2 | 6.2 | 10.6 | 28.6 |
| *G. oceanica* | K/2 | 16.9 | 2.4 | 4.9 | 0.25 | 1.3 | 7.5 | 14.8 | 40.0 |
| *G. oceanica* | K/2 | 15.3 | 1.8 | 4.3 | 0.21 | 0.9 | 6.3 | 8.4 | 22.8 |
| *G. oceanica* | K/2 | 36.1 | 1.8 | 3.9 | 0.16 | 1.1 | 7.1 | 7.8 | 21.1 |
| *G. oceanica* | K/2 | 44.1 | 1.5 | 3.7 | 0.093 | 0.7 | 4.5 | 4.5 | 12.1 |
| *G. oceanica* | K/2 | 54.0 | 3.2 | 7.6 | 0.044 | 0.6 | 2.4 | 15.2 | 41.2 |
| *G. oceanica* | K/2 | 22.0 | 2.7 | 6.1 | 0.060 | 0.5 | 2.0 | 8.6 | 23.3 |
| *G. oceanica* | K/2 | 29.3 | 3.1 | 6.3 | 0.087 | 0.9 | 3.4 | 19.4 | 52.6 |
| *G. oceanica* | K/2 | 52.9 | 2.5 | 5.6 | 0.082 | 0.8 | 4.5 | 15.8 | 42.7 |
| *G. oceanica* | K/2 | 11.7 | 2.1 | 4.8 | 0.14 | 0.9 | 3.7 | 8.8 | 23.8 |
| *G. oceanica* | K/2 | 16.4 | 2.1 | 5.0 | 0.18 | 1.1 | 5.4 | 11.5 | 31.0 |
| *G. oceanica* | K/2 | 18.2 | 2.0 | 4.1 | 0.14 | 1.2 | 4.4 | 11.0 | 29.9 |
| *G. oceanica* | K/2 | 20.5 | 1.9 | 4.5 | 0.067 | 0.5 | 2.2 | 4.4 | 11.8 |
| *G. oceanica* | K/2 | 47.4 | 2.6 | 5.7 | 0.11 | 1.0 | 5.8 | 16.2 | 44.0 |
| *G. oceanica* | K/2 | 11.8 | 3.5 | 7.3 | 0.12 | 0.9 | 3.3 | 23.7 | 64.3 |
| *G. oceanica* | K/2 | 25.6 | 3.4 | 7.7 | 0.10 | 1.0 | 3.7 | 24.0 | 65.1 |
| *G. oceanica* | K/2 | 13.7 | 3.0 | 6.6 | 0.20 | 1.5 | 5.6 | 27.5 | 74.5 |
| *G. oceanica* | K/2 | 34.1 | 2.9 | 6.4 | 0.087 | 0.9 | 3.6 | 16.7 | 45.3 |
| *G. oceanica* | K/2 | 38.7 | 2.7 | 5.9 | 0.13 | 1.1 | 5.9 | 13.9 | 37.8 |
| *G. oceanica* | K/2 | 24.5 | 2.4 | 5.3 | 0.27 | 1.7 | 9.6 | 22.2 | 60.2 |
| *G. oceanica* | K/2 | 33.8 | 2.2 | 5.2 | 0.23 | 1.4 | 9.5 | 14.7 | 39.8 |
| *G. oceanica* | K/2 | 49.8 | 2.7 | 6.0 | 0.11 | 0.9 | 5.6 | 14.9 | 40.4 |
| *G. oceanica* | K/2 | 50.7 | 3.4 | 7.4 | 0.097 | 1.0 | 5.1 | 23.1 | 62.6 |

The invention claimed is:

1. A method to determine the amount of carbonate in a biomineralized $CaCO_3$ particle, the method comprising electrochemically generating a controlled amount of acid at an electrode in a carrier liquid, wherein the biomineralized $CaCO_3$ particle is also present in the carrier liquid, wherein the acid diffuses from the electrode and then reacts with the biomineralized $CaCO_3$ particle, such that it starts to dissolve, and, monitoring the dissolution of the biomineralized $CaCO_3$ particle until it has completely dissolved to determine the amount of carbonate in the biomineralized $CaCO_3$ particle.

2. The method according to claim 1, wherein the biomineralized $CaCO_3$ particle is derived from a calcifying plankton species.

3. The method according to claim 1, wherein the biomineralized $CaCO_3$ particle is derived from a genus selected from *Algirosphaera, Acanthoica, Alisphaera, Alveosphaera, Anacanthoica, Anthosphaera, Braarudosphaera, Calcioconus, Calciopappus, Calciosolenia, Calicasphaera, Calyptrolithina, Calcidiscus Calyptrosphaera, Caneosphaera, Ceratolithus, Coccolithus Corisphaera, Coronosphaera, Cribosphaera, Crystallolithus, Cyrtosphaera, Discosphaera, Emiliania, Florisphaera, Gephyrocapsa Gladiolithus, Halopappus, Heimiella, Helicosphaera, Helladosphaera, Hesperides, Holococcolithophora, Homozygosphaera, Lohmannosphaera, Michaelsarsia, Oolithotus, Ophiaster, Palusphaera, Pappomanus, Papposphaera, Picarola, Pleurochrysis, Polycrater, Pontosphaera, Poricalyptra, Poritectolithus, Recticulofenestra, Rhabdosphaera, Scyphosphaera, Solisphaera, Sphaerocalyptra, Syracolithus,*

*Syracosphaera, Termitomyces Thoracosphaera, Turrilithus, Umbellosphaera, Umbilicosphaera*, or *Zygosphaera*.

4. The method according to claim 1, wherein the biomineralized $CaCO_3$ particle is derived from a plankton species selected from *E. huxleyi, C. leptoporus, G. oceanica*, or *C. pelagicus*.

5. The method according to claim 1, wherein the biomineralized $CaCO_3$ particle is within the diffusion field of the electrode.

6. The method according to claim 1, wherein the biomineralized $CaCO_3$ particle is 100 microns or less away from the electrode.

7. The method according to claim 1, wherein the pH of carrier liquid local to the electrode after electrochemically generating a controlled amount of acid is less than 7, wherein local to the electrode refers to carrier liquid that is within 300 microns of the electrode.

8. The method according to claim 1, wherein the acid is electrochemically generated from an acid precursor, wherein the acid precursor is a compound that is able to undergo an electrochemically driven proton-coupled electron transfer reaction, optionally where the acid precursor is selected from hydrogen, ammonia, hydrogen peroxide and water.

9. The method according to claim 8, wherein the acid precursor is a dihydroxyaryl compound, optionally an optionally substituted 1,4-dihydroxybenzene.

10. The method according to claim 8, wherein the acid precursor is used in an amount of at least 1 μM to 20 mM.

11. The method according to claim 1, wherein the controlled amount of acid is electrochemically generated by applying a voltage at the electrode to oxidise the acid precursor or by applying a controlled current wherein the current is modulated by altering the applied potential.

12. The method according to claim 1, wherein the carrier liquid is seawater or estuary water.

13. The method according to claim 12, wherein the acid is electrochemically generated from water, which may be seawater or estuary water, which acts as an acid precursor.

14. The method according to claim 1, wherein the dissolution is monitored using a technique selected from optical microscopy, fluorescence, light scattering, pH, potentiometry, or conductivity.

15. The method according to claim 1, wherein the dissolution is optically monitored by a technique selected from optical microscopy, fluorescence or light scattering.

16. The method according to claim 1, wherein the dissolution is monitored by optical microscopy to visualize the biomineralized $CaCO_3$ particle as it dissolves in order to determine its volume, and optionally wherein the amount of biomineralized $CaCO_3$, in terms of its mass, is calculated by multiplying the volume of biomineralized $CaCO_3$ by the density of biomineralized $CaCO_3$.

17. The method according to claim 15, wherein the dissolution is monitored by darkfield optical microscopy.

18. The method according to claim 15, wherein the volume of the biomineralized $CaCO_3$ particle is determined by (i) determining the rate of dissolution of the particle in a z direction, in terms of a length or an effective length of the particle dissolved in the direction per unit time, (ii) measuring the 2D area of the biomineralized $CaCO_3$ particle by taking a plurality of measurements at regular time intervals of the particle as it dissolves, and (iii) for each measurement of the 2D area, multiplying the 2D area of the biomineralized $CaCO_3$ particle by the rate of dissolution and the time interval between each measurement, and (iv) summing the values from (iii) from the initial measurement of the 2D area to the point that the particle has completely dissolved.

19. The method according to claim 18, wherein the 2D area is determined by counting the total number of pixels in an image multiplied by the pixel resolution.

20. The method according to claim 18, wherein images of the biomineralized $CaCO_3$ are taken at a rate of 1 fps to 100 fps.

21. The method according to claim 1, wherein the dissolution is monitored chemically by amperometry, potentiometry or conductivity to determine the end of the dissolution process.

22. The method according to claim 1, wherein the dissolution is monitored by an electrical sensing zone device.

23. The method according to claim 1, wherein determining the amount of carbonate does not involve a prior calibration step.

24. An apparatus to determine the amount of carbonate in a biomineralized $CaCO_3$ particle, the apparatus comprising a computer program and a cell containing electrodes, wherein the cell is configured to hold a carrier liquid containing the biomineralized $CaCO_3$ particle and optionally an acid precursor;

and wherein the computer program is configured to cause the apparatus to:

electrochemically generate a controlled amount of acid at an electrode in a carrier liquid, wherein the biomineralized $CaCO_3$ particle is also present in the carrier liquid, wherein the acid diffuses from the electrode and then reacts with the biomineralized $CaCO_3$ particle, such that it starts to dissolve, and, monitor the dissolution of the biomineralized $CaCO_3$ particle until it has completely dissolved to determine the amount of carbonate in the biomineralized $CaCO_3$ particle.

25. The apparatus according to claim 24, wherein the apparatus comprises an optical microscope configured to monitor the biomineralized $CaCO_3$ particle by taking a plurality of images of the biomineralized $CaCO_3$ particle as it is dissolving.

26. The apparatus according to claim 24, wherein the cell comprises the carrier liquid, the biomineralized $CaCO_3$ particle, and optionally the acid precursor.

* * * * *